United States Patent
Titz et al.

(10) Patent No.: US 12,545,699 B2
(45) Date of Patent: Feb. 10, 2026

(54) **BIVALENT LECA INHIBITORS TARGETING BIOFILM FORMATION OF *PSEUDOMONAS AERUGINOSA***

(71) Applicants: HELMHOLTZ-ZENTRUM FÜR INFEKTIONSFORSCHUNG GMBH, Braunschweig (DE); CENTRE NATIONAL DE LA RECHERCHE SCIENTIFIQUE DIRECTION DE LA POLITIQUE INDUSTRIELLE, Paris (FR)

(72) Inventors: Alexander Titz, Saarbrücken (DE); Eva Záhorská, Saarbrücken (DE); Saverio Minervini, Saarbrücken (DE); Anne Imberty, Grenoble (FR); Sakonwan Kuhaudomlarp, Grenoble (FR)

(73) Assignees: HELMHOLTZ-ZENTRUM FÜR INFEKTIONSFORSCHUNG GMBH, Braunschweig (DE); CENTRE NATIONAL DE LA RECHERCHE SCIENTIFIQUE DIRECTION DE LA POLITIQUE INDUSTRIELLE, Paris (FR)

( * ) Notice: Subject to any disclaimer, the term of this patent is extended or adjusted under 35 U.S.C. 154(b) by 798 days.

(21) Appl. No.: 17/773,670

(22) PCT Filed: Nov. 5, 2020

(86) PCT No.: PCT/EP2020/081182
§ 371 (c)(1),
(2) Date: May 2, 2022

(87) PCT Pub. No.: WO2021/089729
PCT Pub. Date: May 14, 2021

(65) Prior Publication Data
US 2022/0402960 A1  Dec. 22, 2022

(30) Foreign Application Priority Data
Nov. 5, 2019 (EP) .................... 19306432

(51) Int. Cl.
| C07D 471/04 | (2006.01) |
| A61K 31/7034 | (2006.01) |
| A61K 45/06 | (2006.01) |
| A61K 49/00 | (2006.01) |
| C07H 15/203 | (2006.01) |
| G01N 33/58 | (2006.01) |

(52) U.S. Cl.
CPC ....... *C07H 15/203* (2013.01); *A61K 31/7034* (2013.01); *A61K 45/06* (2013.01); *A61K 49/0052* (2013.01); *G01N 33/582* (2013.01)

(58) Field of Classification Search
CPC .. C07H 15/203; A61K 31/7034; A61K 45/06; A61K 49/0052; G01N 33/582
See application file for complete search history.

(56) References Cited

U.S. PATENT DOCUMENTS 6,555,519 B2 * 4/2003 Washburn et al. .... A61K 31/35
514/3

OTHER PUBLICATIONS

Wojtczak. Glossary of Medical Education Terms. (Year: 2002).*
Noskova. Sensors 2015, 15, 1945-1953 (Year: 2015).*
Fu et al. ChemistryOpen 2015, 4, 463-470. (Year: 2015).*
Yu et al. J. Org. Chem. 84, 2470-2488. (Year: 2019).*
Pickens. Chemistry & Biology, vol. 9, 215-224. (Year: 2002).*
Han et al. Journal of Medicinal Chemistry, 2010, vol. 53, No. 12. (Year: 2010).*
Angeli, et al., (2017) "Design and Synthesis of Galactosylated Bifurcated Ligands with Nanomolar Affinity for Lectin LecA from Pseudomonas aeruginosa," Chem Bio Chem. 18: 1036-1047.
Visini, et al., (2015) "Structural Insight into Multivalent Galactoside Binding to Pseudomonas aeruginosa Lectin LecA," ACS Chem Bio. 10:2455-2462.
International Search Report (ISR) with Written Opinion for PCT/EP2020/081182 dated Jan. 28, 2021, pp. 1-8.
Novoa, Alexandre et al. "A LecA Ligand Identified from a Galactoside-Conjugate Array Inhibits Host Cell Invasion by Pseudomonas aeruginosa" Angewandte Chemie (2014) vol. 53(34), pp. 8885-8889.
Bergmann, Myriam et al. "Multivalency effects on Pseudomonas aeruginosa biofilm inhibition and dispersal by glycopeptide dendrimers targeting lectin LecA" Organic & Biomolecular Chemistry (2016) vol. 14(1), pp. 138-148.

* cited by examiner

Primary Examiner — Scarlett Y Goon
Assistant Examiner — Samantha Lynn Schachermeyer
(74) Attorney, Agent, or Firm — McDonnell Boehnen Hulbert & Berghoff, LLP

(57) ABSTRACT

The present invention relates to divalent compounds binding to LecA. The compounds are useful to block biofilm formation of *Pseudomonas aeruginosa*. The invention further relates to pharmaceutical compositions comprising these compounds and to therapeutic methods and uses of these compounds, in particular to therapeutic methods and uses for the treatment of *Pseudomonas aeruginosa* infections in a subject. The invention also relates to imaging of infections, such as biofilms produced by *Pseudomonas aeruginosa*, by using these divalent compounds.

11 Claims, 7 Drawing Sheets

BIVALENT LECA INHIBITORS TARGETING BIOFILM FORMATION OF *PSEUDOMONAS AERUGINOSA*

This application is a U.S. national phase of International Application No. PCT/EP2020/081182, filed on Nov. 5, 2020, which claims priority to European Patent Application No. 19306432.6, filed Nov. 5, 2019, both of which are incorporated by reference herein in their entirety.

FIELD OF THE INVENTION

The present invention relates to divalent compounds binding to LecA. The compounds are useful to block biofilm formation of *Pseudomonas aeruginosa*. The invention further relates to pharmaceutical compositions comprising these compounds and to therapeutic methods and uses of these compounds, in particular to therapeutic methods and uses for the treatment of *Pseudomonas aeruginosa* infections in a subject. The invention also relates to imaging of infections, such as biofilms produced by *Pseudomonas aeruginosa*, by using these divalent compounds.

BACKGROUND OF THE INVENTION

*Pseudomonas aeruginosa* is a gram-negative opportunistic ESKAPE pathogen that forms biofilms, a hallmark of chronic infections and antimicrobial resistance. *P. aeruginosa* tetrameric D-galactose specific lectin, LecA, plays a key role in adhesion and biofilm formation (Diggle et al., *Environ Microbiol* 8 1095-104 (2006)). Therefore, inhibition of LecA and bacterial adhesion and biofilm integrity is an alternative treatment strategy to break AMR.

Sugar lectin interactions are usually of low affinity. One approach to enhance inhibitors activity is through multivalent binding (Cecioni et al., *Chem Rev*, 2015, 115(1), 525-61). Multivalent inhibitors can be orders of magnitude more potent than their monovalent analogues. Binding affinity of multivalent ligands can be fine-tuned by careful linker design, especially with optimization of the linker length and flexibility. However multivalent molecules may by immunogenic and contrast their design and rather increase biofilm formation than the desired opposite. The Pieters lab has designed a bivalent molecule that fits two adjacent binding sites in LecA simultaneously and can therefore not crosslink the biofilm but shuts down LecA function instead (F. Pertici & R. J. Pieters, *Chem Commun (Camb)* 48 4008-10 (2012); G. Yu, R. J. Pieters et al., *J Org Chem* 84 2470-2488 (2019)).

The molecules prepared by Yu et al. show an excellent potency of down to 12 nM but lack synthetic accessibility and drug like properties due to their oligosaccharide linker nature which is complex to synthesize and will have disadvantages in drug development.

Summarizing the above, complex molecules by Pieters (divalent) and other multivalent structures have the drawback of complexity in synthesis and unspecific action on innate immune proteins (PRR, lectins etc). Druglike properties do currently not exist in multivalent ligands. Also the divalent Pieters molecules lack drug-likeness.

Technical Problems Underlying the Present Invention

Considering these drawbacks of the bivalent and multivalent compounds of the prior art, there remained a need in the art for LecA inhibitors that can be easily synthesized and exhibit drug-like properties.

The present inventors designed, synthesized and evaluated a series of divalent LecA inhibitors with focus on linker simplicity and accessibility. By using acyl hydrazides of bis aldehyde linkers with length optimization, they have a simple one step conjugation method of a readily accessible galactose and linker building block. The novel molecules proved to be equipotent to the Pieters' molecules with improved synthetic accessibility. The example section below shows two digit nanomolar activity on LecA by SPR. Furthermore, the present inventors devise a synthesis to modify the best divalent LecA ligands with a click chemistry handle for attachment of dyes for biofilm imaging and attachment of solubility tags to increase solubility for the bis acyl hydrazides. The present inventors also envision to substitute the acylhydrazone linking motif to further improve the molecules drug-like properties and synthetic accessibility.

While maintaining the very high affinity for the target, the molecules disclosed herein have beneficial properties with regard to ease of synthesis, simplicity, drug-likeness (MW, H-Bond donor and acceptors etc).

The above overview does not necessarily describe all problems solved and advantages achieved by the present invention.

SUMMARY OF THE INVENTION

In a first aspect the present invention relates to a compound of the general structure (I):

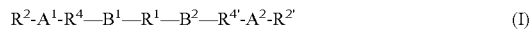

$$R^2\text{-}A^1\text{-}R^4\text{—}B^1\text{—}R^1\text{—}B^2\text{—}R^{4'}\text{-}A^2\text{-}R^{2'} \qquad (I)$$

or of the general structure (II)

$$R^2\text{-}A^1\text{-}R^4\text{—}B^1\text{—}R^5 \qquad (II)$$

wherein $R^2$ and $R^{2'}$ are independently from each other selected from the group consisting of galactose, GalNAc, 2-deoxy-galactose, and epoxides of galactoheptose, wherein the —O— group forming the linkage between $R^2$ and $A^1$ and/or the —O— group forming the linkage between $R^{2'}$ and $A^2$ may be replaced independently from each other by an —S— group, an —NH— group, or a —CH$_2$— group;

$A^1$ and $A^2$ are independently from each other selected from the group consisting of (a) an arenediyl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —NH$_2$, —NHR$^{13}$ with $R^{13}$ being a $C_1$-$C_4$ alkyl group, —NR$^{13}$R$^{14}$ with $R^{13}$ and $R^{14}$ each being independently from each other a $C_1$-$C_4$ alkyl group, —NO$_2$, —CN, —COOH, —COOR$^{13}$ with $R^{13}$ being a $C_1$-$C_4$ alkyl group, —CONH$_2$, —CONHR$^{13}$ with $R^{13}$ being a $C_1$-$C_4$ alkyl group, —CONR$^{13}$R$^{14}$ with $R^{13}$ and $R^{14}$ each being independently from each other a $C_1$-$C_4$ alkyl group, and —SO$_3$H, and (b) a heteroarenediyl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —NH$_2$, —NHR$^{13}$ with $R^{13}$ being a $C_1$-$C_4$ alkyl group, —NR$^{13}$R$^{14}$ with $R^{13}$ and $R^{14}$ each being independently from each other a $C_1$-$C_4$ alkyl group, —NO$_2$, —CN, —COOH, —COOR$^{13}$ with R$^{13}$ being a C$_1$-C$_4$ alkyl group, —CONH$_2$, —CONHR$^{13}$ with R$^{13}$ being a C$_1$-C$_4$ alkyl group, —CONR$^{13}$R$^{14}$ with R$^{13}$ and R$^{14}$ each being independently from each other a C$_1$-C$_4$ alkyl group, and —SO$_3$H;

R$^4$ is selected from the group consisting of —CO—NH—N═CH—; —CH$_2$—CH$_2$—CO—NH—; E- or Z-—CO—NH—CH═CH—, E- or Z-—CH═CH—CO—NH—; —CO—NH—CH$_2$—CH$_2$—; —NH—CO—CH$_2$—CH$_2$—; E- or Z-—CH═CH—NH—CO—; E- or Z-—NH—CO—CH═CH—; and —CH$_2$—CH$_2$—NH—CO—;

R$^{4'}$ is selected from the group consisting of —CH═N—NH—CO—; —NH—CO—CH$_2$—CH$_2$—; E- or Z-—CH═CH—NH—CO—; E- or Z-—NH—CO—CH═CH—; —CH$_2$—CH$_2$—NH—CO—; —CH$_2$—CH$_2$—CO—NH—; E- or Z-—CO—NH—CH═CH—; E- or Z-—CH═CH—CO—NH—; and —CO—NH—CH$_2$—CH$_2$—;

B$^1$ and B$^2$ are independently from each other selected from the group consisting of
(a) an arenediyl group that is optionally substituted by one, two or three substituents that are independently from each other selected from the group consisting of a C$_1$-C$_4$ alkyl group, halogen, a C$_1$-C$_4$ haloalkyl group, —OH, a C$_1$-C$_4$ alkoxy group, —NH$_2$, —NHR$^{13}$ with R$^{13}$ being a C$_1$-C$_4$ alkyl group, —NR$^{13}$R$^{14}$ with R$^{13}$ and R$^{14}$ each being independently from each other a C$_1$-C$_4$ alkyl group, —NO$_2$, —CN, —COOH, —COOR$^{13}$ with R$^{13}$ being a C$_1$-C$_4$ alkyl group, —CONH$_2$, —CONHR$^{13}$ with R$^{13}$ being a C$_1$-C$_4$ alkyl group, —CONR$^{13}$R$^{14}$ with R$^{13}$ and R$^{14}$ each being independently from each other a C$_1$-C$_4$ alkyl group, and —SO$_3$H,
(b) a heteroarenediyl group that is optionally substituted by one, two or three substituents that are independently from each other selected from the group consisting of a C$_1$-C$_4$ alkyl group, halogen, a C$_1$-C$_4$ haloalkyl group, —OH, a C$_1$-C$_4$ alkoxy group, —NH$_2$, —NHR$^{13}$ with R$^{13}$ being a C$_1$-C$_4$ alkyl group, —NR$^{13}$R$^{14}$ with R$^{13}$ and R$^{14}$ each being independently from each other a C$_1$-C$_4$ alkyl group, —NO$_2$, —CN, —COOH, —COOR$^{13}$ with R$^{13}$ being a C$_1$-C$_4$ alkyl group, —CONH$_2$, —CONHR$^{13}$ with R$^{13}$ being a C$_1$-C$_4$ alkyl group, —CONR$^{13}$R$^{14}$ with R$^{13}$ and R$^{14}$ each being independently from each other a C$_1$-C$_4$ alkyl group, and —SO$_3$H; and
(c) a C$_3$ to C$_7$ cycloalkanediyl group, optionally substituted by one or more substituents selected from the group consisting of halogen, —CN, —NH$_2$, —NR$^{11}$R$^{12}$, —NH—CO—R$^{11}$, —NH—SO$_2$—R$^{11}$, —OR$^{11}$, —SR$^{11}$, —SO$_2$R$^{11}$, —COOR$^{11}$, —NO$_2$, -triazole-R$^{11}$, —CONH$_2$, —CONHR$^{13}$ with R$^{13}$ being a C$_1$-C$_4$ alkyl group, —CONR$^{13}$R$^{14}$ with R$^{13}$ and R$^{14}$ each being independently from each other a C$_1$-C$_4$ alkyl group, and —CH$_2$—R$^{11}$;
wherein R$^{12}$ is a C$_1$-C$_4$ alkyl group; and
wherein R$^{11}$ is selected from the group consisting of
hydrogen,
a C$_1$-C$_4$ alkyl group,
an aryl group that is optionally substituted by one, two or three substituents that are independently from each other selected from the group consisting of a C$_1$-C$_4$ alkyl group, halogen, a C$_1$-C$_4$ haloalkyl group, —OH, a C$_1$-C$_4$ alkoxy group, —NH$_2$, —NHR$^{13}$ with R$^{13}$ being a C$_1$-C$_4$ alkyl group, —NR$^{13}$R$^{14}$ with R$^{13}$ and R$^{14}$ each being independently from each other a C$_1$-C$_4$ alkyl group, —NO$_2$, —CN, —COOH, —COOR$^{13}$ with R$^{13}$ being a C$_1$-C$_4$ alkyl group, and —SO$_3$H, and
a heteroaryl group that is optionally substituted by one, two or three substituents that are independently from each other selected from the group consisting of a C$_1$-C$_4$ alkyl group, halogen, a C$_1$-C$_4$ haloalkyl group, —OH, a C$_1$-C$_4$ alkoxy group, —NH$_2$, —NHR$^{13}$ with R$^{13}$ being a C$_1$-C$_4$ alkyl group, —NR$^{13}$R$^{14}$ with R$^{13}$ and R$^{14}$ each being independently from each other a C$_1$-C$_4$ alkyl group, —NO$_2$, —CN, —COOH, —COOR$^{13}$ with R$^{13}$ being a C$_1$-C$_4$ alkyl group, and —SO$_3$H,
(d) a C$_1$-C$_6$ alkanediyl group, optionally substituted by one or more substituents selected from the group consisting of halogen, —CN, —NH$_2$, —NR$^{11}$R$^{12}$, —NH—CO—R$^{11}$, —NH—SO$_2$—R$^{11}$, —OR$^{11}$, —SR$^{11}$, —SO$_2$R$^{11}$, —COOR$^{11}$, —NO$_2$, -triazole-R$^{11}$, —CONH$_2$, —CONHR$^{13}$ with R$^{13}$ being a C$_1$-C$_4$ alkyl group, —CONR$^{13}$R$^{14}$ with R$^{13}$ and R$^{14}$ each being independently from each other a C$_1$-C$_4$ alkyl group, and —CH$_2$—
wherein R$^{12}$ is a C$_1$-C$_4$ alkyl group; and
wherein R$^{11}$ is selected from the group consisting of
hydrogen,
a C$_1$-C$_4$ alkyl group,
an aryl group that is optionally substituted by one, two or three substituents that are independently from each other selected from the group consisting of a C$_1$-C$_4$ alkyl group, halogen, a C$_1$-C$_4$ haloalkyl group, —OH, a C$_1$-C$_4$ alkoxy group, —NH$_2$, —NHR$^{13}$ with R$^{13}$ being a C$_1$-C$_4$ alkyl group, —NR$^{13}$R$^{14}$ with R$^{13}$ and R$^{14}$ each being independently from each other a C$_1$-C$_4$ alkyl group, —NO$_2$, —CN, —COOH, —COOR$^{13}$ with R$^{13}$ being a C$_1$-C$_4$ alkyl group, and —SO$_3$H, and
a heteroaryl group that is optionally substituted by one, two or three substituents that are independently from each other selected from the group consisting of a C$_1$-C$_4$ alkyl group, halogen, a C$_1$-C$_4$ haloalkyl group, —OH, a C$_1$-C$_4$ alkoxy group, —NH$_2$, —NHR$^{13}$ with R$^{13}$ being a C$_1$-C$_4$ alkyl group, —NR$^{13}$R$^{14}$ with R$^{13}$ and R$^{14}$ each being independently from each other a C$_1$-C$_4$ alkyl group, —NO$_2$, —CN, —COOH, —COOR$^{13}$ with R$^{13}$ being a C$_1$-C$_4$ alkyl group, and —SO$_3$H;

R$^1$ is selected from the group consisting of —O—, —S—, —NH—, —CO—NH—, —NH—CO—, —C(O)—, —X$^1$(CH$_2$)$_n$X$^2$—, wherein n is 1, 2, 3, 4, or 5; and X and X$^2$ are independently from each other selected from the group consisting of —O—, —S—, —NH—, —CO—NH—, —NH—CO—, and —C(O)—;
wherein the (CH$_2$)$_n$ group optionally carries a label that is linked to the (CH$_2$)$_n$ group by an alkyl group, a heteroalkyl group, an aryl-alkyl group, a heteroaryl-alkyl group, an aryl-heteroalkyl group or a heteroaryl-heteroalkyl group, wherein any of these groups can be optionally substituted; and R$^5$ is —O—C$_{1-6}$ alkyl;
or a salt thereof or a solvate thereof or a prodrug thereof.

In a second aspect the present invention relates to a pharmaceutical composition comprising the compound according to the first aspect, and optionally comprising one or more constituents selected from the group consisting of a pharmaceutically acceptable carrier, a diluent, an excipient and an anti-bacterial therapeutic agent.

In a third aspect the present invention relates to a compound according to the first aspect for use in medicine.

In a fourth aspect the present invention relates to a compound according to the first aspect, optionally in combination with one or more anti-bacterial therapeutic agent(s),
for use in the prophylaxis or treatment of *Pseudomonas aeruginosa* infections in a patient, or
for use in the prophylaxis or treatment of *Pseudomonas aeruginosa*-associated respiratory tract infections in a patient suffering from cystic fibrosis.

In a fifth aspect the present invention relates to a compound according to the first aspect for use in in vivo infection imaging.

In a sixth aspect the present invention relates to a use of a compound according to the first aspect for in vitro biofilm imaging and in vitro screening assays, preferably for imaging biofilms produced by *Pseudomonas aeruginosa*.

This summary of the invention does not necessarily describe all features of the present invention. Other embodiments will become apparent from a review of the ensuing detailed description.

DETAILED DESCRIPTION OF THE INVENTION

Definitions

Figure 1:
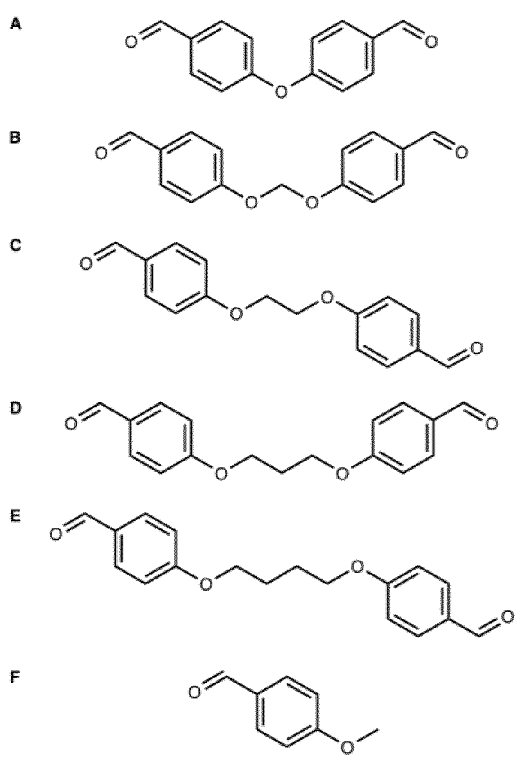
FIG. 1: Structure of bis-benzaldehyde linkers A-E and monobenzaldehyde F. MOE model of A-E6p with LecA and overlaid with PDB 4YWA.
Figure 1:
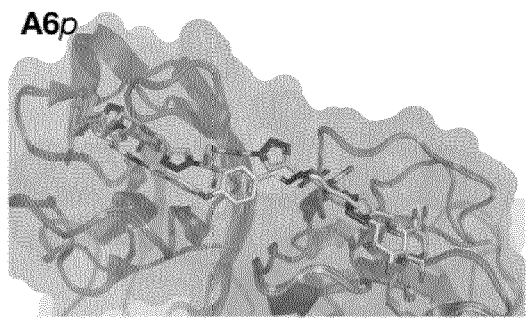
Figure 1:
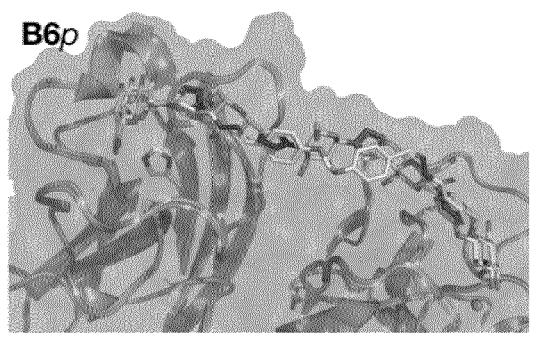
Figure 1:
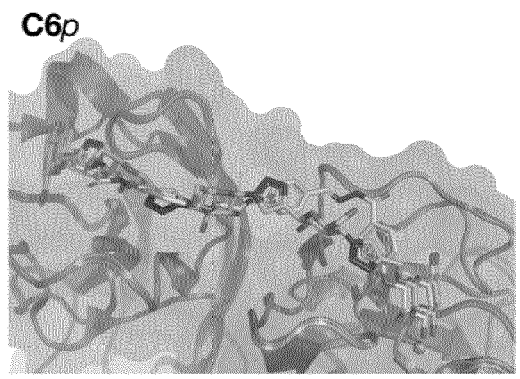
Figure 1:
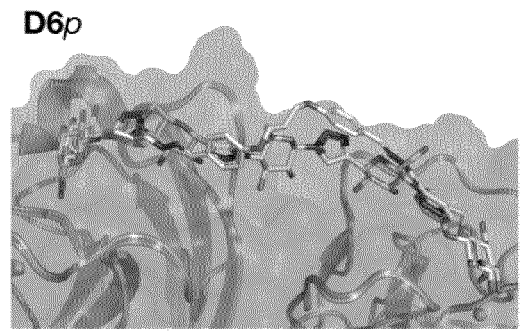
Figure 1:
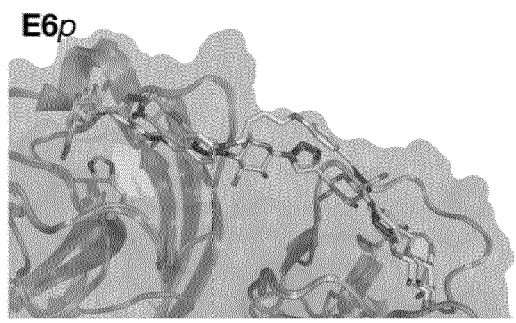

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art to which this invention belongs.

Preferably, the terms used herein are defined as described in "A multilingual glossary of biotechnological terms: (IUPAC Recommendations)", Leuenberger, H. G. W, Nagel, B. and Kölbl, H. eds. (1995), Helvetica Chimica Acta, CH-4010 Basel, Switzerland). Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Several documents (for example: patents, patent applications, scientific publications, manufacturer's specifications, instructions, GenBank Accession Number sequence submissions etc.) are cited throughout the text of this specification. Nothing herein is to be construed as an admission that the invention is not entitled to antedate such disclosure by virtue of prior invention. Some of the documents cited herein are characterized as being "incorporated by reference". In the event of a conflict between the definitions or teachings of such incorporated references and definitions or teachings recited in the present specification, the text of the present specification takes precedence.

As used herein, a first compound (e.g. a compound of the invention) is considered to "bind" to a second compound (e.g. a target protein such as LecA), if it has a dissociation constant $K_d$ to said second compound of 1 mM or less, preferably 100 μM or less, preferably 50 μM or less, preferably 30 μM or less, preferably 20 μM or less, preferably 10 μM or less, preferably 5 μM or less, more preferably 1 μM or less, more preferably 900 nM or less, more preferably 800 nM or less, more preferably 700 nM or less, more preferably 600 nM or less, more preferably 500 nM or less, more preferably 400 nM or less, more preferably 300 nM or less, more preferably 200 nM or less, even more preferably 100 nM or less, even more preferably 90 nM or less, even more preferably 80 nM or less, even more preferably 70 nM or less, even more preferably 60 nM or less, even more preferably 50 nM or less, even more preferably 40 nM or less, even more preferably 30 nM or less, even more preferably 20 nM or less, and even more preferably 10 nM or less.

The term "binding" according to the invention preferably relates to a specific binding. "Specific binding" means that a compound (e.g. a protein ligand) binds stronger to a target (e.g. a target protein or a target epitope) for which it is specific compared to the binding to another target. A compound binds stronger to a first target compared to a second target, if it binds to the first target with a dissociation constant ($K_d$) which is lower than the dissociation constant for the second target. Preferably the dissociation constant ($K_d$) for the target to which the compound binds specifically is more than 10-fold, preferably more than 20-fold, more preferably more than 50-fold, even more preferably more than 100-fold, 200-fold, 500-fold or 1000-fold lower than the dissociation constant ($K_d$) for the target to which the compound does not bind specifically.

As used herein, the term "$K_d$" (usually measured in "mol/L", sometimes abbreviated as "M") is intended to refer to the dissociation equilibrium constant of the particular interaction between a compound (e.g. a compound of the invention) and a target molecule.

Methods for determining binding affinities of compounds, i.e. for determining the dissociation constant $K_d$, are known to a person of ordinary skill in the art and can be selected for instance from the following methods known in the art: Surface Plasmon Resonance (SPR) based technology, Bio-layer interferometry (BLI), enzyme-linked immunosorbent assay (ELISA), flow cytometry, isothermal titration calorimetry (ITC), analytical ultracentrifugation, radioimmunoassay (RIA or IRMA) and enhanced chemiluminescence (ECL). Typically, the dissociation constant $K_d$ is determined at 20° C., 25° C., 30° C., or 37° C. If not specifically indicated otherwise, the $K_d$ values recited herein are determined at 25° C. by SPR and ITC, in particular at 25° C. by SPR.

In the following paragraphs, definitions of the terms: alkyl, heteroalkyl, haloalkyl, cycloalkyl, heterocycloalkyl, alicyclic system, aryl, aralkyl, heteroaryl, heteroaralkyl, alkenyl, cycloalkenyl, heteroalkenyl, heterocycloalkenyl, and alkynyl are provided. These terms will in each instance of its use in the remainder of the specification have the respectively defined meaning and preferred meanings. Nevertheless, in some instances of their use throughout the specification preferred meanings of these terms are indicated.

The definitions presented below apply in a fully analogous manner to radicals having two free bonds instead of only one free bond. Thus, the definitions provided for the terms alkyl, heteroalkyl, haloalkyl, cycloalkyl, heterocycloalkyl, aryl, aralkyl, heteroaryl, heteroaralkyl, alkenyl, cycloalkenyl, heteroalkenyl, heterocycloalkenyl, and alkynyl apply in a fully analogous manner to the terms alkanediyl, heteroalkanediyl, haloalkanediyl, cycloalkanediyl, heterocycloalkanediyl, arenediyl, aralkanediyl, heteroarenediyl, heteroaralkanediyl, alkenediyl, cycloalkenediyl, heteroalkenediyl, heterocycloalkenediyl, and alkynediyl, respectively.

The term "alkyl" refers to a saturated straight or branched carbon chain. Preferably, the chain comprises from 1 to 10 carbon atoms, i.e. 1, 2, 3, 4, 5, 6, 7, 8, 9 or 10, e.g. methyl, ethyl propyl (n-propyl or iso-propyl), butyl (n-butyl, iso-butyl, sec-butyl, tert-butyl), pentyl, hexyl, heptyl, octyl, nonyl, decyl. Alkyl groups are optionally substituted.

The term "heteroalkyl" refers to a saturated straight or branched carbon chain. Preferably, the chain comprises from 1 to 9 carbon atoms, i.e. 1, 2, 3, 4, 5, 6, 7, 8, or 9, e.g. methyl, ethyl, propyl, iso-propyl, butyl, iso-butyl, sec-butyl, tert-butyl, pentyl, hexyl, heptyl, octyl, nonyl, which is interrupted one or more times, e.g. 1, 2, 3, 4, 5, with the same or different heteroatoms. Preferably, the heteroatoms are selected from O, S, and N, e.g. —$(CH_2)_p$—X—$(CH_2)_q CH_3$, with p=0, 1, 2, 3, 4, 5, 6, 7, 8, or 9, q=0, 1, 2, 3, 4, 5, 6, 7, 8, or 9 and X=S, O or NR' with R'=H or hydrocarbon (e.g. $C_1$ to $C_6$ alkyl). In particular, "heteroalkyl" refers to —O—$CH_3$, —$OC_2H_5$, —$CH_2$—O—$CH_3$, —$CH_2$—O—$C_2H_5$, —$CH_2$—O—$C_3H_7$, —$CH_2$—O—$C_4H_9$, —$CH_2$—O—$C_5Hu$, —$C_2H_4O$—$CH_3$, —$C_2H_4$—O—$C_2H_5$, —$C_2H_4$—O—$C_3H_7$, —$C_2H_4$—O—$C_4H_9$ etc. Heteroalkyl groups are optionally substituted.

The term "haloalkyl" refers to a saturated straight or branched carbon chain in which one or more hydrogen atoms are replaced by halogen atoms, e.g. by fluorine, chlorine, bromine or iodine. Preferably, the chain comprises from 1 to 10 carbon atoms, i.e. 1, 2, 3, 4, 5, 6, 7, 8, 9 or 10. In particular, "haloalkyl" refers to —$CH_2F$, —$CHF_2$, —$CF_3$, —$C_2H_4F$, —$C_2H_3F_2$, —$C_2H_2F_3$, —$C_2HF_4$, —$C_2F_5$, —$C_3H_6F$, —$C_3H_5F_2$, —$C_3H_4F_3$, —$C_3H_3F_4$, —$C_3H_2F_5$, —$C_3HF_7$, —$C_3F_7$, —$CH_2Cl$, —$CHCl_2$, —$CCl_3$, —$C_2H_4Cl$, —$C_2H_3Cl_2$, —$C_2H_2Cl_3$, —$C_2HCl_4$, —$C_2Cl_5$, —$C_3H_6Cl$, —$C_3H_5Cl_2$, —$C_3H_4Cl_3$, —$C_3H_3Cl_4$, —$C_3H_2Cl_5$, —$C_3HCl_6$, and —$C_3Cl_7$. Haloalkyl groups are optionally substituted.

The terms "cycloalkyl" and "heterocycloalkyl", by themselves or in combination with other terms, represent, unless otherwise stated, cyclic versions of "alkyl" and "heteroalkyl", respectively, with preferably 3, 4, 5, 6, 7, 8, 9 or 10 atoms forming a ring, e.g. cyclopropyl, cyclobutyl, cyclopentyl, cyclohexyl, cycloheptyl, cyclooctyl etc. The terms "cycloalkyl" and "heterocycloalkyl" are also meant to include bicyclic, tricyclic and polycyclic versions thereof. If bicyclic, tricyclic or polycyclic rings are formed, it is preferred that the respective rings are connected to each other at two adjacent carbon atoms, however, alternatively the two rings are connected via the same carbon atom, i.e. they form a spiro ring system or they form "bridged" ring systems, preferably tricycle[$3.3.1.1^{3,7}$]decan. The term "heterocycloalkyl" preferably refers to a saturated ring having five members of which at least one member is an N, O or S atom and which optionally contains one additional O or one additional N; a saturated ring having six members of which at least one member is an N, O or S atom and which optionally contains one additional O or one additional N or two additional N atoms; or a saturated bicyclic ring having nine or ten members of which at least one member is an N, O or S atom and which optionally contains one, two or three additional N atoms. "Cycloalkyl" and "heterocycloalkyl" groups are optionally substituted. Additionally, for heterocycloalkyl, a heteroatom can occupy the position at which the heterocycle is attached to the remainder of the molecule. Examples of cycloalkyl include cyclopropyl, cyclobutyl, cyclopentyl, cyclohexyl, cycloheptyl, spiro[3,3]heptyl, spiro[3,4]octyl, spiro[4,3]octyl, spiro[3,5]nonyl, spiro[5,3]nonyl, spiro[3,6]decyl, spiro[6,3]decyl, spiro[4,5]decyl, spiro[5,4]decyl, bicyclo[2.2.1]heptyl, bicyclo[2.2.2]octyl, adamantyl, and the like. Examples of heterocycloalkyl include 1-(1,2,5,6-tetrahydropyridyl), 1-piperidinyl, 2-piperidinyl, 3-piperidinyl, 4-morpholinyl, 3-morpholinyl, 1,8-diazo-spiro[4,5]decyl, 1,7-diazo-spiro[4,5]decyl, 1,6-diazo-spiro[4,5]decyl, 2,8-diazo-spiro[4,5]decyl, 2,7-diazo-spiro[4,5]decyl, 2,6-diazo-spiro[4,5]decyl, 1,8-diazo-spiro[5,4]decyl, 1,7 diazo-spiro[5,4]decyl, 2,8-diazo-spiro[5,4]decyl, 2,7-diazo-spiro[5,4]decyl, 3,8-diazo-spiro[5,4]decyl, 3,7-diazo-spiro[5,4]decyl, 1,4-diazabicyclo[2.2.2]oct-2-yl, tetrahydrofuran-2-yl, tetrahydrofuran-3-yl, tetrahydrothien-2-yl, tetrahydrothien-3-yl, 1-piperazinyl, 2-piperazinyl, and the like.

The term "alicyclic system" refers to mono, bicyclic, tricyclic or polycyclic version of a cycloalkyl or heterocycloalkyl comprising at least one double and/or triple bond. However, an alicyclic system is not aromatic or heteroaromatic, i.e. does not have a system of conjugated double bonds/free electron pairs. Thus, the number of double and/or triple bonds maximally allowed in an alicyclic system is determined by the number of ring atoms, e.g. in a ring system with up to 5 ring atoms an alicyclic system comprises up to one double bond, in a ring system with 6 ring atoms the alicyclic system comprises up to two double bonds. Thus, the "cycloalkenyl" as defined below is a preferred embodiment of an alicyclic ring system. Alicyclic systems are optionally substituted.

The term "aryl" preferably refers to an aromatic monocyclic ring containing 6 carbon atoms, an aromatic bicyclic ring system containing 10 carbon atoms or an aromatic tricyclic ring system containing 14 carbon atoms. Examples are phenyl, naphthyl or anthracenyl. The aryl group is optionally substituted.

The term "aralkyl" refers to an alkyl moiety, which is substituted by aryl, wherein alkyl and aryl have the meaning as outlined above. An example is the benzyl radical. Preferably, in this context the alkyl chain comprises from 1 to 8 carbon atoms, i.e. 1, 2, 3, 4, 5, 6, 7, or 8, e.g. methyl, ethyl, propyl, iso-propyl, butyl, iso-butyl, sec-butyl, tert-butyl, pentyl, hexyl, heptyl, octyl. The aralkyl group is optionally substituted at the alkyl and/or aryl part of the group. Preferably the aryl attached to the alkyl has the meaning phenyl, naphthyl or anthracenyl.

The term "heteroaryl" preferably refers to a five or six-membered aromatic monocyclic ring wherein at least one of the carbon atoms is replaced by 1, 2, 3, or 4 (for the five membered ring) or 1, 2, 3, 4, or 5 (for the six membered ring) of the same or different heteroatoms, preferably selected from O, N and S; an aromatic bicyclic ring system with 8 to 12 members wherein 1, 2, 3, 4, 5, or 6 carbon atoms of the 8, 9, 10, 11 or 12 carbon atoms have been replaced with the same or different heteroatoms, preferably selected from O, N and S; or an aromatic tricyclic ring system with 13 to 16 members wherein 1, 2, 3, 4, 5, or 6 carbon atoms of the 13, 14, 15, or 16 carbon atoms have been replaced with the same or different heteroatoms, preferably selected from O, N and S. Examples are furanyl, thiophenyl, oxazolyl, isoxazolyl, 1,2,5-oxadiazolyl, 1,2,3-oxadiazolyl, pyrrolyl, imidazolyl, pyrazolyl, 1,2,3-triazolyl, thiazolyl, isothiazolyl, 1,2,3-thiadiazolyl, 1,2,5-thiadiazolyl, pyridinyl, pyrimidinyl, pyrazinyl, 1,2,3-triazinyl, 1,2,4-triazinyl, 1,3,5-triazinyl, 1-benzofuranyl, 2-benzofuranyl, indoyl, isoindoyl, benzothiophenyl, 2-benzothiophenyl, 1H-indazolyl, benzimidazolyl, benzoxazolyl, indoxazinyl, 2,1-benzosoxazoyl, benzothiazolyl, 1,2-benzisothiazolyl, 2,1-benzisothiazolyl, benzotriazolyl, quinolinyl, isoquinolinyl, 2,3-benzodiazinyl, quinoxalinyl, quinazolinyl, quinolinyl, 1,2,3-benzotriazinyl, or 1,2,4-benzotriazinyl.

The term "heteroaralkyl" refers to an alkyl moiety, which is substituted by heteroaryl, wherein alkyl and heteroaryl have the meaning as outlined above. An example is the 2-alkylpyridinyl, 3-alkylpyridinyl, or 2-methylpyridinyl radical. Preferably, in this context the alkyl chain comprises from 1 to 8 carbon atoms, i.e. 1, 2, 3, 4, 5, 6, 7, or 8, e.g. methyl, ethyl, propyl, iso-propyl, butyl, iso-butyl, sec-butyl, tert-butyl, pentyl, hexyl, heptyl, octyl. The heteroaralkyl group is optionally substituted at the alkyl and/or heteroaryl part of the group. Preferably the heteroaryl attached to the alkyl has the meaning oxazolyl, isoxazolyl, 1,2,5-oxadiazolyl, 1,2,3-oxadiazolyl, pyrrolyl, imidazolyl, pyrazolyl, 1,2,3-triazolyl, thiazolyl, isothiazolyl, 1,2,3-thiadiazolyl, 1,2,5-thiadiazolyl, pyridinyl, pyrimidinyl, pyrazinyl, 1,2,3-triazinyl, 1,2,4-triazinyl, 1,3,5-triazinyl, 1-benzofuranyl, 2-benzofuranyl, indoyl, isoindoyl, benzothiophenyl, 2-benzothiophenyl, 1H-indazolyl, benzimidazolyl, benzoxazolyl, indoxazinyl, 2,1-benzosoxazoyl, benzothiazolyl, 1,2-benzisothiazolyl, 2,1-benzisothiazolyl, benzotriazolyl, 2,3-benzodiazinyl, quinolinyl, isoquinolinyl, quinoxalinyl, quinazolinyl, quinolinyl, 1,2,3-benzotriazinyl, or 1,2,4-benzotriazinyl.

The terms "alkenyl" and "cycloalkenyl" refer to olefinic unsaturated carbon atoms containing chains or rings with one or more double bonds. Examples are propenyl and cyclohexenyl. Preferably, the alkenyl chain comprises from 2 to 8 carbon atoms, i.e. 2, 3, 4, 5, 6, 7, or 8, e.g. ethenyl, 1-propenyl, 2-propenyl, iso-propenyl, 1-butenyl, 2-butenyl, 3-butenyl, iso-butenyl, sec-butenyl, 1-pentenyl, 2-pentenyl, 3-pentenyl, 4-pentenyl, hexenyl, heptenyl, octenyl. Preferably the cycloalkenyl ring comprises from 3 to 8 carbon atoms, i.e. 3, 4, 5, 6, 7, or 8, e.g. 1-cyclopropenyl, 2-cyclopropenyl, 1-cyclobutenyl, 2-cyclobutenyl, 1-cyclopentenyl, 2-cyclopentenyl, 3-cyclopentenyl, 1-cyclohexenyl, 2-cyclohexenyl, 3-cyclohexenyl, cycloheptenyl, cyclooctenyl.

The terms "heteroalkenyl" and "heterocycloalkenyl" refer to unsaturated versions of "heteroalkyl" and "heterocycloalkyl", respectively. Thus, the term "heteroalkenyl" refers to an unsaturated straight or branched carbon chain. Preferably, the chain comprises from 1 to 9 carbon atoms, i.e. 1, 2, 3, 4, 5, 6, 7, 8, 9, which is interrupted one or more times, e.g. 1, 2, 3, 4, 5, with the same or different heteroatoms. Preferably, the heteroatoms are selected from O, S, and N. In case that one or more of the interrupting heteroatoms is N, the N may be present as an —NR'— moiety, wherein R' is hydrogen or hydrocarbon (e.g. $C_1$ to $C_6$ alkyl), or it may be present as an =N— or —N=group, i.e. the nitrogen atom can form a double bond to an adjacent C atom or to an adjacent, further N atom. "Heteroalkenyl" groups are optionally substituted. The term "heterocycloalkenyl" represents a cyclic version of "heteroalkenyl" with preferably 3, 4, 5, 6, 7, 8, 9 or 10 atoms forming a ring. The term "heterocycloalkenyl" is also meant to include bicyclic, tricyclic and polycyclic versions thereof. If bicyclic, tricyclic or polycyclic rings are formed, it is preferred that the respective rings are connected to each other at two adjacent atoms. These two adjacent atoms can both be carbon atoms; or one atom can be a carbon atom and the other one can be a heteroatom; or the two adjacent atoms can both be heteroatoms. However, alternatively the two rings are connected via the same carbon atom, i.e. they form a spiro ring system or they form "bridged" ring systems. The term "heterocycloalkenyl" preferably refers to an unsaturated ring having five members of which at least one member is an N, O or S atom and which optionally contains one additional O or one additional N; an unsaturated ring having six members of which at least one member is an N, O or S atom and which optionally contains one additional O or one additional N or two additional N atoms; or an unsaturated bicyclic ring having nine or ten members of which at least one member is an N, O or S atom and which optionally contains one, two or three additional N atoms. "Heterocycloalkenyl" groups are optionally substituted. Additionally, for heteroalkenyl and heterocycloalkenyl, a heteroatom can occupy the position at which the heterocycle is attached to the remainder of the molecule.

The term "aralkenyl" refers to an alkenyl moiety, which is substituted by aryl, wherein alkenyl and aryl have the meaning as outlined above.

The term "heteroaralkenyl" refers to an alkenyl moiety, which is substituted by heteroaryl, wherein alkenyl and heteroaryl have the meaning as outlined above.

The term "alkynyl" refers to unsaturated carbon atoms containing chains or rings with one or more triple bonds. Preferably, the alkynyl chain comprises from 2 to 8 carbon atoms, i.e. 2, 3, 4, 5, 6, 7, or 8, e.g. ethynyl, 1-propynyl, 2-propynyl, 1-butynyl, 2-butynyl, 3-butynyl, 1-pentynyl, 2-pentynyl, 3-pentynyl, 4-pentynyl, hexynyl, heptynyl, octynyl.

The terms "heteroalkynyl", "cycloalkynyl", and "heterocycloalkynyl" refer to moieties that basically correspond to "heteroalkenyl", "cycloalkenyl", and "heterocycloalkenyl", respectively, as defined above but differ from "heteroalkenyl", "cycloalkenyl", and "heterocycloalkenyl" in that at least one double bond is replaced by a triple bond.

In one embodiment, carbon atoms or hydrogen atoms in alkyl, cycloalkyl, aryl, aralkyl, alkenyl, cycloalkenyl, alkynyl radicals may be substituted independently from each other with one or more elements selected from the group consisting of O, S, N or with groups containing one or more elements, i.e. 1, 2, 3, 4, 5, 6, or more selected from the group consisting of O, S, and N. Embodiments include alkoxy, cycloalkoxy, aryloxy, aralkoxy, alkenyloxy, cycloalkenyloxy, alkynyloxy, alkylthio, cycloalkylthio, arylthio, aralkylthio, alkenylthio, cycloalkenylthio, alkynylthio, alkylamino, cycloalkylamino, arylamino, aralkylamino, alkenylamino, cycloalkenylamino, alkynylamino radicals. Other embodiments include hydroxyalkyl, hydroxycycloalkyl, hydroxyaryl, hydroxyaralkyl, hydroxyalkenyl, hydroxycycloalkenyl, hydroxyalkynyl, mercaptoalkyl, mercaptocycloalkyl, mercaptoaryl, mercaptoaralkyl, mercaptoalkenyl, mercaptocycloalkenyl, mercaptoalkynyl, aminoalkyl, aminocycloalkyl, aminoaryl, aminoaralkyl, aminoalkenyl, aminocycloalkenyl, aminoalkynyl radicals.

In another embodiment, one or more hydrogen atoms, e.g. 1, 2, 3, 4, 5, 6, 7, or 8 hydrogen atoms in alkyl, heteroalkyl, cycloalkyl, heterocycloalkyl, alicyclic system, aryl, aralkyl, heteroaryl, heteroaralkyl, alkenyl, cycloalkenyl, heteroalkenyl, heterocycloalkenyl, alkynyl radicals may be substituted independently from each other with one or more halogen atoms, e.g. Cl, F, or Br. One preferred radical is the trifluoromethyl radical.

If two or more radicals can be selected independently from each other, then the term "independently" means that the radicals may be the same or may be different.

The term "optionally substituted" in each instance if not further specified refers to halogen (in particular F, Cl, Br, or I), —NO$_2$, —CN, —OR''', —NR'R'', —COOR''', —CONR'R'', —NR'COR'', —NR''COR''', —NR'CONR'R'', —NR'SO$_2$E, —COR'''; —SO$_2$NR'R'', —OOCR''', —CR''R''''OH, —R'''OH, and -E;

R' and R'' is each independently selected from the group consisting of hydrogen, alkyl, alkenyl, alkynyl, cycloalkyl, heterocycloalkyl, aryl, aralkyl, and heteroaryl or together form a heteroaryl, or heterocycloalkyl;

R''' and R'''' is each independently selected from the group consisting of hydrogen, alkyl, alkenyl, alkynyl, cycloalkyl, heterocycloalkyl, alkoxy, aryl, aralkyl, heteroaryl, and —NR'R'';

E is selected from the group consisting of alkyl, alkenyl, alkynyl, cycloalkyl, alkoxy, alkoxyalkyl, heterocycloalkyl, an alicyclic system, aryl and heteroaryl; optionally substituted.

As used herein, the expression "wherein the (CH$_2$)$_n$ group optionally carries a label" means that one or more hydrogen atoms of the (CH$_2$)$_n$ group are optionally replaced by a chemical group comprising a "label". The chemical group replacing the hydrogen atom(s) may comprise a linker that connects the (CH$_2$)$_n$ group to the "label".

As used herein, a "label" refers to any chemical group detectable by physical, chemical or biological means. "Labels" that are particularly well-suited for carrying out the present invention are chemical groups that are detectable by spectroscopic techniques, such as florescence spectroscopy, positron-emission tomography (PET), or magnetic resonance imaging (MRI).

"r.t." is an abbreviation for room temperature.

"iPr" is an abbreviation for an isopropyl group, i.e. for —CH(CH$_3$)$_2$.

"Pharmaceutically acceptable" means approved by a regulatory agency of the Federal or a state government or listed in the U.S. Pharmacopeia (United States Pharmacopeia-33/National Formulary-28 Reissue, published by the United States Pharmacopeial Convention, Inc., Rockville Md., publication date: April 2010) or other generally recognized pharmacopeia for use in animals, and more particularly in humans.

The term "pharmaceutically acceptable salt" refers to a salt of a compound of the present invention. Suitable pharmaceutically acceptable salts of the compound of the present invention include acid addition salts which may, for example, be formed by mixing a solution of a compound described herein or a derivative thereof with a solution of a pharmaceutically acceptable acid such as hydrochloric acid, sulfuric acid, fumaric acid, maleic acid, succinic acid, acetic acid, benzoic acid, citric acid, tartaric acid, carbonic acid or phosphoric acid. Furthermore, where the compound of the invention carries an acidic moiety, suitable pharmaceutically acceptable salts thereof may include alkali metal salts (e.g., sodium or potassium salts); alkaline earth metal salts (e.g., calcium or magnesium salts); and salts formed with suitable organic ligands (e.g., ammonium, quaternary ammonium and amine cations formed using counteranions such as halide, hydroxide, carboxylate, sulfate, phosphate, nitrate, alkyl sulfonate and aryl sulfonate). Illustrative examples of pharmaceutically acceptable salts include but are not limited to: acetate, adipate, alginate, ascorbate, aspartate, benzenesulfonate, benzoate, bicarbonate, bisulfate, bitartrate, borate, bromide, butyrate, calcium edetate, camphorate, camphorsulfonate, camsylate, carbonate, chloride, citrate, clavulanate, cyclopentanepropionate, digluconate, dihydrochloride, dodecylsulfate, edetate, edisylate, estolate, esylate, ethanesulfonate, formate, fumarate, gluceptate, glucoheptonate, gluconate, glutamate, glycerophosphate, glycolylarsanilate, hemisulfate, heptanoate, hexanoate, hexylresorcinate, hydrabamine, hydrobromide, hydrochloride, hydroiodide, 2-hydroxyethanesulfonate, hydroxynaphthoate, iodide, isothionate, lactate, lactobionate, laurate, lauryl sulfate, malate, maleate, malonate, mandelate, mesylate, methanesulfonate, methylsulfate, mucate, 2-naphthalenesulfonate, napsylate, nicotinate, nitrate, N-methylglucamine ammonium salt, oleate, oxalate, pamoate (embonate), palmitate, pantothenate, pectinate, persulfate, 3-phenylpropionate, phosphate/diphosphate, picrate, pivalate, polygalacturonate, propionate, salicylate, stearate, sulfate, subacetate, succinate, tannate, tartrate, teoclate, tosylate, triethiodide, undecanoate, valerate, and the like (see, for example, Berge, S. M., et al, "Pharmaceutical Salts", Journal of Pharmaceutical Science, 1977, 66, 1-19). Certain specific compounds of the present invention contain both basic and acidic functionalities that allow the compounds to be converted into either base or acid addition salts.

The neutral forms of the compounds may be regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

In addition to salt forms, the present invention provides compounds which are in a prodrug form. Prodrugs of the compounds described herein are those compounds that readily undergo chemical changes under physiological conditions to provide a compound of formula I, II, VII, or VIII. A prodrug is an active or inactive compound that is modified chemically through in vivo physiological action, such as hydrolysis, metabolism and the like, into a compound of this invention following administration of the prodrug to a patient. Additionally, prodrugs can be converted to the compounds of the present invention by chemical or biochemical methods in an ex vivo environment. For example, prodrugs can be slowly converted to the compounds of the present invention when placed in a transdermal patch reservoir with a suitable enzyme. The suitability and techniques involved in making and using prodrugs are well known by those skilled in the art. For a general discussion of prodrugs involving esters, see Svensson L. A. and Tunek A. (1988) Drug Metabolism Reviews 19(2): 165-194 and Bundgaard H. "Design of Prodrugs", Elsevier Science Ltd. (1985). Examples of a masked carboxylate anion include a variety of esters, such as alkyl (for example, methyl, ethyl), cycloalkyl (for example, cyclohexyl), aralkyl (for example, benzyl, p-methoxybenzyl), and alkylcarbonyloxyalkyl (for example, pivaloyloxymethyl). Amines have been masked as arylcarbonyloxymethyl substituted derivatives which are cleaved by esterases in vivo releasing the free drug and formaldehyde (Bundgaard H. et al. (1989) J. Med. Chem. 32(12): 2503-2507). Also, drugs containing an acidic NH group, such as imidazole, imide, indole and the like, have been masked with N-acyloxymethyl groups (Bundgaard H. "Design of Prodrugs", Elsevier Science Ltd. (1985)). Hydroxy groups have been masked as esters and ethers. EP 0 039 051 A2 discloses Mannich-base hydroxamic acid prodrugs, their preparation and use.

Certain compounds of the present invention possess asymmetric carbon atoms (optical centers) or double bonds; the racemates, diastereomers, geometric isomers, regioisomers and individual isomers (e.g., separate enantiomers) are all intended to be encompassed within the scope of the present invention. The compounds of the present invention may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

As used herein, a "patient" means any mammal or bird that may benefit from a treatment with the compounds described herein. Preferably, a "patient" is selected from the group consisting of laboratory animals (e.g. mouse or rat), domestic animals (including e.g. guinea pig, rabbit, chicken, turkey, pig, sheep, goat, camel, cow, horse, donkey, cat, or dog), or primates including chimpanzees and human beings. It is particularly preferred that the "patient" is a human being.

As used herein, "treat", "treating" or "treatment" of a disease or disorder means accomplishing one or more of the following: (a) reducing the severity of the disorder; (b) limiting or preventing development of symptoms characteristic of the disorder(s) being treated; (c) inhibiting worsening of symptoms characteristic of the disorder(s) being treated; (d) limiting or preventing recurrence of the disorder(s) in patients that have previously had the disorder(s); and (e) limiting or preventing recurrence of symptoms in patients that were previously symptomatic for the disorder(s).

As used herein, "prevent", "preventing", "prevention", or "prophylaxis" of a disease or disorder means preventing that a disorder occurs in a subject for a certain amount of time. For example, if a compound described herein is administered to a subject with the aim of preventing a disease or disorder, said disease or disorder is prevented from occurring at least on the day of administration and preferably also on one or more days (e.g. on 1 to 30 days; or on 2 to 28 days; or on 3 to 21 days; or on 4 to 14 days; or on 5 to 10 days) following the day of administration.

A "pharmaceutical composition" according to the invention may be present in the form of a composition, wherein the different active ingredients and diluents and/or carriers are admixed with each other, or may take the form of a combined preparation, where the active ingredients are present in partially or totally distinct form. An example for such a combination or combined preparation is a kit-of-parts.

An "effective amount" is an amount of a therapeutic agent sufficient to achieve the intended purpose. The effective amount of a given therapeutic agent will vary with factors such as the nature of the agent, the route of administration, the size and species of the animal to receive the therapeutic agent, and the purpose of the administration. The effective amount in each individual case may be determined empirically by a skilled artisan according to established methods in the art.

The term "carrier", as used herein, refers to a diluent, adjuvant, excipient, or vehicle with which the therapeutic agent is administered. Such pharmaceutical carriers can be sterile liquids, such as saline solutions in water and oils, including those of petroleum, animal, vegetable or synthetic origin, such as peanut oil, soybean oil, mineral oil, sesame oil and the like. A saline solution is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatine, malt, rice flour, chalk, silica gel, sodium stearate, glycerol monostearate, talc, sodium chloride, dried skim milk, glycerol, propylene glycol, water, ethanol and the like. The composition, if desired, can also contain minor amounts of wetting or emulsifying agents, or pH buffering agents. These compositions can take the form of solutions, suspensions, emulsions, tablets, pills, capsules, powders, sustained-release formulations and the like. The composition can be formulated as a suppository, with traditional binders and carriers such as triglycerides. The compounds of the invention can be formulated as neutral or salt forms, as described above. Examples of suitable pharmaceutical carriers are described in "Remington's Pharmaceutical Sciences" by E. W. Martin. Such compositions will contain a therapeutically effective amount of the compound, preferably in purified form, together with a suitable amount of carrier so as to provide the form for proper administration to the patient. The formulation should suit the mode of administration.

EMBODIMENTS OF THE INVENTION

The present invention will now be further described. In the following passages different aspects of the invention are defined in more detail. Each aspect defined below may be combined with any other aspect or aspects unless clearly indicated to the contrary. In particular, any feature indicated as being preferred or advantageous may be combined with any other feature or features indicated as being preferred or advantageous.

In a first aspect the present invention is directed to a compound of the general structure (I):

$$R^2\text{-}A^1\text{-}R^4\text{—}B^1\text{—}R^1\text{—}B^2\text{—}R^{4'}\text{-}A^2\text{-}R^{2'} \qquad (I)$$

or of the general structure (II)

$$R^2\text{-}A^1\text{-}R^4\text{—}B^1\text{—}R^5 \qquad (II)$$

wherein $R^2$ and $R^{2'}$ are independently from each other selected from the group consisting of galactose, GalNAc, 2-deoxy-galactose, and epoxides of galactoheptose, wherein the —O— group forming the linkage between $R^2$ and $A^1$ and/or the —O— group forming the linkage between $R^{2'}$ and $A^2$ may be replaced independently from each other by an —S— group, an —NH— group, or a —CH$_2$— group;

$A^1$ and $A^2$ are independently from each other selected from the group consisting of (a) an arenediyl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$SO_3H$, and (b) a heteroarenediyl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$SO_3H$;

$R^4$ is selected from the group consisting of —CO—NH—N=CH—; —$CH_2$—$CH_2$—CO—NH—; E- or Z- —CO—NH—CH=CH—, E- or Z- —CH=CH—CO—NH—; —CO—NH—$CH_2$—$CH_2$—; —NH—CO—$CH_2$—$CH_2$—; E- or Z- —CH=CH—NH—CO—; E- or Z- —NH—CO—CH=CH—; and —$CH_2$—$CH_2$—NH—CO—;

$R^{4'}$ is selected from the group consisting of —CH=N—NH—CO—; —NH—CO—$CH_2$—$CH_2$—; E- or Z- —CH=CH—NH—CO—; E- or Z- —NH—CO—CH=CH—; —$CH_2$—$CH_2$—NH—CO—; —$CH_2$—$CH_2$—CO—NH—; E- or Z- —CO—NH—CH=CH—; E- or Z- —CH=CH—CO—NH—; and —CO—NH—$CH_2$—$CH_2$—;

$B^1$ and $B^2$ are independently from each other selected from the group consisting of (a) an arenediyl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$SO_3H$, (b) a heteroarenediyl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$SO_3H$; and (c) a $C_3$ to $C_7$ cycloalkanediyl group, optionally substituted by one or more substituents selected from the group consisting of halogen, —CN, —$NH_2$, —$NR^{11}R^{12}$, —NH—CO—$R^{11}$, —NH—$SO_2$—$R^{11}$, —OR", —$SR^{11}$, —$SO_2R^{11}$, —$COOR^{11}$, —$NO_2$, -triazole-$R^1$, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$CH_2$—$R^{11}$;

wherein $R^{12}$ is a $C_1$-$C_4$ alkyl group; and wherein $R^{11}$ is selected from the group consisting of
hydrogen,
a $C_1$-$C_4$ alkyl group,
an aryl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, and —$SO_3H$, and a heteroaryl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, and —$SO_3H$, (d) a $C_1$-$C_6$ alkanediyl group, optionally substituted by one or more substituents selected from the group consisting of halogen, —CN, —$NH_2$, —$NR^{11}R^{12}$, —NH—CO—$R^1$, —NH—$SO_2$—$R^{11}$, —OR", —$SR^{11}$, —$SO_2R^{11}$, —$COOR^1$, —$NO_2$, -triazole-$R^{11}$, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$CH_2$—Ru;

wherein $R^{12}$ is a $C_1$-$C_4$ alkyl group; and wherein $R^{11}$ is selected from the group consisting of
hydrogen,
a $C_1$-$C_4$ alkyl group,
an aryl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, and —$SO_3H$, and a heteroaryl group that is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, and —$SO_3H$;

$R^1$ is selected from the group consisting of —O—, —S—, —NH—, —CO—NH—, —NH—CO—, —C(O)—, —$X^1(CH_2)_nX^2$—, wherein n is 1, 2, 3, 4, or 5; and $X^1$ and $X^2$ are independently from each other selected from the group consisting of —O—, —S—, —NH—, —CO—NH—, —NH—CO—, and —C(O)—;

wherein the $(CH_2)$, group optionally carries a label that is linked to the $(CH_2)_4$ group by an alkyl group, a heteroalkyl group, an aryl-alkyl group, a heteroaryl-alkyl group, an aryl-heteroalkyl group or a heteroaryl-heteroalkyl group, wherein any of these groups can be optionally substituted; and $R^5$ is —O—$C_{1-6}$ alkyl;

or a salt thereof or a solvate thereof or a prodrug thereof.

In an embodiment of the first aspect, $R^2$ and $R^{2'}$ are independently from each other selected from the group consisting of the formulae (III) to (VI):

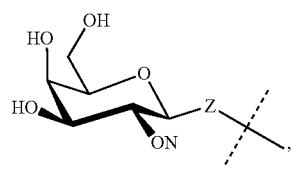

(III)

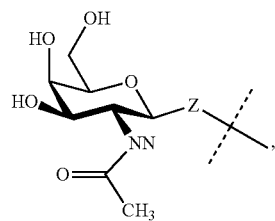

(IV)

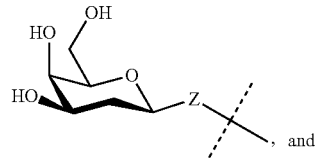

(V)

, and

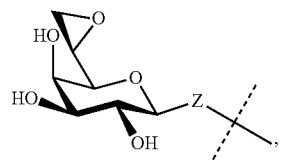

(VI)

wherein Z is selected from the group consisting of O, S, NH, and $CH_2$.

In an embodiment of the first aspect, $A^1$ and $A^2$ are independently from each other selected from the group consisting of
(i) a phenylene group;
(ii) a naphthalenediyl group;
(iii) a five-membered aromatic monocyclic ring, wherein 1, 2, 3, or 4 of the ring atoms are the same or different heteroatoms, said heteroatoms being selected from O, N, or S;
(iv) a six-membered aromatic monocyclic ring, wherein 1, 2, 3, 4, or 5 of the ring atoms are the same or different heteroatoms, said heteroatoms being selected from O, N, or S; and
(v) an aromatic bicyclic ring system with 8 to 12 members, wherein 1, 2, 3, 4, 5, or 6 of the ring atoms are the same or different heteroatoms, said heteroatoms being selected from O, N, or S;

wherein each one of the above mentioned groups (i) to (v) is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —$NH_2$, —$NHR^{13}$ with $R^{13}$ being a $C_1$-$C_4$ alkyl group, —$NR^{13}R^{14}$ with $R^{13}$ and $R^{14}$ each being independently from each other a $C_1$-$C_4$ alkyl group, —$NO_2$, —CN, —COOH, —$COOR^{13}$ with $R^{13}$ being a $C_1$-$C_4$ alkyl group, —$CONH_2$, —$CONHR^{13}$ with $R^{13}$ being a $C_1$-$C_4$ alkyl group, —$CONR^{13}R^{14}$ with $R^{13}$ and $R^{14}$ each being independently from each other a $C_1$-$C_4$ alkyl group, and —$SO_3H$.

In an embodiment of the first aspect, $R^4$ and $R^{4'}$ form a symmetric combination, i.e. the atoms forming the group $R^{4'}$ are arranged in the reverse order of the atoms forming the group $R^4$. More specifically, it is preferred that $R^4$ and $R^{4'}$ form one of the following combinations:

(a) $R^4$ is —CO—NH—N=CH— and $R^{4'}$ is —CH=N—NH—CO—;
(b) $R^4$ is —$CH_2$—$CH_2$—CO—NH— and $R^{4'}$ is —NH—CO—$CH_2$—$CH_2$—;
(c) $R^4$ is E-—CO—NH—CH=CH— and $R^{4'}$ is E-—CH=CH—NH—CO—;
(d) $R^4$ is Z-—CO—NH—CH=CH— and $R^{4'}$ is Z-—CH=CH—NH—CO—;
(e) $R^4$ is E-—CH=CH—CO—NH— and $R^{4'}$ is E-—NH—CO—CH=CH—;
(f) $R^4$ is Z-—CH=CH—CO—NH— and $R^{4'}$ is Z-—NH—CO—CH=CH—;
(g) $R^4$ is —CO—NH—$CH_2$—$CH_2$— and $R^{4'}$ is —$CH_2$—$CH_2$—NH—CO—:
(h) $R^4$ is —NH—CO—$CH_2$—$CH_2$—; and $R^{4'}$ is —$CH_2$—$CH_2$—CO—NH—;
(i) $R^4$ is E-—CH=CH—NH—CO—; and $R^{4'}$ is E-—CO—NH—CH=CH—;
(j) $R^4$ is Z-—CH=CH—NH—CO—; and $R^{4'}$ is Z-—CO—NH—CH=CH—;
(k) $R^4$ is E-—NH—CO—CH=CH—; and $R^{4'}$ is E-—CH=CH—CO—NH—;
(l) $R^4$ is Z-—NH—CO—CH=CH—; and $R^{4'}$ is Z-—CH=CH—CO—NH—; or
(m) $R^4$ is —$CH_2$—$CH_2$—NH—CO—; and $R^{4'}$ is —CO—NH—$CH_2$—$CH_2$—.

In an embodiment of the first aspect, $B^1$ and $B^2$ are independently from each other selected from the group consisting of
(i) a phenylene group;
(ii) a naphthalenediyl group;
(iii) a five-membered aromatic monocyclic ring, wherein 1, 2, 3, or 4 of the ring atoms are the same or different heteroatoms, said heteroatoms being selected from O, N, or S;
(iv) a six-membered aromatic monocyclic ring, wherein 1, 2, 3, 4, or 5 of the ring atoms are the same or different heteroatoms, said heteroatoms being selected from O, N, or S; and (v) an aromatic bicyclic ring system with 8 to 12 members, wherein 1, 2, 3, 4, 5, or 6 of the ring atoms are the same or different heteroatoms, said heteroatoms being selected from O, N, or S;
(vi) a $C_3$ to $C_7$ cycloalkanediyl group; and
(vii) a $C_1$-$C_6$ alkanediyl group;
wherein each one of the above-listed groups (i) to (v) is optionally substituted by one, two or three substituents that are independently from each other selected from the group consisting of a $C_1$-$C_4$ alkyl group, halogen, a $C_1$-$C_4$ haloalkyl group, —OH, a $C_1$-$C_4$ alkoxy group, —NH$_2$, —NHR$^{13}$ with R$^{13}$ being a $C_1$-$C_4$ alkyl group, —NR$^{13}$R$^{14}$ with R$^{13}$ and R$^{14}$ each being independently from each other a $C_1$-$C_4$ alkyl group, —NO$_2$, —CN, —COOH, —COOR$^{13}$ with R$^{13}$ being a $C_1$-$C_4$ alkyl group, —CONH$_2$, —CONHR$^{13}$ with R$^{13}$ being a $C_1$-$C_4$ alkyl group, —CONR$^{13}$R$^{14}$ with R$^{13}$ and R$^{14}$ each being independently from each other a $C_1$-$C_4$ alkyl group, and —SO$_3$H; and
wherein each one of the above listed groups (vi) to (vii) is optionally substituted by one or more substituents selected from the group consisting of halogen, —CN, —NH$_2$, —NR$^{11}$R$^{12}$, —NH—CO—R$^{11}$, —NH—SO$_2$—R$^{11}$, —OR$^{11}$, —SR$^{11}$, —SO$_2$R$^{11}$, —COOR$^{11}$, —NO$_2$, -triazole-R$^1$, —CONH$_2$, —CONHR$^{13}$ with R$^{13}$ being a $C_1$-$C_4$ alkyl group, —CONR$^{13}$R$^{14}$ with R$^{13}$ and R$^{14}$ each being independently from each other a $C_1$-$C_4$ alkyl group, and —CH$_2$—R$^{11}$; wherein R$^{12}$ is a $C_1$-$C_4$ alkyl group; and R$^{11}$ is selected from the group consisting of hydrogen and a $C_1$-$C_4$ alkyl group.

In an embodiment of the first aspect, the compound has the following structure (VII)

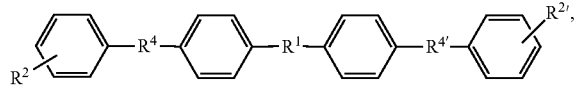

(VII)

or the following structure (VIII)

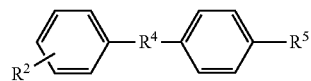

(VIII)

wherein
R$^2$ is in meta or para position; and
R$^{2'}$ is in meta or para position.

In an embodiment of the first aspect, the compound exhibits a binding affinity to LecA with a K$_D$ value of 500 nM or less, preferably 400 nM or less, more preferably 300 nM or less, more preferably 200 nM or less, more preferably 100 nM or less, even more preferably 90 nM or less, even more preferably 80 nM or less, even more preferably 70 nM or less, even more preferably 60 nM or less, even more preferably 50 nM or less, even more preferably 40 nM or less, even more preferably 30 nM or less, even more preferably 20 nM or less, and most preferably 10 nM or less.

In an embodiment of the first aspect, the (CH$_2$), group (i.e. the (CH$_2$), group within the —X$^1$(CH$_2$)$_n$X$^2$— group that is one possible definition of R$^1$) carries a label, and the (CH$_2$)$_n$ group has the following structure:

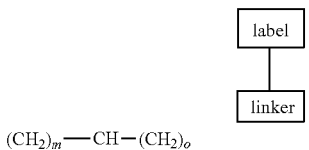

$(CH_2)_m$—CH—$(CH_2)_o$ wherein
m is 0, 1, 2, or 3,
is 0, 1, 2, or 3,
the sum of m+o is ≤4, and
"linker" is an alkyl group, a heteroalkyl group, an arylalkyl group, a heteroaryl-alkyl group, an aryl-heteroalkyl group or a heteroaryl-heteroalkyl group, wherein any of these groups can be optionally substituted.

In a further embodiment of the first aspect, the (CH$_2$)$_n$ group carries said label, and said label is a chemical group detectable by fluorescence spectroscopy, by positron-emission tomography (PET), or by magnetic resonance imaging (MRI).

In a further embodiment of the first aspect, the label detectable by fluorescence spectroscopy is fluorescein.

Suitable labels detectable by PET include groups carrying $^{18}$F substituents.

Suitable labels detectable by MRI include Gd-III carrying chelators or iron oxide nanoparticles.

In a second aspect the present invention is directed to a pharmaceutical composition comprising the compound according to the first aspect, and optionally comprising one or more constituents selected from the group consisting of a pharmaceutically acceptable carrier, a diluent, an excipient and an anti-bacterial therapeutic agent.

In a third aspect the present invention is directed to a compound according to the first aspect for use in medicine.

In a fourth aspect the present invention is directed to a compound according to the first aspect, optionally in combination with one or more anti-bacterial therapeutic agent(s),
for use in the prophylaxis or treatment of *Pseudomonas aeruginosa* infections in a patient, or
for use in the prophylaxis or treatment of *Pseudomonas aeruginosa*-associated respiratory tract infections in a patient suffering from cystic fibrosis.

In some embodiments of the fourth aspect, the one or more antibacterial therapeutic agent(s) are selected from the group consisting of β-lactam antibiotics (including penicillins, cephalosprorins, carbapenems, and monobactams), fluoroquinolones, tetracyclins, macrolide antibiotics, aminoglycosides, peptide antibiotics, lincosamides, and streptogramins.

In a fifth aspect the present invention is directed to a compound according to the first aspect for use in in vivo infection imaging.

In a sixth aspect the present invention is directed to a use of a compound according to the first aspect for in vitro biofilm imaging and in vitro screening assays, preferably for imaging biofilms produced by *Pseudomonas aeruginosa*.

EXAMPLES

The following examples are put forth so as to provide those of ordinary skill in the art with a complete disclosure and description of how to make and use the compounds, compositions and methods of the invention, and are not intended to limit the scope of what the inventors regard as their invention. Efforts have been made to ensure accuracy with respect to numbers used but some experimental errors and deviations should be accounted for. Unless indicated otherwise, molecular weight is average molecular weight, temperature is in degrees centigrade, and pressure is at or near atmospheric.

Material and Methods

Chemical Synthesis

General experimental details. $^1$H-NMR and $^{13}$C-NMR spectra were recorded on Bruker Avance III 500 UltraShield spectrometer at 500 MHz and 126 MHz. Chemical shift (δ) are given in ppm and were calibrated on residual solvent peaks: chloroform-$d_1$ ($^1$H-NMR δ=7.26 ppm, $^{13}$C-NMR δ=77.0 ppm), methanol-$d_4$ ($^1$H-NMR δ=3.31 ppm, $^{13}$C-NMR S=49.0 ppm), dimethyl sulfoxide-$d_6$ ($^1$H-NMR δ=2.50 ppm, $^{13}$C-NMR δ=39.51 ppm).[1] Deuterated solvents were purchased from Sigma-Aldrich. Multiplicities are specified as s=singlet, d=doublet, t=triplet, q=quartet, m=multiplet. The spectra were assigned with the help of $^1$H, $^1$H—COSY; $^1$H, $^{13}$C-HSQC and $^1$H, $^{13}$C-HMBC experiments.

Thin layer chromatography (TLC) was performed using silica gel 60 aluminium plates containing fluorescent indicator by Merck (Merck KGaA, Darmstadt, Germany) and developed under UV light (254 nm) and molybdate solution (0.02 M solution of $(NH_4)_4Ce(SO_4)_4 \cdot 2H_2O$ and $(NH_4)_6Mo_7O_{24} \cdot 4H_2O$ in aqueous 10% $H_2SO_4$) or potassium permanganate solution (3 g of $KMnO_4$, 20 g of $K_2CO_3$ in 5 mL of 5% NaOH and 300 mL of water) with heating.

Medium pressure liquid chromatography (MPLC) was performed on a Teledyne Isco Combiflash Rf200 system using self-packed silica gel columns (60 Å, 400 mesh particle size, Fluka) or pre-packed silica gel 60 Å columns from Macherey-Nagel ($C_{18}$ ec, endcapped). Analytical HPLC-MS was performed on a Thermo Dionex Ultimate 3000 HPLC coupled to a Bruker amaZon SL mass spectrometer, with UV detection at 254 nm using a RP-18 column (100/2 Nucleoshell RP18plus, 2.7 μM from Machery Nagel, Germany) as stationary phase.

High resolution mass spectrometry (HRMS) was performed on an Ultimate 3000 UPLC system coupled to a Q Exactive Focus Orbitrap system with HESI source (Thermo Fisher, Dreieich, Germany). UPLC was operated with C18 column (EC 150/2 Nucleodur C18 Pyramid, 3 μm from Macherey-Nagel, Germany).

Preparative high-pressure liquid chromatography (HPLC) was performed on Waters 2545 Binary Gradient Module with a Waters 2489 UV/Vis detector using a RP-18 column (250/21 Nucleodur C18 Gravity SB, 5 μM from Macherey-Nagel, Germany).

Commercial chemicals and solvents were used without further purification.

Compounds Synthesis

β-D-galactopyranose pentaacetate (2)

β-D-galactopyranose pentaacetate was obtained following the procedure of Cohen et al.[2] D-galactose (100 g, 0.56 mol), acetic anhydride (600 mL, 6.35 mol) and anhydrous sodium acetate (50.08 g, 0.61 mol) were heated to 100° C. for 20 minutes. The mixture was allowed to cool down to room temperature, poured over 1600 mL of ice water and stirred for 1 hour. The product was extracted with dichloromethane, washed with water, dried over anhydrous $Na_2SO_4$, filtered and evaporated to a syrup. Crude product was purified by crystallisation from ethanol (81.3 g, 0.21 mol, 38%).

$^1$H NMR (500 MHz, $CDCl_3$) δ 5.70 (d, J=8.3 Hz, 1H, H-1), 5.42 (d, J=3.4, 1H, H-4), 5.33 (dd, J=10.4, 8.3 Hz, 1H, H-2), 5.07 (dd, J=10.4, 3.3 Hz, 1H, H-3), 4.19-4.08 (m, 2H, H-6), 4.05 (t, J=6.5 Hz, 1H, H-5), 2.16 (s, 3H, $CH_3$), 2.12 (s, 3H, $CH_3$), 2.04 (d, J=0.7 Hz, 6H, $CH_3$), 199 (s, 3H, $CH_3$).

$^{13}$C NMR (126 MHz, $CDCl_3$) δ 170.50 (C=O), 170.27 (C=O), 170.11 (C=O), 169.57 (C=O), 169.13 (C=O), 92.30 (C-1), 71.85 (C-5), 7099 (C-3), 6796 (C-2), 66.94 (C-4), 61.18 (C-6), 2097 ($CH_3$), 20.82 ($CH_3$), 20.81 ($CH_3$), 20.78 ($CH_3$), 20.70 ($CH_3$).

HPLC-MS: $[C_{16}H_{22}O_{11}+Na]^+$ calcd. 413.11, found 413.05.

m-Methoxycarbonylphenyl 2,3,4,6-tetra-O-acetyl-β-D-galactopyranoside (3m)

β-D-galactopyranose pentaacetate (1, 2.72 g, 6.97 mmol) and methyl-3-hydroxybenzoate (3.09 g, 20.4 mmol) were dissolved in dry dichloromethane (20 mL). Reaction mixture was cooled to 0° C. and $BF_3 \cdot OEt_2$ (2.5 mL, 20.3 mmol) was added dropwise. Mixture was allowed to warm to room temperature and stirred overnight. The reaction was poured over ice cold saturated $NaHCO_3$ and diluted with dichloromethane. Organic phase was washed with saturated $NaHCO_3$ and brine, dried over anhydrous $Na_2SO_4$, filtered and concentrated in vacuo. The product was purified by normal phase MPLC (petrol ether/ethyl acetate, 5-50% ethyl acetate). 3m was obtained as a white solid (2.34 g, 4.84 mmol, 69%).[3]

$^1$H NMR (500 MHz, $CDCl_3$) δ 7.75 (d, J=7.7 Hz, 1H, ArH), 7.66 (dd, J=2.3, 1.5 Hz, 1H, ArH), 7.37 (t, J=8.0 Hz, 1H, ArH), 7.19 (ddd, J=8.2, 2.5, 0.8 Hz, 1H, ArH), 5.51 (dd, J=10.4, 7.9 Hz, 1H, H-2), 5.47 (d, J=3.3 Hz, 1H, H-4), 5.12 (dd, J=10.3, 3.6 Hz, 1H, H-3), 5.11 (d, J=7.9 Hz, 1H, H-1), 4.24-4.15 (m, 2H, H-6), 4.11 (t, J=6.2 Hz, 1H, H-5), 3.91 (s, 3H, $OCH_3$), 2.18 (s, 3H, $CH_3$), 2.07 (s, 3H, $CH_3$), 2.07 (s, 3H, $CH_3$), 2.01 (s, 3H, $CH_3$). $^{13}$C NMR (126 MHz, $CDCl_3$) δ 170.62 ($CH_3C$=O), 170.37 ($CH_3C$=O), 170.24 ($CH_3C$=O), 169.53 ($CH_3C$=O), 166.50 (C=O), 156.99 (ArC), 131.85 (ArC), 129.74 (ArCH), 124.59 (ArCH), 122.00 (ArCH), 117.50 (ArCH), 99.49 (C-1), 71.37 (C-5), 70.91 (C-3), 68.67 (C-2), 67.03 (C-4), 61.62 (C-6), 52.44 ($OCH_3$), 20.89 ($CH_3$), 20.81 ($CH_3$), 20.73 ($CH_3$), 20.73 ($CH_3$).

HPLC-MS: $[C_{22}H_{26}O_{12}+Na]^+$ calcd. 505.13, found 505.12.

p-Methoxycarbonylphenyl 2,3,4,6-tetra-O-acetyl-β-D-galactopyranoside (3p)

β-D-galactopyranose pentaacetate (1, 4.18 g, 10.71 mmol) and methyl-4-hydroxybenzoate (4.8 g, 31.2 mmol) were dissolved in dry dichloromethane (20 mL). Reaction mixture was cooled to 0° C. and $BF_3 \cdot OEt_2$ (2.5 mL, 20.3 mmol) were added dropwise. Mixture was allowed to warm to room temperature and stirred overnight. The reaction was poured over ice cold saturated $NaHCO_3$ and diluted with dichloromethane. Organic phase was washed with saturated $NaHCO_3$ and brine, dried over anhydrous $Na_2SO_4$, filtered and concentrated in vacuo. 3p was purified by crystallisation from ethanol (2.45 g, 5.08 mmol, 47%).[4]

$^1$H NMR (500 MHz, $CDCl_3$) δ 8.06-7.95 (m, 2H, ArH), 7.08-6.96 (m, 2H, ArH), 5.51 (dd, J=10.4, 7.9 Hz, 1H, H-2), 5.47 (d, J=3.4 Hz, 1H, H-4), 5.17-5.07 (m, 2H, H-1, H-3), 4.25-4.14 (m, 2H, H-6), 4.10 (t, J=6.5 Hz, 1H, H-5), 3.90 (s, 3H, $CH_3$), 2.19 (s, 3H, $CH_3$), 2.07 (d, J=2.9 Hz, 6H, $CH_3$), 2.02 (s, 3H, $CH_3$), 1.59 (s, 3H, $CH_3$).

$^{13}$C NMR (126 MHz, CDCl$_3$) δ 170.50 (CH$_3$C=O), 170.34 (CH$_3$C=O), 170.24 (CH$_3$C=O), 169.49 (CH$_3$C=O), 166.60 (C=O), 160.36 (ArC), 131.72 (2C, ArCH), 125.19 (ArC), 116.29 (2C, ArCH), 98.92 (C-1), 71.40 (C-5), 70.87 (C-3), 68.60 (C-2), 6694 (C-4), 61.54 (C-6), 52.21 (OCH$_3$), 20.86 (CH$_3$), 20.81 (CH$_3$), 20.79 (CH$_3$), 20.72 (CH$_3$).

HPLC-MS: [C$_{22}$H$_{26}$O$_{12}$+Na]$^+$ calcd. 505.13, found 505.12.

m-Methoxycarbonylphenyl β-D-galactopyranoside
(4m)

Compound 3m (2.32 g, 4.81 mmol) was suspended in dry methanol (40 mL) and 1 M sodium methoxide (0.5 mL, 0.50 mmol) was added. The reaction mixture was stirred overnight at r.t. Amberlite IR 120/H$^+$ was used to neutralize the reaction mixture to pH 7 and was then filtered. The solvent was removed in vacuo to give 4m as a white powder (1.49 g, 4.75 mmol, quant.).

$^1$H NMR (500 MHz, DMSO-d$_6$) δ 7.61-7.57 (m, 2H, ArH), 7.45 (t, J=7.9 Hz, 1H, ArH), 7.32 (ddd, J=8.3, 2.5, 0.9 Hz, 1H, ArH), 5.21 (d, J=5.1 Hz, 1H, OH-2), 4.89 (d, J=5.7 Hz, 1H, OH-3), 4.86 (d, J=7.7 Hz, 1H, H-1), 4.66 (t, J=5.5 Hz, 1H, OH-6), 4.53 (d, J=4.6 Hz, 1H, OH-4), 3.85 (s, 3H, OCH$_3$), 3.72-3.68 (m, 1H, H-4), 3.62-3.52 (m, 3H, H-2, H-5, H-6a), 3.51-3.46 (m, 1H, H-6b), 3.45-3.40 (m, 1H, H-3).

$^{13}$C NMR (126 MHz, DMSO-d$_6$) δ 16596 (C=O), 157.65 (ArC), 130.91 (ArC), 129.95 (ArCH), 122.58 (ArCH), 121.32 (ArCH), 116.96 (ArCH), 101.36 (C-1), 75.59 (C-5), 73.13 (C-3), 70.29 (C-2), 68.07 (C-4), 60.29 (C-6), 52.28 (OCH$_3$).

HPLC-MS: C$_{14}$H$_{17}$O$_8$$^-$ [M-H]$^-$ calcd. 313.09, found 313.16.

p-Methoxycarbonylphenyl β-D-galactopyranoside
(4p)

Compound 3p (2.39 g, 4.95 mmol) was suspended in dry methanol (40 mL) and 1 M sodium methoxide (0.5 mL, 0.5 mmol) was added. The reaction mixture was stirred overnight at r.t. Amberlite IR 120/H$^+$ was used to neutralize the reaction mixture to pH 7 and was then filtered. The solvent was removed in vacuo to give 4p as a white powder (1.55 g, 4.93 mmol, quant.).

$^1$H NMR (500 MHz, DMSO-d$_6$) δ 7.90 (d, J=8.5 Hz, 2H, ArH), 7.12 (d, J=8.5 Hz, 2H, ArH), 5.22 (d, J=5.1 Hz, 1H, OH-2), 4.95 (d, J=7.6 Hz, 1H, H-1), 4.90 (d, J=5.6 Hz, 1H, OH-3), 4.66 (t, J=5.5 Hz, 1H, OH-6), 4.54 (d, J=4.6 Hz, 1H, OH-4), 3.82 (s, 3H, OCH$_3$), 3.71 (t, J=4.0 Hz, 1H, H-4), 3.65-3.45 (m, 4H, H-2, H-5, H-6), 3.42 (dt, J=9.1, 4.2 Hz, 1H, H-3).

$^{13}$C NMR (126 MHz, DMSO-d$_6$) δ 165.85 (C=O), 161.25 (ArC), 131.08 (2C, ArCH), 122.86 (ArC), 116.03 (2C, ArCH), 100.41 (C-1), 75.62 (C-5), 73.21 (C-3), 70.17 (C-2), 68.07 (C-4), 60.28 (C-6), 51.91 (OCH$_3$).

HPLC-MS: C$_{14}$H$_{17}$O$_8$$^-$[M-H]$^-$ calcd. 313.09, found 313.10.

m-Hydrazinecarbonylphenyl β-D-galactopyranoside
(5m)

To a suspension of compound 4m (1.46 g, 4.66 mmol) in methanol (40 mL), NH$_2$NH$_2$·H$_2$O (1.60 mL, 32.98 mmol) was added. The reaction was stirred under reflux at 70° C. for 72 h. Solvents were removed in vacuo to give the crude product 5m as a grey solid (1.63 g, ~70% pure, ~80% yield).

HPLC-MS: [C$_{13}$H$_{18}$N$_2$O$_7$+H]$^+$ calcd. 315.12, found 315.12.

p-Hydrazinecarbonylphenyl β-D-galactopyranoside
(5p)

To a suspension of compound 4p (1.70 g, 5.41 mmol) in methanol (60 mL), NH$_2$NH$_2$·H$_2$O (2.52 mL, 51.95 mmol) was added. The reaction was stirred under reflux for 72 h. Solvents were removed in vacuo and the product was washed with cold methanol. Pure compound 5p was obtained as a white solid (1.60 g, 5.09 mmol, 94%).

$^1$H NMR (500 MHz, DMSO-d$_6$) δ 9.63 (s, 1H, NH), 7.77 (d, J=8.4 Hz, 2H, ArH), 7.05 (d, J=8.4 Hz, 2H, ArH), 5.19 (d, J=5.2 Hz, 1H, OH-2), 4.93-4.86 (m, 2H, H-1, OH-3), 4.66 (t, J=5.5 Hz, 1H, OH-6), 4.52 (d, J=4.6 Hz, 1H, OH-4), 4.42 (s, 2H, OH-5), 3.70 (t, J=4.0 Hz, 1H, H-4), 3.63-3.44 (m, 4H, H-2, H-5, H-6), 3.44-3.38 (m, 1H, H-3).

$^{13}$C NMR (126 MHz, DMSO-d$_6$) δ 166.01 (C=O), 160.06 (ArC), 129.02 (ArCH), 127.01 (ArC), 116.09 (ArCH), 101.00 (C-1), 76.03 (C-5), 73.72 (C-3), 70.66 (C-2), 68.59 (C-4), 60.83 (C-6).

HPLC-MS: [C$_{13}$H$_{18}$N$_2$O$_7$+H]$^+$ calcd. 315.12, found 315.00.

General Procedure for Synthesis of
Bis-Benzaldehydes B-E

Corresponding dihalogenated hydrocarbons (1 eq.), 4-hydroxybenzaldehyde (4 eq.) and potassium carbonate (3 eq.) were dissolved in dry dimethylformamide (1.5 mL). Reaction vial was sealed and irradiated in microwave with a maximum power 300 W at the preselected 70° C. for 3-10 h. After cooling, the reaction was diluted with dichloromethane and washed with saturated NaHCO$_3$ and brine, dried over anhydrous Na$_2$SO$_4$, filtered and concentrated in vacuo. Pure products were obtained without further purification.[5]

Bis(4-formylphenoxy) methane (B)

Compound B (99.6 mg, 0.39 mmol, 83%) was synthesised following the general procedure for bis-benzaldehydes from dichloromethane (30 μL, 0.47 mmol), 4-hydroxybenzaldehyde (228 mg, 1.86 mmol) and potassium carbonate (138 mg, 1.42 mmol).

$^1$H NMR (500 MHz, CDCl$_3$) δ 9.92 (s, 2H, CHO), 7.89-7.85 (m, 4H, ArH), 7.25-7.22 (m, 4H, ArH), 5.88 (s, 2H, CH$_2$).

$^{13}$C NMR (126 MHz, CDCl$_3$) δ 190.87 (2C, CHO), 161.40 (2C, ArC), 132.09 (4C, ArCH), 131.66 (2C, ArC), 116.49 (4C, ArCH), 89.96 (CH$_2$).

HPLC-MS: [C$_{15}$H$_{12}$O$_4$+H]$^+$ calcd. 257.08, found 257.09.

1,2-Bis(4-formylphenoxy) ethane (C)

Compound C (34.1 mg, 0.13 mmol, 40%) was synthesised following the general procedure for bis-benzaldehydes using 1,2-dichloroethane (25 μL, 0.32 mmol), 4-hydroxybenzaldehyde (165.2 mg, 1.35 mmol) and potassium carbonate (133.4 mg, 0.97 mmol).

$^1$H NMR (500 MHz, CDCl$_3$) δ 9.90 (s, 2H, CHO), 7.89-7.84 (m, 4H, ArH), 7.08-7.03 (m, 4H, ArH), 4.45 (s, 4H, CH$_2$).

$^{13}$C NMR (126 MHz, CDCl$_3$) δ 190.90 (2C, CHO), 163.53 (2C, ArC), 132.17 (4C, ArCH), 130.54 (2C, ArC), 115.01 (4C, ArCH), 66.63 (2C, CH$_2$).

HPLC-MS: [C$_{16}$H$_{14}$O$_4$+H]$^+$ calcd. 271.10, found 271.11.

1,3-Bis(4-formylphenoxy) propane (D)

Compound D (102.0 mg, 0.36 mmol, 85%) was synthesised following the general procedure for bis-benzaldehydes using 1,3-dichloropropane (40 µL, 0.42 mmol), 4-hydroxybenzaldehyde (227.1 mg, 1.86 mmol) and potassium carbonate (192.6 mg, 1.39 mmol).

$^1$H NMR (500 MHz, CDCl$_3$) δ 9.88 (s, 2H, CHO), 7.85-7.81 (m, 4H, ArH), 7.04-6.99 (m, 4H, ArH), 4.26 (t, J=6.0 Hz, 4H, CH$_2$CH$_2$CH$_2$), 2.34 (m, 2H, CH$_2$CH$_2$CH$_2$). $^{13}$C NMR (126 MHz, CDCl$_3$) δ 190.89 (2C, CHO), 163.87 (2C, ArC), 132.14 (4C, ArCH), 130.22 (2C, ArC), 114.87 (4C, ArCH), 64.65 (2C, CH$_2$CH$_2$CH$_2$), 29.10 (CH$_2$CH$_2$CH$_2$).

HPLC-MS: [C$_{17}$H$_{16}$O$_4$+H]$^+$ calcd. 285.11, found 285.15.

1,4-Bis(4-formylphenoxy) butane (E)

Compound E (111.0 mg, 0.37 mmol, 89%) was synthesised following the general procedure for bis-benzaldehydes using 1,4-dibromobutane (50 µL, 0.42 mmol), 4-hydroxybenzaldehyde (211.5 mg, 1.73 mmol) and potassium carbonate (138.2 mg, 1.29 mmol).

$^1$H NMR (500 MHz, CDCl$_3$) δ 9.88 (s, 2H, CHO), 7.87-7.80 (m, 4H, ArH), 7.03-6.96 (m, 4H, ArH), 4.17-4.10 (m, 4H, CH$_2$CH$_2$CH$_2$CH$_2$), 2.06-2.00 (m, 4H, CH$_2$CH$_2$CH$_2$CH$_2$). $^{13}$C NMR (126 MHz, CDCl$_3$) δ 190.92 (2C, CHO), 164.08 (2C, ArC), 132.15 (4C, ArCH), 130.08 (2C, ArC), 114.84 (4C, ArCH), 67.88 (2C, CH$_2$CH$_2$CH$_2$CH$_2$), 25.93 (2C, CH$_2$CH$_2$CH$_2$CH$_2$).

HPLC-MS: [C$_{18}$H$_{18}$O$_4$+H]$^+$ calcd. 299.13, found 299.17.

General Procedure for Synthesis of Bis-Acyl Hydrazones

Corresponding bisbenzaldehyde A-E (1 eq.) and hydrazide 5 (3 eq.) were dissolved in 1-10 mL dimethylsulfoxide (unless stated otherwise) and 100 µL of formic acid was added. After 4 h, the reactions were quenched to pH 8 with NH$_4$OH and dried in vacuo. The products were purified by C18 column chromatography (water/acetonitrile, 15-40% acetonitrile).

Divalent Ligand A6m

Compound A6m (11.5 mg, 0.01 mmol, 23%) was synthesised following the general procedure for bis-acyl hydrazones using bisbenzaldehyde A (13.9 mg, 0.06 mmol) and hydrazide 5m (62.3 mg).

$^1$H NMR (500 MHz, DMSO-d$_6$) δ 11.81 (s, 2H, NH), 8.45 (s, 2H, N=CH), 7.79 (d, J=8.4 Hz, 4H, ArH), 7.54 (m, 4H, ArH), 7.45 (t, J=8.1 Hz, 2H, ArH), 7.26 (d, J=7.5 Hz, 2H, ArH), 7.16 (d, J=8.4 Hz, 4H, ArH), 5.22 (d, J=5.0 Hz, 2H, OH-2), 4.92-4.91 (m, 4H, H-1, OH-3), 4.69 (t, J=5.3 Hz, 2H, OH-6), 4.55 (d, J=4.4 Hz, 2H, OH-4), 3.72 (t, J=3.9 Hz, 2H, H-4), 3.62-3.54 (m, 6H, H-2, H-5, H-6a), 3.52-3.48 (m, 2H, H-6b), 3.44-3.43 (m, 2H, H-3).

$^{13}$C NMR (126 MHz, DMSO-d$_6$) δ 162.75 (2C, C=O), 157.69 (2C, ArC), 157.52 (2C, ArC), 147.17 (2C, C=N), 134.79 (2C, ArC), 130.05 (2C, ArC), 129.64 (2C, ArCH), 129.13 (4C, ArCH), 120.96 (2C, ArCH), 119.46 (2C, ArCH), 119.17 (4C, ArCH), 115.73 (2C, ArCH), 101.15 (2C, C-1), 75.61 (2C, C-5), 73.32 (2C, C-3), 70.32 (2C, C-2), 68.10 (2C, C-4), 60.34 (2C, C-6).

HPLC-MS: [C$_{40}$H$_{42}$N$_4$O$_{15}$+H]$^+$ calcd. 819.27, found 819.34.

Divalent Ligand A6p

Compound A6p (38.5 mg, 0.05 mmol) was synthesised following the general procedure for bis-acyl hydrazones.

$^1$H NMR (500 MHz, DMSO-d$_6$) 11.74 (s, 2H, NH), 8.45 (s, 2H, N=CH), 7.89 (d, J=8.3 Hz, 4H, ArH), 7.78 (d, J=7.9 Hz, 4H, ArH), 7.15 (d, J=7.6 Hz, 8H, ArH), 5.23 (s, 2H, OH-2), 4.95 (d, J=7.7 Hz, 2H, H-1), 4.91 (s, 2H, OH-3), 4.69 (s, 2H, OH-6), 4.55 (s, 2H, OH-4), 3.71 (s, 2H, H-4), 3.66-3.41 (m, 10H, H-2, H-3, H-5, H-6).

$^{13}$C NMR (126 MHz, DMSO-d$_6$) δ 162.52 (2C, C=O), 160.10 (2C, ArC), 157.62 (2C, ArC), 146.61 (2C, C=N), 130.16 (2C, ArC), 129.38 (4C, ArCH), 129.05 (4C, ArCH), 126.53 (2C, ArC), 119.15 (2C, ArCH), 115.82 (2C, ArCH), 100.47 (2C, C-1), 75.63 (2C, C-5), 73.30 (2C, C-3), 70.24 (2C, C-2), 68.15 (2C, C-4), 60.38 (2C, C-6).

HPLC-MS: [C$_{40}$H$_{42}$N$_4$O$_{15}$+H]$^+$ calcd. 819.27, found 819.34.

HRMS: [C$_{40}$H$_{42}$N$_4$O$_{15}$+H]$^+$ calcd. 819.2719, found 819.2724

Divalent Ligand B6m

Compound B6m (1.2 mg, 1.4 µmol, 1%) was synthesised following the general procedure for bis-acyl hydrazones using bisbenzaldehyde B (25.6 mg, 0.10 mmol) and hydrazide 5m (106.4 mg).

$^1$H NMR (500 MHz, DMSO-d$_6$) δ 11.74 (s, 2H, NH), 8.40 (s, 2H, N=CH), 7.71 (d, J=8.6 Hz, 4H, ArH), 7.52-7.53 (m, 4H, ArH), 7.44 (t, J=8.1 Hz, 2H, ArH), 7.25 (dd, J=8.3, 1.4, 2H, ArH), 7.21 (d, J=8.6 Hz, 4H, ArH), 5.98 (s, 2H, CH$_2$), 5.22 (d, J=4.9 Hz, 2H, OH-2), 4.90-4.92 (m, 4H, H-1, OH-3), 4.68 (t, J=5.1 Hz, 2H, OH-6), 4.55 (d, J=4.3 Hz, 2H, OH-4), 3.71 (t, J=3.8 Hz, 2H, H-4), 3.61-3.53 (m, 6H, H-2, H-5, H-6a), 3.51-3.47 (m, 2H, H-6b), 3.44-3.42 (m, 2H, H-3).

$^{13}$C NMR (126 MHz, DMSO-d$_6$) δ 162.71 (2C, C=O), 157.70 (2C, ArC), 157.50 (2C, ArC), 147.46 (2C, N=C), 134.86 (2C, ArC), 129.62 (2C, ArCH), 128.78 (4C, ArCH), 128.59 (2C, ArC), 120.93 (2C, ArCH), 119.40 (2C, ArCH), 116.43 (4C, ArCH), 115.69 (2C, ArCH), 101.13 (2C, C-1), 89.66 (CH$_2$), 75.60 (2C, C-5), 73.31 (2C, C-3), 70.31 (2C, C-2), 68.09 (2C, C-4), 60.33 (2C, C-6).

HPLC-MS: [C$_{41}$H$_{44}$N$_4$O$_{16}$+H]$^+$ calcd. 849.29, found 849.35.

Divalent Ligand B6p

Compound B6p (26.8 mg, 0.03 mmol, 49%) was synthesised following the general procedure for bis-acyl hydrazones using bisbenzaldehyde B (16.6 mg, 0.06 mmol) and hydrazide 5p (51.3 mg, 0.16 mmol).

$^1$H NMR (500 MHz, DMSO-d$_6$) δ 11.68 (s, 2H, NH), 8.39 (s, 2H, N=CH), 7.88 (d, J=8.5 Hz, 4H, ArH), 7.71 (d, J=8.3 Hz, 4H, ArH), 7.20 (d, J=8.3 Hz, 4H, ArH), 7.13 (d, J=8.7 Hz, 4H, ArH), 5.97 (s, 2H, CH$_2$), 5.24 (s, 2H, OH-2), 4.98-4.87 (m, 4H, H-1, OH-3), 4.70 (s, 2H, OH-6), 4.56 (s, 2H, OH-4), 3.71 (d, J=3.4 Hz, 2H, H-4), 3.65-3.43 (m, 10H, H-2, H-3, H-5, H-6).

$^{13}$C NMR (126 MHz, DMSO-d$_6$) δ 162.54 (2C, C=O), 160.09 (2C, ArC), 157.64 (2C, ArC), 146.95 (2C, N=CH), 129.38 (4C, ArCH), 128.74 (4C, ArCH), 126.62 (2C, ArC), 116.46 (4C, ArCH), 115.83 (4C, ArCH), 100.50 (2C, C-1), 89.73 (CH$_2$), 75.65 (2C, C-5), 73.32 (2C, C-3), 70.27 (2C, C-2), 68.18 (2C, C-4), 60.41 (2C, C-6).

HPLC-MS: [C$_{41}$H$_{44}$N$_4$O$_{16}$+H]$^+$ calcd. 849.29, found 849.38.

HRMS: [C$_{41}$H$_{44}$N$_4$O$_{16}$+H]$^+$ calcd. 849.2825, found 849.2835.

Divalent Ligand C6m

Compound C6m (4.6 mg, 5.3 µmol, 6%) was synthesised following the general procedure for bis-acyl hydrazones using bisbenzaldehyde C (22.3 mg, 0.08 mmol) and hydrazide 5m (100.4 mg) in dimethylsulfoxide/acetonitrile (11 mL: 1 mL).

$^1$H NMR (500 MHz, DMSO-$d_6$) δ 11.71 (s, 2H, NH), 8.40 (s, 2H, N=CH), 7.69 (d, J=8.6 Hz, 4H, ArH), 7.54-7.53 (m, 4H, ArH), 7.44 (t, J=8.1 Hz, 2H, ArH), 7.25 (d, J=7.1 Hz, 2H, ArH), 7.10 (d, J=8.6 Hz, 4H, ArH), 5.22 (d, J=4.3 Hz, 2H, OH-2), 4.90-4.92 (m, 4H, OH-3, H-1), 4.69 (s, 2H, OH-6), 4.55 (d, J=3.8 Hz, 2H, OH-4), 4.41 (s, 2H, CH$_2$), 3.72 (s, 2H, H-4), 3.62-3.54 (m, 6H, H-2, H-5, H-6a), 3.52-3.48 (m, 2H, H-6b), 3.43 (d, J=9.2 Hz, 2H, H-3).

$^{13}$C NMR (126 MHz, DMSO-$d_6$) δ 162.65 (2C, C=O), 159.93 (2C, ArC), 157.51 (2C, ArC), 147.73 (2C, N=C), 134.92 (2C, ArC), 129.62 (2C, ArCH), 128.79 (4C, ArCH), 127.17 (2C, ArC), 120.93 (2C, ArCH), 119.37 (2C, ArCH), 115.68 (2C, ArCH), 114.95 (4C, ArCH), 101.13 (2C, C-1), 75.61 (2C, C-5), 73.32 (2C, C-3), 70.32 (2C, C-2), 68.10 (2C, C-4), 66.48 (2C, CH$_2$), 60.34 (2C, C-6).

HPLC-MS: [C$_{42}$H$_{46}$N$_4$O$_{16}$+H]$^+$ calcd. 863.30, found 863.37.

Divalent Ligand C6p

Compound C6p (18.1 mg, 0.021 mmol, 33%) was synthesised following the general procedure for bis-acyl hydrazones using bisbenzaldehyde C (18.9 mg, 0.06 mmol) and hydrazide 5p (50.2 mg, 0.16 mmol) in dimethylsulfoxide/dimethylformamide (1 mL: 1 mL).

$^1$H NMR (500 MHz, DMSO-$d_6$) δ 11.65 (s, 2H, NH), 8.39 (s, 2H, N=CH), 7.92-7.82 (m, 4H, ArH), 7.68 (d, J=8.3 Hz, 4H, ArH), 7.13 (d, J=8.4 Hz, 4H, ArH), 7.09 (d, J=8.3 Hz, 4H, ArH), 5.24 (s, 2H, OH-2), 4.95 (m, 4H, H-1, OH-3), 4.70 (s, 2H, OH-6), 4.57 (s, 2H, OH-4), 4.40 (s, 4H, CH$_2$), 3.72 (d, J=3.3 Hz, 2H, H-4), 3.66-3.41 (m, 101H, H-2, H-3, H-5, H-6).

$^{13}$C NMR (126 MHz, DMSO-$d_6$) δ 162.45 (2C, C=O), 160.05 (2C, ArC), 159.85 (2C, ArC), 147.19 (2C, N=CH), 129.34 (4C, ArCH), 128.72 (4C, ArCH), 127.31 (2C, ArC), 126.66 (2C, ArC), 115.81 (4C, ArCH), 114.96 (4C, ArCH), 100.49 (2C, C-1), 75.64 (2C, C-5), 73.31 (2C, C3-), 70.26 (2C, C-2), 68.15 (2C, C-4), 66.50 (2C, CH$_2$), 60.38 (2C, C-6).

HPLC-MS: [C$_{42}$H$_{46}$N$_4$O$_{16}$+H]$^+$ calcd. 863.30, found 863.40.

HRMS: [C$_{42}$H$_{46}$N$_4$O$_{16}$+H]$^+$ calcd. 863.2982, found 863.2991.

Divalent Ligand D6m

Compound D6m (0.4 mg, 0.5 μmol, 1%) was synthesised following the general procedure for bis-acyl hydrazones using bisbenzaldehyde D (28.7 mg, 0.08 mmol) and hydrazide 5m (101.8 mg).

$^1$H NMR (500 MHz, DMSO-$d_6$) δ 11.69 (s, 2H, NH), 8.38 (s, 2H, N=CH), 7.67 (d, J=8.6 Hz, 4H, ArH), 7.53-7.52 (m, 4H, ArH), 7.44 (t, J=8.1 Hz, 2H, ArH), 7.25 (dd, J=8.2, 1.2 Hz, 2H, ArH), 7.06 (d, J=8.6 Hz, 4H, ArH), 5.22 (d, J=4.8 Hz, 2H, OH-2), 4.91-4.90 (m, 4H, OH-3, H-1), 4.69 (t, J=5.0 Hz, 2H, OH-6), 4.55 (d, J=3.4 Hz, 2H, OH-4), 4.21 (t, J=6.0 Hz, 4H, CH$_2$CH$_2$CH$_2$), 3.71 (s, 2H, H-4), 3.61-3.54 (m, 6H, H-2, H-5, H-6a), 3.51-3.47 (m, 2H, H-6b), 3.44-3.41 (m, 2H, H-3), 2.22 (t, J=5.9, 2H, CH$_2$CH$_2$CH$_2$).

HPLC-MS: [C$_{43}$H$_{48}$N$_4$O$_{16}$+H]$^+$ calcd. 877.32, found 877.38.

Divalent Ligand D6p

Compound D6p (17.3 mg, 0.20 mmol, 31%) was synthesised following the general procedure for bis-acyl hydrazones using bisbenzaldehyde D (18.3 mg, 0.06 mmol) and hydrazide 5p (55.7 mg, 0.18 mmol).

$^1$H NMR (500 MHz, DMSO-$d_6$) δ 11.63 (s, 2H, NH), 8.38 (s, 2H, N=CH), 7.87 (d, J=8.6 Hz, 4H, ArH), 7.66 (d, J=8.4 Hz, 4H, ArH), 7.12 (d, J=8.7 Hz, 4H, ArH), 7.05 (d, J=8.5 Hz, 4H, ArH), 5.23 (s, 2H, OH-2), 4.97-4.88 (m, 4H, H-1, OH-3), 4.69 (s, 2H, OH-6), 4.55 (s, 2H, OH-4), 4.21 (t, J=5.8 Hz, 4H, CH$_2$CH$_2$CH$_2$), 3.71 (s, 2H, H-4), 3.65-3.41 (m, 10H, H-2, H-3, H-5, H-6), 2.26-2.18 (m, 2H, CH$_2$CH$_2$CH$_2$).

$^{13}$C NMR (126 MHz, DMSO-$d_6$) δ 162.41 (2C, C=O), 160.03 (4C, ArC), 147.20 (2C, N=CH), 129.32 (4C, ArCH), 128.69 (4C, ArCH), 127.10 (2C, ArC), 126.67 (2C, ArC), 115.79 (4C, ArCH), 114.89 (4C, ArCH), 100.48 (2C, C-1), 75.63 (2C, C-5), 73.30 (2C, C-3), 70.24 (2C, C-2), 68.14 (2C, C-4), 64.43 (2C, CH$_2$CH$_2$CH$_2$), 60.37 (2C, C-6), 28.57 (CH$_2$CH$_2$CH$_2$).

HPLC-MS: [C$_{43}$H$_{48}$N$_4$O$_{16}$+H]$^+$ calcd. 877.32, found 877.40.

HRMS: [C$_{43}$H$_{48}$N$_4$O$_{16}$+H]$^+$ calcd. 877.3138, found 877.3145.

Divalent Ligand E6m

Compound E6m (5.0 mg, 5.6 μmol, 7%) was synthesised following the general procedure for bis-acyl hydrazones using bisbenzaldehyde E (25.6 mg, 0.09 mmol) and hydrazide 5m (84.2 mg).

$^1$H NMR (500 MHz, DMSO-$d_6$) δ 11.69 (s, 2H, NH), 8.38 (s, 2H, N=CH), 7.66 (d, J=8.7 Hz, 4H), 7.54-7.52 (m, 4H, ArH), 7.44 (t, J=8.1 Hz, 2H, ArH), 7.24 (d, J=7.2 Hz, 2H, ArH), 7.04 (d, J=8.6 Hz, 4H, ArH), 5.23 (s, 2H, OH-2), 4.91 (m, 4H, H-1, OH-3), 4.70 (s, 2H, OH-6), 4.56 (s, 2H, OH-4), 4.11 (s, 4H, CH$_2$CH$_2$CH$_2$CH$_2$), 3.71 (d, J=2.6 Hz, 2H, H-4), 3.61-3.54 (m, 6H, H-2, H-5, H-6a), 3.49 (m, 2H, H-6b), 3.43 (dd, J=9.5, 2.9 Hz, 2H, H-3), 1.91 (s, 4H, CH$_2$CH$_2$CH$_2$CH$_2$).

$^{13}$C NMR (126 MHz, DMSO-$d_6$) δ 162.69 (2C, C=O), 160.25 (2C, ArC), 157.49 (2C, ArC), 147.77 (2C, N=C), 135.06 (2C, ArC), 129.57 (2C, ArCH), 128.74 (4C, ArCH), 126.88 (2C, ArC), 120.93 (2C, ArCH), 119.30 (2C, ArCH), 115.68 (2C, ArCH), 114.86 (4C, ArCH), 101.14 (2C, C-1), 75.60 (2C, C-5), 73.32 (2C, C-3), 70.32 (2C, C-2), 68.09 (2C, C-4), 67.33 (2C, CH$_2$CH$_2$CH$_2$CH$_2$), 60.33 (2C, C-6), 25.36 (2C, CH$_2$CH$_2$CH$_2$CH$_2$).

HPLC-MS: [C$_{44}$H$_{50}$N$_4$O$_{16}$+H]$^+$ calcd. 891.33, found 891.39.

Divalent Ligand E6p

Compound E6p (11.0 mg, 0.01 mmol, 19%) was synthesised following the general procedure for bis-acyl hydrazones using bisbenzaldehyde E (18.9 mg, 0.06 mmol) and hydrazide 5p (50.2 mg, 0.16 mmol).

$^1$H NMR (500 MHz, DMSO-$d_6$) δ 11.63 (s, 2H, NH), 8.37 (s, 2H, N=CH), 7.87 (d, J=8.5 Hz, 4H, ArH), 7.66 (d, J=8.3 Hz, 4H, ArH), 7.12 (d, J=8.7 Hz, 4H, ArH), 7.03 (d, J=8.5 Hz, 4H, ArH), 5.24 (s, 2H, OH-2), 4.93 (m, 4H, H-1, OH-3), 4.71 (s, 2H, OH-6), 4.56 (s, 2H, OH-4), 4.10 (s, 4H CH$_2$CH$_2$CH$_2$CH$_2$), 3.71 (s, 2H, H-4), 3.66-3.48 (m, 10H, H-2, H-3, H-5, H-6), 1.90 (s, 4H, CH$_2$CH$_2$CH$_2$CH$_2$).

$^{13}$C NMR (126 MHz, DMSO-$d_6$) δ 162.50 (2C, C=O), 160.24 (2C, ArC), 160.07 (2C, ArC), 147.34 (2C, N=CH), 129.36 (4C, ArCH), 128.74 (4C, ArCH), 126.97 (2C, ArC), 126.69 (2C, ArC), 115.85 (4C, ArCH), 114.91 (4C, ArCH), 100.51 (2C, C-1), 75.66 (2C, C-5), 73.33 (2C, C-3), 70.28 (2C, C-2), 68.19 (2C, C-4), 67.40 (2C, CH$_2$CH$_2$CH$_2$CH$_2$), 60.43 (2C, C-6), 25.41 (2C, CH$_2$CH$_2$CH$_2$CH$_2$).

HPLC-MS: [C$_{44}$H$_{50}$N$_4$O$_{16}$+H]$^+$ calcd. 891.33, found 891.45.

HRMS: [C$_{44}$H$_{50}$N$_4$O$_{16}$+H]$^+$ calcd. 891.3295, found 891.3306.

Divalent Ligand F6m

Compound F6m (26.5 mg, 0.06 mmol, 42%) was synthesised following the general procedure for bis-acyl hydrazones using bisbenzaldehyde F (20 μL, 0.15 mmol) and hydrazide 5m (88.5 mg).

¹H NMR (500 MHz, DMSO-d₆) δ 11.69 (s, 1H, NH), 8.39 (s, 1H, N=CH), 7.67 (d, J=8.7 Hz, 2H, ArH), 7.53-7.52 (m, 2H, ArH), 7.44 (t, J=8.1 Hz, 1H, ArH), 7.25 (dd, J=8.2, 1.1 Hz, 1H, ArH), 7.03 (d, J=8.7 Hz, 2H, ArH), 5.22 (d, J=5.1 Hz, 1H, OH-2), 4.92-4.90 (m, 2H, OH-3, H-1), 4.68 (t, J=5.3 Hz, 1H, OH-6), 4.54 (d, J=4.4 Hz, 1H, OH-4), 3.81 (s, 3H, CH₃), 3.72 (t, 1H, H-4), 3.62-3.54 (m, 3H, H-2, H-5, H-6a), 3.52-3.49 (m, 1H, H-6b), 3.45-3.41 (m, 1H, H-3).

¹³C NMR (126 MHz, DMSO-d₆) δ 162.63 (C=O), 160.89 (ArC), 157.50 (ArC), 147.79 (C=N), 134.93 (ArC), 129.61 (ArCH), 128.74 (2C, ArCH), 126.89 (ArC), 120.91 (ArCH), 119.35 (ArCH), 115.68 (ArCH), 114.39 (2C, ArCH), 101.13 (C-1), 75.60 (C-5), 73.32 (C-3), 70.32 (C-2), 68.11 (C-4), 60.35 (C-6), 55.34 (CH₃).

HPLC-MS: $[C_{21}H_{24}N_2O_8+H]^+$ calcd. 433.16, found 433.10.

Divalent Ligand F6p

Compound F6p (64 mg, 0.15 mmol, 82%) was synthesised following the general procedure for bis-acyl hydrazones using bisbenzaldehyde F (30 µL, 0.24 mmol) and hydrazide 5p (50.9 mg, 0.16 mmol).

¹H NMR (500 MHz, DMSO-d₆) δ 11.63 (s, 1H, NH), 8.38 (s, 1H, N=CH), 7.88 (d, J=8.6 Hz, 2H, ArH), 7.67 (d, J=8.5 Hz, 2H, ArH), 7.13 (d, J=8.7 Hz, 2H, ArH), 7.02 (d, J=8.6 Hz, 2H, ArH), 5.23 (d, J=5.2 Hz, 11H, OH-2), 4.95 (d, J=7.7 Hz, 1H, H-1), 4.91 (d, J=5.5 Hz, 11H, OH-3), 4.68 (t, J=5.5 Hz, 1H, OH-6), 4.55 (d, J=4.6 Hz, 1H, OH-4), 3.81 (s, 3H, CH₃), 3.71 (t, J=3.8 Hz, 1H, H-4), 3.65-3.46 (m, 4H, H-5, H-6), 3.46-3.40 (m, 1H, H-3).

¹³C NMR (126 MHz, DMSO-d₆) δ 162.37 (C=O), 160.78 (ArC), 160.01 (ArC), 147.20 (N=C), 129.30 (2C, ArCH), 128.65 (2C, ArCH), 127.01 (ArC), 126.66 (ArC), 115.77 (2C, ArCH), 114.37 (2C, ArCH), 100.45 (C-1), 75.62 (C-5), 73.29 (C-3), 70.22 (C-2), 68.14 (C-4), 60.36 (C-6), 55.33 (CH₃).

HPLC-MS: $[C_{21}H_{24}N_2O_8+H]^+$ calcd. 433.16, found 433.20.

HMRS: $[C_{21}H_{24}N_2O_8+H]^+$ calcd. 433.1605, found 433.1608.

4-(dichloromethyl)-N-(prop-2-yn-1-yl)benzamide (10)

4-formylbenzoic acid (9, 283.0 mg, 1.89 mmol) was dissolved in thionyl chloride (6 mL, 82.21 mmol). The reaction was stirred 20 h at 80° C. The solvent was removed in vacuo. Crude 4-(dichloromethyl)benzoyl chloride (98.0 mg) was dissolved in dichloromethane. The reaction was cooled to 0° C. and triethyl amine (183 µL, 1.32 mmol) and propargyl amine (56 µL, 0.88 mmol) were added dropwise. The mixture was allowed to warm to room temperature and stirred for 3 h. The reaction poured over water and extracted with dichloromethane. Combined organic phases were washed with saturated NaHCO₃ and brine, dried over anhydrous Na₂SO₄, filtered and concentrated in vacuo. The product was purified by normal phase MPLC (petrol ether/ethyl acetate, 5-60% ethyl acetate). 10 was obtained as a white solid (17.2 mg, 0.07 mmol, 16% over two steps).

¹H NMR (500 MHz, CDCl₃) δ 7.82 (d, J=8.1 Hz, 2H, ArH), 7.65 (d, J=8.1 Hz, 2H, ArH), 6.73 (s, 1H, CHCl₂), 6.33 (s, 1H, NH), 4.27 (dd, J=5.0, 2.3, 2H, CH₂), 2.30 (s, 1H, C≡CH).

¹³C NMR (126 MHz, CDCl₃) δ 166.21 (C=O), 143.69 (ArC), 135.22 (ArC), 127.74 (2C, ArCH), 126.69 (2C, ArCH), 79.30 (C≡CH), 72.31 (C≡CH), 70.89 (CHCl₂), 30.04 (CH₂). HPLC-MS: $[C_{11}H_9Cl_2NO+H]^+$ calcd. 242.02, found 241.89.

4-(bis(4-formylphenoxy)methyl)-N-(prop-2-yn-1-yl)benzamide (11)

Compound 10 (17.2 mg, 0.07 mmol), 4-hydroxybenzaldehyde (51.2 mg, 0.43 mmol) and potassium carbonate (37.5 mg, 0.27 mmol) were dissolved in dry dimethylformamide and stirred for 48 h under reflux (see scheme 2 below). The reaction was diluted with ethyl acetate and washed with water, saturated NaHCO₃ and brine, dried over anhydrous Na₂SO₄, filtered and concentrated in vacuo. The product was purified by normal phase MPLC (petrol ether/ethyl acetate, 10-70% ethyl acetate). 11 was obtained as a white solid (17.6 mg, 0.04 mmol, 60%).

¹H NMR (500 MHz, CDCl₃) δ 9.89 (s, 2H, CHO), 7.86 (d, J=7.8 Hz, 2H, ArH), 7.81 (d, J=8.4 Hz, 4H, ArH), 7.70 (d, J=8.0 Hz, 2H, ArH), 7.13 (d, J=8.3 Hz, 4H, ArH), 6.93 (s, 1H, CH), 6.41 (s, 1H, NH), 4.25 (dd, J=4.6, 2.1 Hz, 2H, CH₂), 2.28 (s, 1H, C≡CH).

¹³C NMR (126 MHz, CDCl₃) δ 190.88 (O=CH), 166.51 (C=O), 160.20 (ArC), 139.22 (ArC), 135.24 (ArC), 132.05 (4C, ArCH), 131.74 (ArC), 127.85 (2C, ArCH), 127.16 (2C, ArCH), 117.58 (4C, ArCH), 98.92 (CH), 79.26 (C—CH), 72.29 (C≡CH), 30.04 (CH₂).

HPLC-MS: $[C_{25}H_{19}NO_5+H]^+$ calcd. 414.14, found 414.10.

Expression and Purification of LecA

Expression and purification of LecA as well as competitive binding by fluorescence polarization was performed as described by Joachim et al. (Org. Biomol. Chem. 2016). Microcalorimetry was performed using an ITC200 (GE Healthcare) at highest possible LecA concentration (typically 200-400 µM) in the cell and titration of ligand in the same buffer at 25° C.

Surface Plasmon Resonance

All experiments were performed on a BIACORE X100 instrument (GE Healthcare) at 25° C. and a flow rate of 10 µL min⁻¹. For LecA immobilisation, the system was pre-equilibrated with a PBS buffer (10 mM phosphate buffer pH 7.4, 2.7 mM KCl, 137 mM NaCl, 100 µM CaCl₂, 0.05% Tween 20), followed by an activation of CM5 chip surface by 3×injections of 1:1 N-hydroxysuccinimide (NHS)/1-ethyl-3(3-dimethylaminopropyl)carbodiimide hydrochloride (EDC) mixture on channel 1 and 2 (contact time of 540 s) until the binding response was beyond 800 RU. LecA was dissolved in 10 mM sodium acetate pH 4.5 (100 µg mL⁻¹) and injected over the activated chip surface on channel 2 (contact time of 540 s) until the response of ~4000 RU was reached. Excess free amine groups were capped with an injection of 1 M ethanolamine (contact time 540 s). Bivalent compounds were dissolved in 100% DMSO and subsequently diluted to required concentrations in a running buffer (10 mM phosphate buffer pH 7.4, 2.7 mM KCl, 137 mM NaCl, 100 µM CaCl₂, 0.05% Tween 20, 5% DMSO). The bivalent analytes were subjected to single-cycle kinetics analyses (contact time of 120 s and dissociation time of 120 s) consisting of injections of the analytes at 0, 10, 50, 100, and 200 nM over the immobilised-LecA. The chip surface was regenerated by 5× injections of 100 µM 4-nitrophenyl-β-D-galactose (contact time of 120 s). $K_D$ determination was performed using BIACORE X100 evaluation software (version 2.0) by applying 1:1 binding model to fit the experimental data.

[1] H. E. Gottlieb, V. Kotlyar, A. Nudelman, *J. Org. Chem.* 1997, 62, 7512-7515.
[2] M. Seligman, *J. Biol. Chem.* 1952, 195, 239-249.
[3] S. T. Xue, W. Y. He, L. L. Ma, H. Q. Wang, B. Wang, G. H. Zheng, X. Y. Ji, T. Zhang, Y. H. Li, J. D. Jiang, et al., *Molecules* 2013, 18, 3789-3805.
[4] Y. Li, H. Mo, G. Lian, B. Yu, *Carbohydr. Res.* 2012, 363, 14-22.
[5] F. Yang, F. Xie, Y. Zhang, Y. Xia, W. Liu, F. Jiang, C. Lam, Y. Qiao, D. Xie, J. Li, et al., *Bioorganic Med. Chem. Lett.* 2017, 27, 2166-2170.

Synthesis Schemes and Results of Biophysical Assays

The crystal structure of LecA with 4-nitrophenyl β-D-galactopyranoside (PDB: 3ZYF) reveals the distance of ~24 Å between two C4 atoms of the phenyl ring in the two adjacent binding sites. Thus, an introduction of hydrazide groups at this position will allow the bridging of the two galactosides to the two binding sites using bis-aldehyde linkers.

The linkers were designed to bridge this distance of ~24 Å. m/p-benzohydrazide-β-D-galactopyranoside (5) and five bisbenzaldehydes (A-E, FIG. 1) were selected as building blocks for synthesis of divalent acylhydrazone LecA ligands (A-E6). We used MOE to model the divalent ligands and compared them to a crystal structure of existing highly potent divalent Pieters ligand (PDB: 4YWA) (see FIG. 1).

The 5 step synthesis of divalent ligands (see Scheme 1 below) started with the acetate protection of D-galactose (1→2), glycosylation with methyl m/p-hydroxybenzoate (2→3), subsequent Zemplen deprotection (3→4) and formation of the hydrazides 5. 5 were successfully linked with benzaldehyde spacers A-F to form acylhydrazones A-F6.

Scheme 1: Synthesis of bis-aldehydes B-E and divalent LecA ligands.

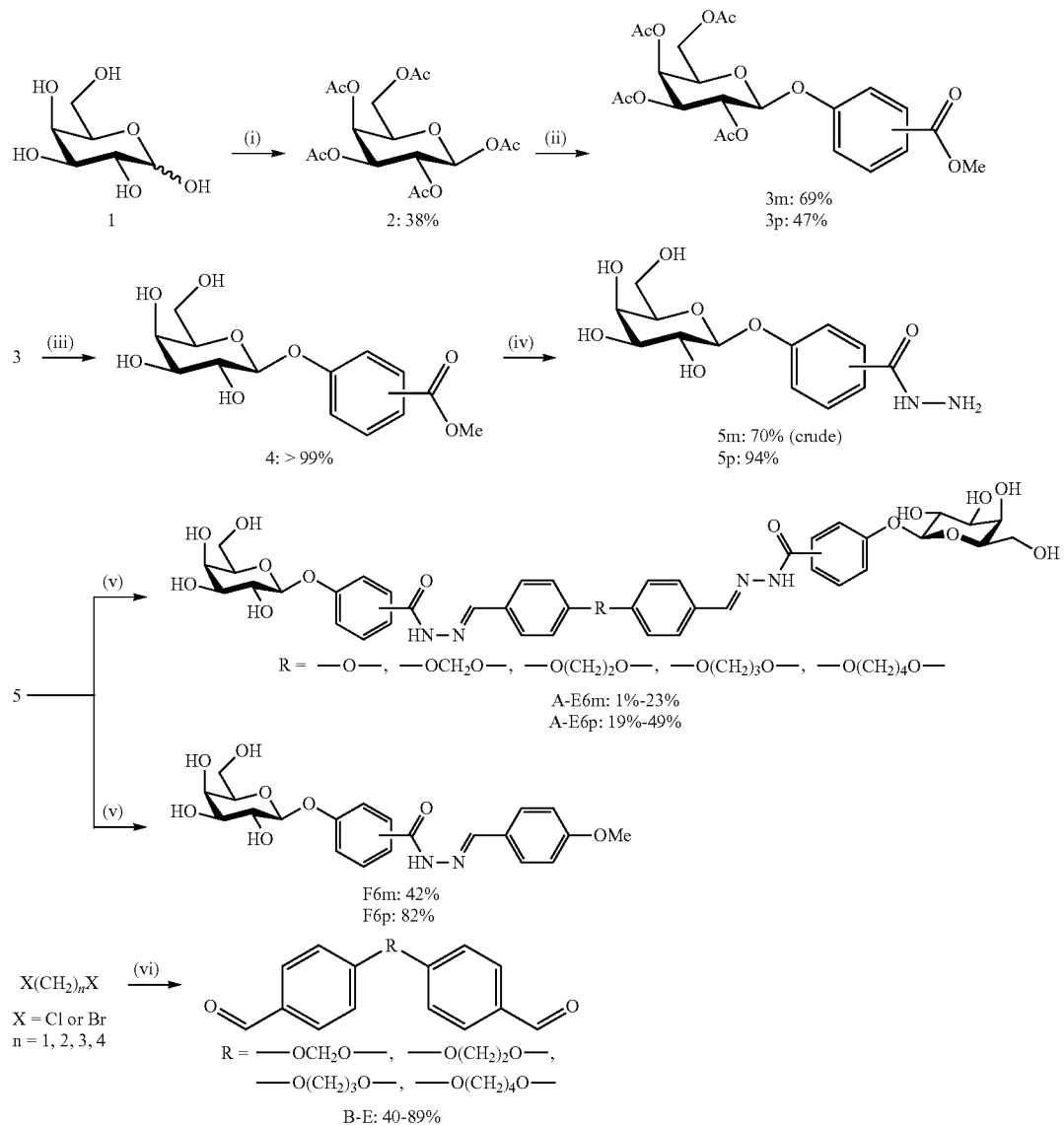

Reagents and conditions: (i) NaOAc, Ac$_2$O; 100° C., 1 h; (ii) Methyl m/p-hydroxybenzoate, BF$_3$*Et$_2$O, CH$_2$Cl$_2$, 0° C.-r.t., o.n.; (iii) NaOMe, MeOH, r.t., o.n.; (iv) NH$_2$NH$_2$, MeOH, 70° C., o.n.; (v) A-F, formic acid, DMSO, r.t., 4 h, 6m with C in DMSO/MeCN and with E in H$_2$O/MeCN. (vi) 4-hydroxy benzaldehyde, K$_2$C$_3$, DMF, 70° C., microwave, 3-10 h; o.n. = overnight.

All synthesized molecules, monovalent controls and the bis-galactosides of the meta and the para series were then evaluated using a set of biophysical assays (Table 1).

TABLE 1

Evaluation of LecA ligands using competitive binding assay based on fluorescence polarisation (FP), surface plasmon resonance (SPR) and isothermal titration microcalorimetry (ITC).

| Structure | FP IC$_{50}$ [µM] | N | SPR [K$_d$ in nM/N☐] | |
|---|---|---|---|---|
| R = (galactose-O-phenyl-C(O)-NH-N=CH-phenyl-) | | | | |
| (galactose-OMe) | 100.8 ± 25.0 * | 3 | | |
| | 91.2 ± 24.3 ** | 5 | | |
| 5p (galactose-O-phenyl-C(O)-NH-NH$_2$) | 22.6 ± 8.7 * | 3 | | |
| | 30.3 ± 5.0 ** | 2 | | |
| A6m (R-O-R) | 4.1 ± 3.0 ** | 3 | 16.6 ± 2.0 | 3 |
| A6p (R-O-R) | 4.3 ± 2.3 ** | 2 | 21.7 ± 7.6 | 5 |
| B6m (R-O-CH$_2$-O-R) | 3.1 ± 2.0 ** | 3 | 14.3 ± 6.0 | 3 |
| B6p (R-O-CH$_2$-O-R) | 3.7 ± 1.8 ** | 2 | 30.5 ± 28.0 | 5 |
| C6m (R-O-CH$_2$CH$_2$-O-R) | 2.0 ± 1.9 ** | 3 | 14.9 ± 11.9 | 3 |
| C6p (R-O-CH$_2$CH$_2$-O-R) | 3.8 ± 1.6 ** | 2 | 41.7 ± 23.9 | 5 |
| D6m (R-O-CH$_2$CH$_2$CH$_2$-O-R) | — | 0 | 65.9 ± 6.2 | 3 |
| D6p (R-O-CH$_2$CH$_2$CH$_2$-O-R) | 3.6 ± 1.7 ** | 2 | 50.0 ± 19.4 | 5 |

TABLE 1-continued

Evaluation of LecA ligands using competitive binding assay based on fluorescence polarisation (FP), surface plasmon resonance (SPR) and isothermal titration microcalorimetry (ITC).

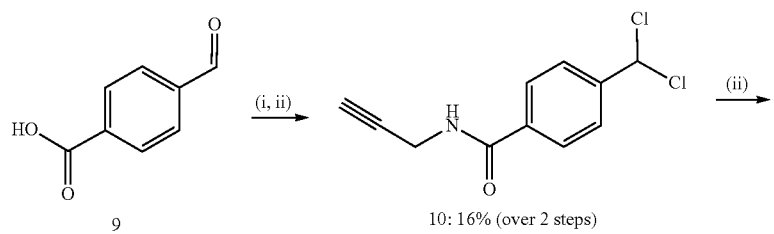

| Structure | FP | N | SPR | N | ITC | N |
|---|---|---|---|---|---|---|
| E6m | 6.3 ± 6.4 ** | 3 | 25.7 ± 19.2 | 6 | ITC | |
| E6p | 4.9 ± 1.4 ** | 2 | 94.0 ± 28.9 | 5 | $K_d$ [μM] | N |
| F6m | 21.6 ± 4.5 ** | 3 | 4.9 ± 0.1 μM | 3 | 2.40 ± 1.33 | 2 |
| F6p | 23.1 * | 1 | 4.8 ± 2.1 μM | 5 | 6.11 ± 0.48 | 3 |

FP assay conditions: 20 μM LecA, 10 nM reporter ligand 8, TBS/Ca$^{2+}$ buffer (20 mM Tris, 137 mM NaCl, 2.6 mM KCl at pH 7.4 supplemented with 1 mM CaCl$_2$) with 4% DMSO (*) or 25% DMSO (**) ITC buffer: TBS/Ca$^{2+}$. SPR direct binding experiments were carried on CM5 chip with immobilised LecA. Averages and standard deviations are shown. N = number of independent experiments.

Figure 2:
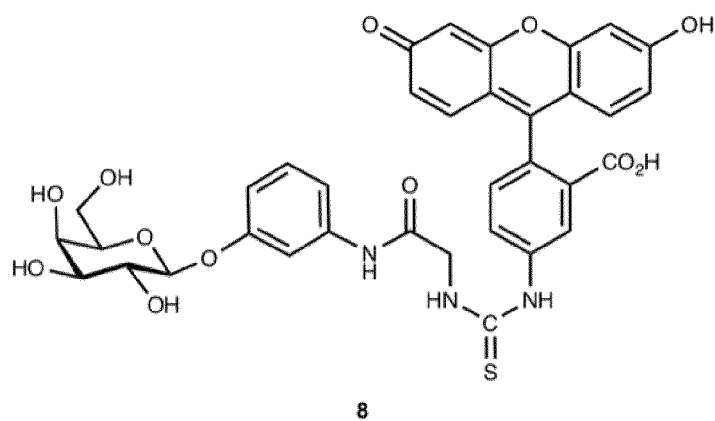
FIG. 2: Structure of reporter ligand 8 used in competitive binding assay (Joachim et al., 2016).
Figure 3:
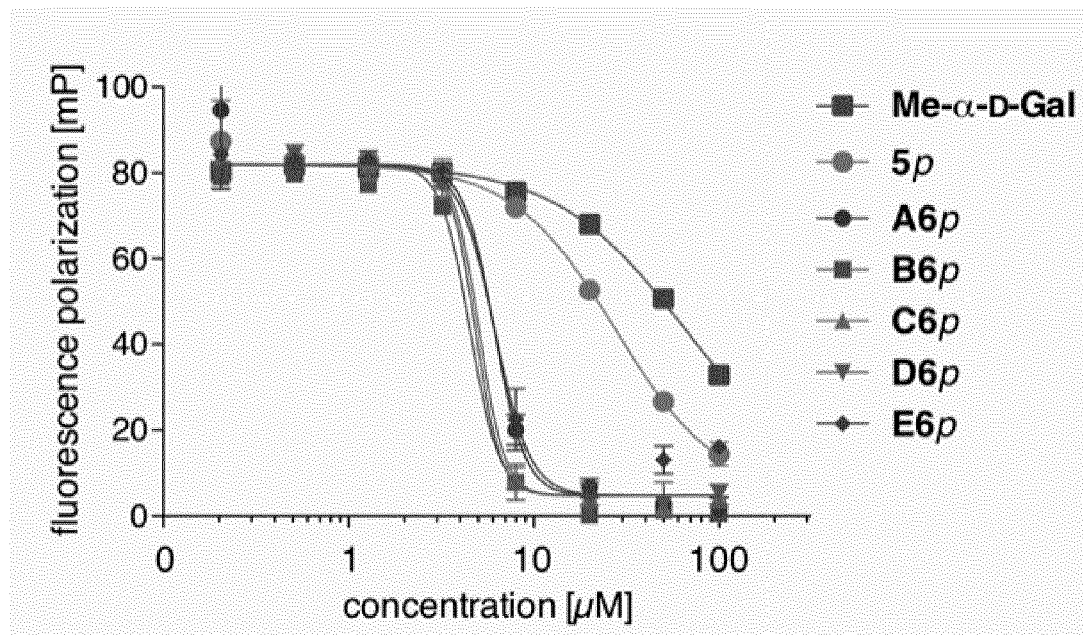
FIG. 3: Competitive binding assay of divalent inhibitors with LecA. Error bars are calculated from triplicates on one plate.
Figure 4:
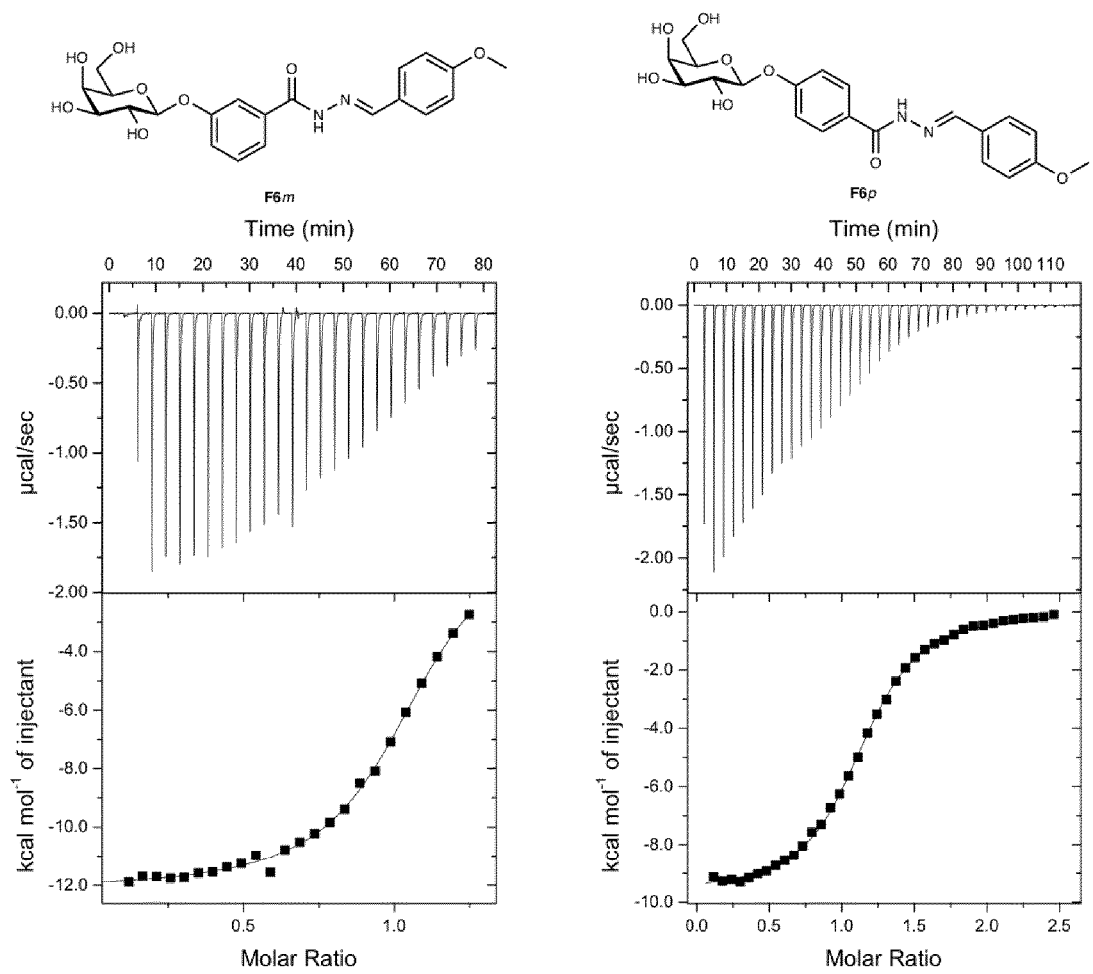
FIG. 4: Isothermal titration microcalorimetry of LecA with ligands F6m and F6p. One representative titration is shown.
Figure 5:
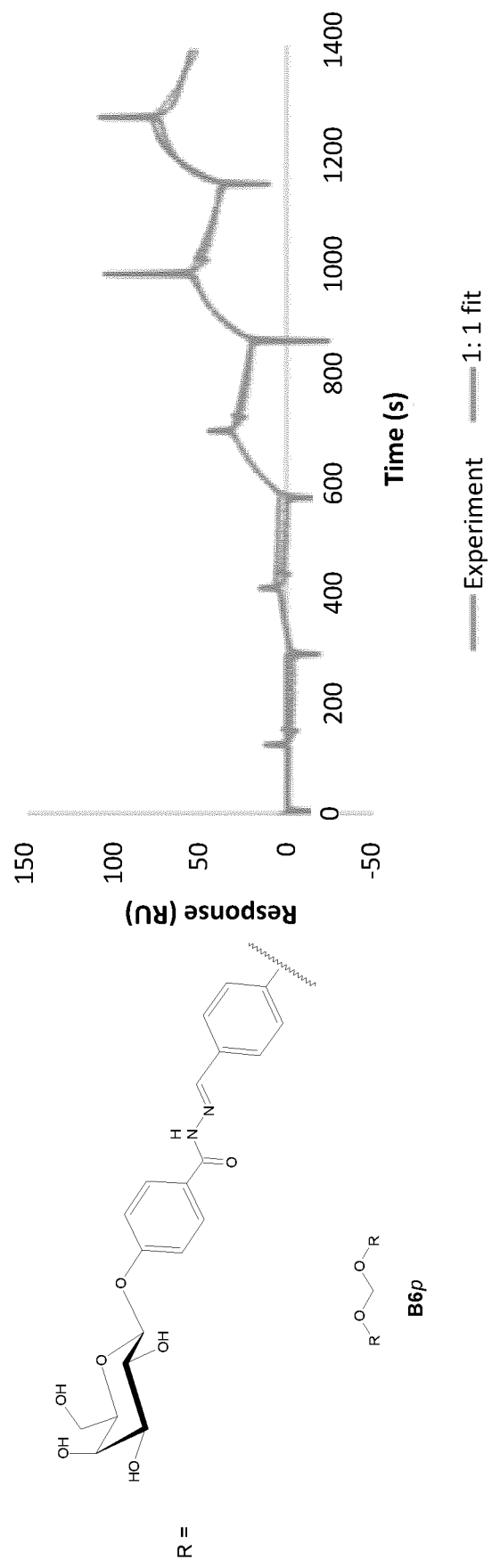
FIG. 5: Surface plasmon resonance analysis of direct binding of B6p to LecA immobilised on a CM5 chip.

Binding of ligands to LecA was evaluated in competitive assay based on fluorescence polarisation. Lower assay limit was reached with divalent ligands A-E6, illustrated with steep titration slopes (FIG. 3). This results from the intrinsic affinity of the fluorescent tracer 8 (see FIG. 2) to LecA that is 7.4 μM (Joachim et al., Org Biomol Chem 14 7933-48 (2016)). Due to the presence of 20 μM LecA that must be near or above the Kd of the tracer in this competitive binding experiment, activities of competing test compounds way below the tracer/protein system cannot be measured. Therefore, we shifted to direct binding using SPR. In SPR, such a limitation is absent and real Kds can be determined and they revealed two-digit nanomolar affinities for the divalent compounds as a function of linker length (Table 1).

As a further improvement, the divalent ligand can be modified with a side chain as in 12 that allows clicking to dyes, probes or solubility enhancers (Scheme 2). Other bridging (elongated by CH$_2$ groups) and branching functional groups (replace aryl by alkyl or other functional groups) are planned to assess their suitability. Conjugation to fluorescein (13, Scheme 2) will allow its use in an improved competitive binding assay with higher sensitivity and furthermore, the compound can be assessed for its biofilm imaging usability.

Scheme 2: Synthesis of divalent fluorescent LecA ligand.

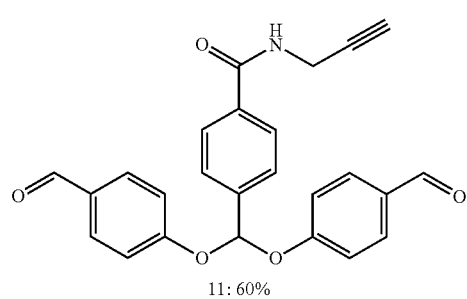

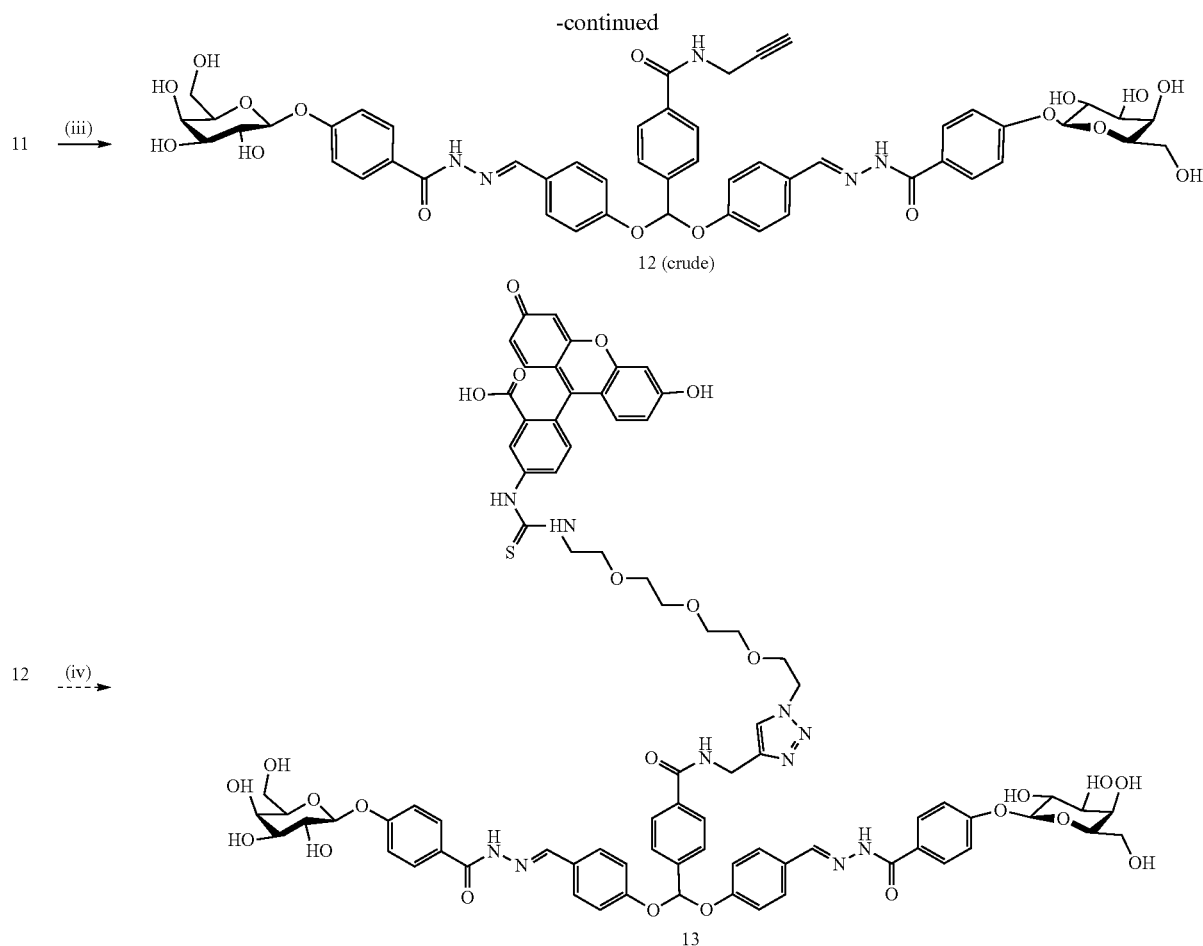

Reagents and conditions: (i), SOCl$_2$, reflux, 1 d; (ii) propargyl amine, Et$_3$N, CH$_2$Cl$_2$, 0° C. r.t., 3 h; (iii) 5p, formic acid, DMSO, r.t., 6 h; (iv) FITC-PEG$_3$-azide, CuSO$_4$, sodium ascorbate, DMF/H$_2$O/DMSO, r.t., 2 d.

Figure 6:
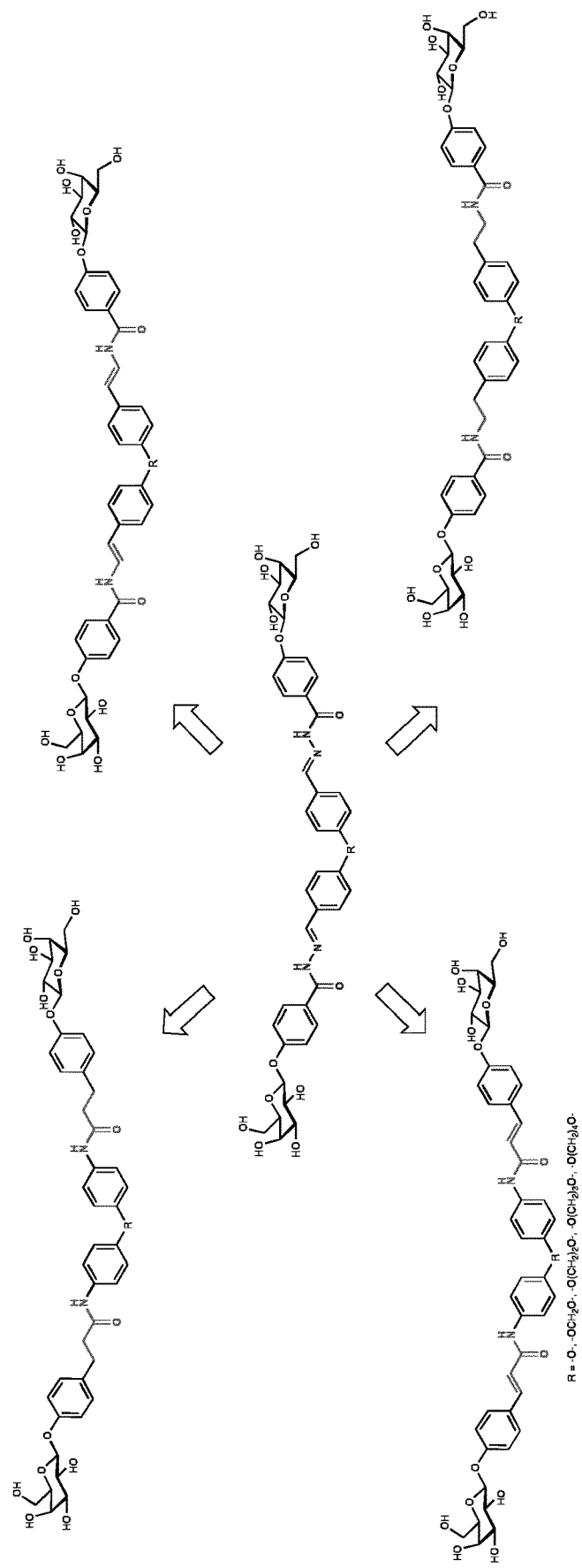
FIG. 6: Planned isosters of the bisacyl hydrazones.

To further improve the properties of the molecules, it is possible to isosterically replace the acyl hydrazide moiety to improve solubility, stability and drug-likeness. This can be done using a set of triazoles, amides, reverse amides, cinnamides or reverse cinnamides (FIG. 6). The synthesis of the cinnamide isoster is devised in Scheme 3.

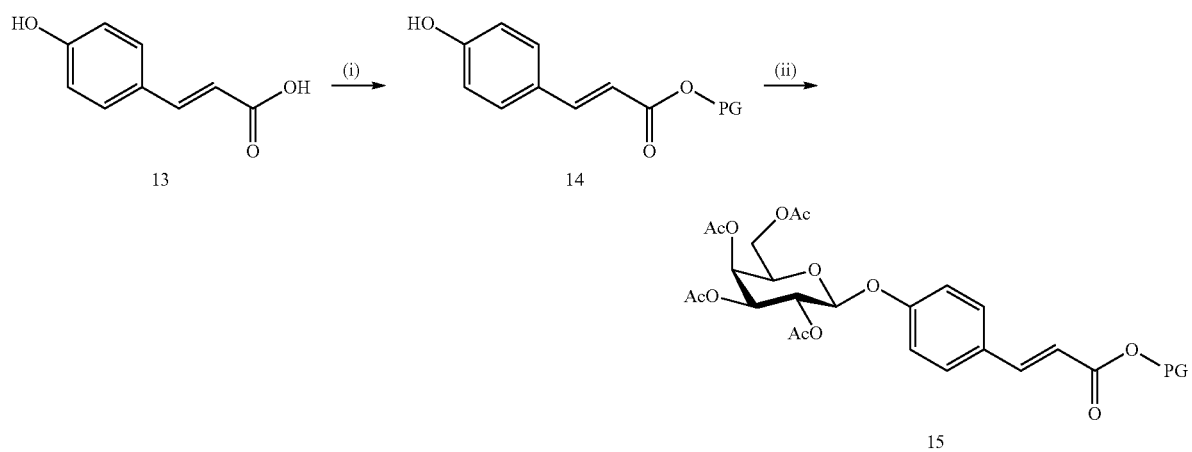

Scheme 3: Devised synthesis for the cinnamide analog.

-continued
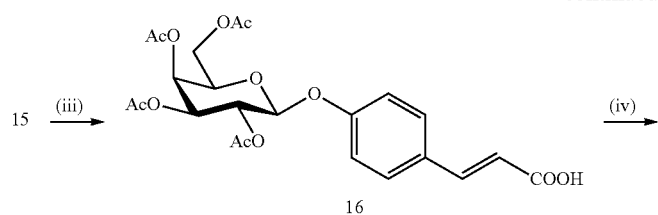
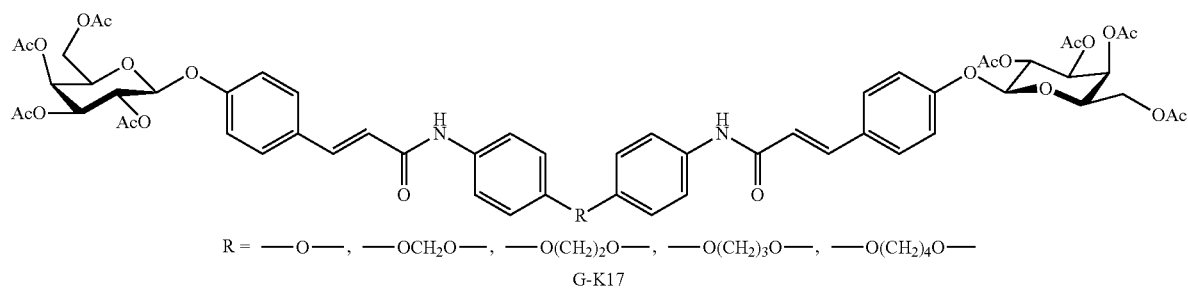
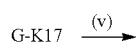
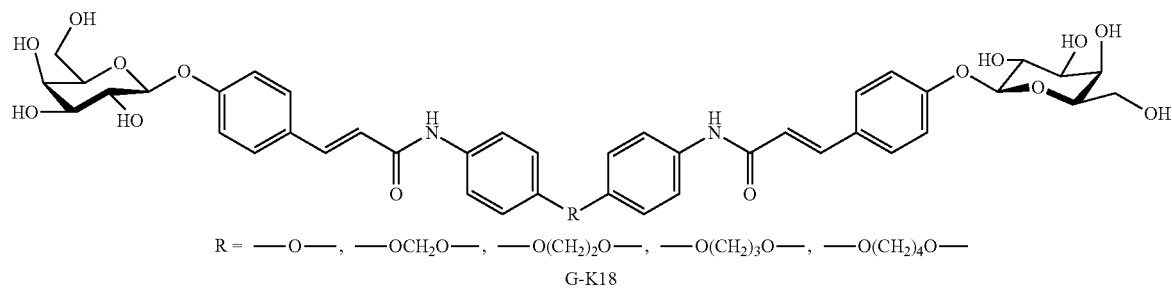
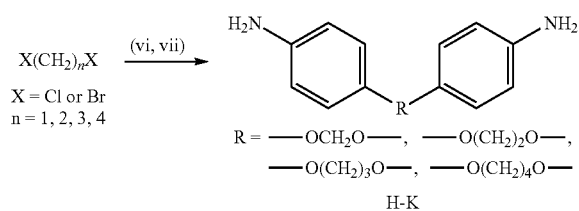

REFERENCES

Joachim et al., *Org Biomol Chem* 14 7933-48 (2016)
Diggle et al., *Environ Microbiol* 8 1095-104 (2006)
Cecioni et al., *Chem Rev,* 2015, 115(1), 525-61)
F. Pertici & R. J. Pieters, *Chem Commun (Camb)* 48 4008-10 (2012)
G. Yu, R. J. Pieters et al., *J Org Chem* 84 2470-2488 (2019)

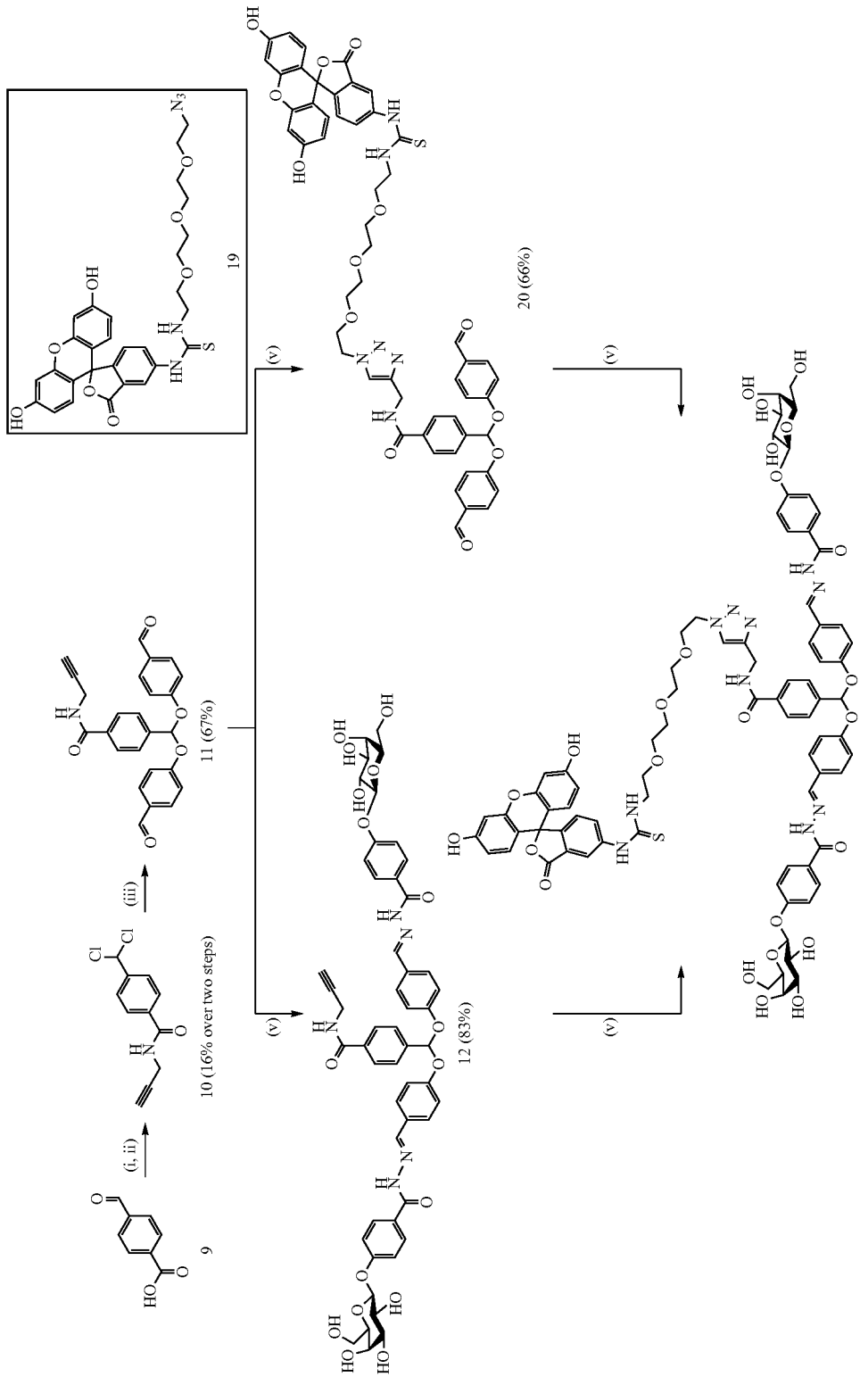

Divalent Ligand (12)

Compound 11 (15.1 mg, 36.5 μmol) and hydrazide 5p (51.6 mg, 164 μmol) were dissolved in 1.5 mL dimethyl sulfoxide and 20 μL of formic acid was added. After 2.5 h, the reaction was lyophilized. The compound 12 was purified by C18 column preparative HPLC chromatography (water/acetonitrile, gradient of 15-40% acetonitrile). Compound 12 (32.3 mg, 32.1 μmol, 83%) was obtained as white solid.

$^1$H NMR (500 MHz, DMSO-$d_6$) δ 11.70 (s, 2H, N—NH), 9.03 (t, J=5.6 Hz, 1H, CONH), 8.38 (s, 2H, N=CH), 7.94 (d, J=8.1 Hz, 2H, ArH), 7.88 (d, J=8.4 Hz, 4H, ArH), 7.80 (d, J=8.0 Hz, 2H, ArH), 7.68 (d, J=8.3 Hz, 4H, ArH), 7.37 (s, 1H, CH), 7.23-7.03 (m, 8H, ArH), 5.25 (s, 2H, OH-2), 5.03-4.85 (m, 4H, H-1, OH-3), 4.70 (s, 2H, OH-6), 4.57 (s, 2H, OH-4), 4.06 (dd, J=5.6, 2.6 Hz, 2H, CH$_2$), 3.72 (d, J=3.3 Hz, 2H, H-4), 3.67-3.47 (m, 8H, H-2, H-5, H-6), 3.47-3.41 (m, 2H, H-3), 3.14 (t, J=2.5 Hz, 1H, C≡CH).

$^{13}$C NMR (126 MHz, DMSO-$d_6$) δ 165.59 (1C, C=O), 162.48 (2C, C=O), 160.09 (2C, ArC), 156.85 (2C, ArC), 146.82 (2C, N=CH), 139.73 (1C, ArC), 134.93 (1C, ArC), 129.40 (4C, ArCH), 128.92 (2C, ArC), 128.71 (4C, ArCH), 127.75 (2C, ArCH), 127.01 (2C, ArCH), 126.56 (2C, ArC), 117.26 (4C, ArCH), 115.81 (4C, ArCH), 100.45 (2C, C-1), 98.09 (1C, CH), 81.27 (1C, C≡CH), 75.65 (2C, C-5), 73.32 (2C, C-3), 73.06 (1C, C≡CH), 70.25 (2C, C-2), 68.18 (2C, C-4), 60.40 (2C, C-6), 28.61 (1C, CH$_2$).

HPLC-MS: $[C_{51}H_{51}N_5O_{17}+H]^+$ calcd. 1006.34, found 1006.44.

Bis-Benzaldehyde Fluorescent Linker (20)

Azide modified FITC (19[1], 16.9 mg, 27.8 μmol) and propargylated bis-benzaldehyde 11 (10.3 mg, 24.9 μmol) were dissolved in dimethylformamide (1.5 mL). Copper(II) sulfate solution (75 μL, 100 mM in H$_2$O, 7.5 μmol) and sodium ascorbate solution (75 μL, 100 mM in H$_2$O, 7.5 μmol) were added. The reaction was stirred at r.t. for 2 days and dried in vacuo. The product 20 was purified by C18 column preparative HPLC chromatography (water/acetonitrile with 1% formic acid, gradient of 30-60% acetonitrile). Compound 20 was obtained as yellow solid (16.7 mg, 16.4 μmol, 66%).

$^1$H NMR (500 MHz, DMSO-$d_6$) δ 10.14 (s, 2H, OH-fluorescein), 10.05 (s, 1H, NH-thiourea), 9.87 (s, 2H, CHO), 9.11 (t, J=5.7 Hz, 1H, NH-thiourea), 8.27 (s, 1H, ArH-fluorescein), 8.10 (s, 1H, CONH), 7.98-7.91 (m, 3H, ArH, CH-triazole), 7.87 (d, J=8.7 Hz, 4H, ArH), 7.79 (d, J=8.3 Hz, 2H, ArH), 7.73 (d, J=7.8 Hz, 1H, ArH-fluorescein), 7.57 (s, 1H, CH), 7.25 (d, J=8.7 Hz, 4H, ArH), 7.17 (d, J=8.3 Hz, 1H, ArH-fluorescein), 6.67 (d, J=2.2 Hz, 2H, ArH-fluorescein), 6.62-6.53 (m, 4H, ArH-fluorescein), 4.53-4.44 (m, 4H, CH$_2$), 3.78 (t, J=5.2 Hz, 2H, CH$_2$), 3.67 (s, 2H, CH$_2$), 3.57 (t, J=5.4 Hz, 2H, CH$_2$), 3.54-3.44 (m, 8H, CH$_2$).

$^{13}$C NMR (126 MHz, DMSO-$d_6$) δ 191.50 (2C, O=CH), 180.53 (1C, C=S), 168.55 (1C, C=O, fluorescein), 165.60 (1C, C=O), 159.96 (2C, ArC), 159.51 (2C, ArC-fluorescein), 151.90 (2C, ArC-fluorescein), 147.16 (2C, ArC-fluorescein), 144.86 (1C, C=CH-triazole), 141.33 (1C, ArC-fluorescein), 138.66 (1C, ArC), 135.48 (1C, ArC), 131.81 (4C, ArCH), 131.10 (2C, ArC) 129.44 (1C, ArC-fluorescein), 129.08 (4C, ArCH-fluorescein), 127.81 (2C, ArCH), 126.91 (2C, ArCH), 126.58 (1C, ArC-fluorescein), 124.11 (1C, ArCH-fluorescein), 123.33 (1C, C=CH-triazole), 117.01 (4C, ArCH), 116.37 (1C, ArCH-fluorescein), 112.61 (1C, ArCH-fluorescein), 109.72 (2C, ArC-fluorescein), 102.25 (2C, ArCH-fluorescein), 97.59 (1C, CH), 69.73 (1C, CH$_2$), 69.64 (2C, CH$_2$), 69.54 (1C, CH$_2$), 68.75 (1C, CH$_2$), 68.41 (1C, CH$_2$), 49.29 (1C, CH$_2$), 43.71 (1C, CH$_2$), 34.90 (1C, CH$_2$).

HPLC-MS: $[C_{54}H_{48}N_6O_{13}S+2H]^{2+}$ calcd. 511.16, found 511.15.

HRMS: $[C_{54}H_{48}N_6O_{13}S+2H]^{2+}$ calcd. 511.1573, found 511.1572.

Divalent Fluorescent Ligand (13)

Compound 20 (4.4 mg, 4.3 μmol) and hydrazide 5p (5.8 mg, 18.5 μmol) were dissolved in 450 μL dimethyl sulfoxide and 40 μL of formic acid was added. After 7.5 h, the reaction was lyophilized. The product 13 (2.9 mg, 1.5 μmol, 35%, 85% purity) was obtained after by C18 column preparative HPLC chromatography (water/acetonitrile with 1% formic acid, gradient of 15-40% acetonitrile) as yellow powder.

HPLC-MS: $[C_{80}H_{80}N_{10}O_{25}S+2H]^{2+}$ calcd. 807.2581, found 807.78.

HRMS: $[C_{80}H_{80}N_{10}O_{25}S+2H]^{2+}$ calcd. 807.2581, found 807.2589.

Scheme 5: Synthesis of divalent LecA ligands based on coumaric acid.

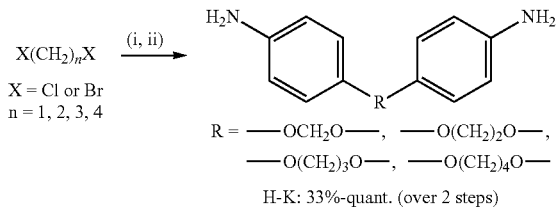

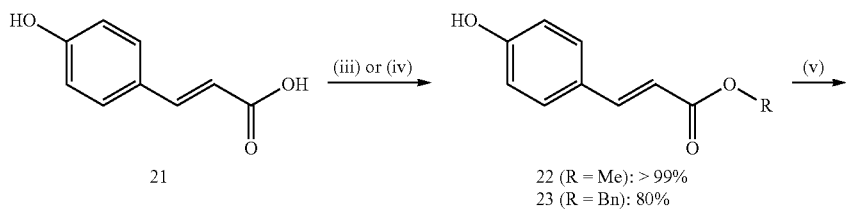

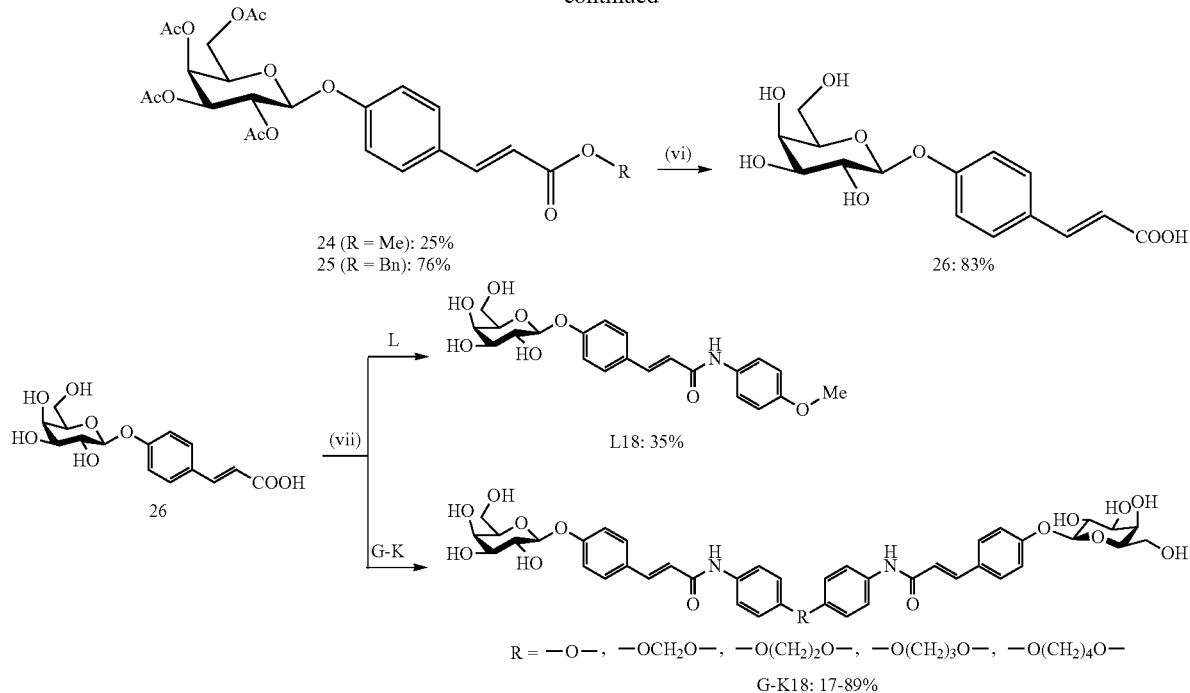

24 (R = Me): 25%
25 (R = Bn): 76%

26: 83%

L18: 35%

G-K18: 17-89%

R = —O—, —OCH₂O—, —O(CH₂)₂O—, —O(CH₂)₃O—, —O(CH₂)₄O—

(i) 4-nitro benzaldehyde, K₂CO₃, DMF, 70° C., microwave, 11 h-4 d (for H 10 days, no irradiation) (ii) H₂, Pd/C, CH₂Cl₂, r.t., o.n.; (iii) H₂SO₄, MeOH, reflux, 3 h;
(iv) benzyl bromide, Na₂CO₃, DMF, r.t., o.n.; (v) β-D-galactopyranose pentaacetate (2), BF₃•Et₂O, CHCl₃, 0° C.-r.t., o.n.; (vi) NaOH, H₂O/MeOH (1:1), r.t., 1 h;
(vii) HBTU, DIPEA, DMF, r.t., 1 h-3 d; o.n. = overnight.

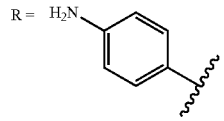

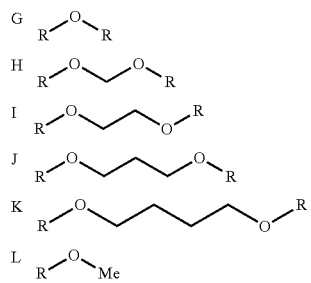

General Procedure for Synthesis of Bis-Anilines H-K

Corresponding di-halogenated hydrocarbons (1 eq.), 4-nitrophenol (4 eq.) and potassium carbonate (3 eq.) were dissolved in dry dimethylformamide (6 mL, for I 9 mL) in a microwave reaction vial. The vial was sealed and irradiated under microwave irradiation (Discover SP Sequential Microwave Synthesis System, CEM Corporation, North Carolina, USA) with maximum power 300 W at 70° C. for 11 h-4 days (for H 10 days in oil bath, no irradiation). After cooling, the reaction was diluted with ethyl acetate and washed with satd. aqueous NaHCO₃, dried over anhydrous Na₂SO₄, filtered and concentrated in vacuo. Bis-nitro intermediates were purified by normal phase MPLC (toluene with 1% ethyl acetate and 1% triethylamine, isocratic) or in case of J by C18 column MPLC chromatography (water/acetonitrile with 0.1% formic acid, gradient of 40-75% acetonitrile). Pure bis-nitro intermediate was then dissolved in dichloromethane/methanol (3:1, for H 2:1) and 10% Pd/C (0.1 eq.) was added. After three vacuum/H₂ cycles the reaction was stirred under H₂ atmosphere (1 atm) overnight. The reaction was filtered over celite and concentrated in vacuo. Pure products were obtained without further purification. Analytical data of compounds H-K match the literature.[2][3][4]

Bis(4-aminophenoxy) methane (H)

Dichloromethane (192 µL, 3.0 mmol), 4-nitrophenol (1.67 g, 12 mmol) and potassium carbonate (1.24 g, 9.0 mmol) were used following the general procedure for synthesis of bis-anilines to give compound H (326 mg, 1.42 mmol, 47% over two steps) as light-brown solid.

¹H NMR (500 MHz, Methanol-d₄) δ 6.91-6.84 (m, 4H, ArH), 6.74-6.68 (m, 4H, ArH), 5.52 (s, 2H, CH₂).

¹³C NMR (126 MHz, Methanol-d₄) δ 151.77 (2C, ArC), 142.80 (2C, ArC), 118.98 (4C, ArCH), 118.07 (4C, ArCH), 94.31 (1C, CH₂).

HPLC-MS: [C13H₁₄O₂+H]⁺ calcd. 231.11, found 231.04.
HRMS: [C13H₁₄O₂+H]⁺ calcd. 231.1128, found 231.1125.

Bis(4-aminophenoxy) ethane (I)

1,2-Dichloroethane (181 µL, 2.3 mmol), 4-nitrophenol (1.11 g, 8 mmol) and potassium carbonate (829 mg, 6.0 mmol) were used following the general procedure for synthesis of bis-anilines to give compound I (182 mg, 0.75 mmol, 33% over two steps) as brown-gray solid.

$^1$H NMR (500 MHz, DMSO-$d_6$) δ 6.81-6.71 (m, 4H, ArH), 6.70-6.54 (m, 4H, ArH), 4.12 (s, 4H, C$\underline{H}_2$).

$^{13}$C NMR (126 MHz, DMSO-$d_6$) δ 150.95 (2C, ArC), 139.66 (2C, ArC), 116.45 (4C, ArCH), 115.44, (4C, ArCH) 66.93 (2C, CH$_2$).

HPLC-MS: [C14H$_{16}$O$_2$+H]$^+$ calcd. 245.13, found 245.05.

HRMS: [C$_{14}$H$_{16}$O$_2$+H]$^+$ calcd. 245.1285, found 245.1281.

Bis(4-aminophenoxy) propane (J)

1,3-Dichloropropane (190 µL, 2.0 mmol), 4-nitrophenol (1.11 g, 8 mmol) and potassium carbonate (829 mg, 6.0 mmol) were used following the general procedure for synthesis of bis-anilines to give compound J (342 mg, 1.32 mmol, 67% over two steps) as brown-gray solid.

$^1$H NMR (500 MHz, Methanol-$d_4$) δ 6.84-6.67 (m, 8H, ArH), 4.06 (t, J=6.2 Hz, 4H, C$\underline{H}_2$CH$_2$C$\underline{H}_2$), 2.18-2.07 (m, 2H, CH$_2$C$\underline{H}_2$CH$_2$).

$^{13}$C NMR (126 MHz, Methanol-$d_4$) δ 154.21 (2C, ArC), 140.39 (2C, ArC), 118.73 (4C, ArCH), 116.67 (4C, ArCH), 66.38 (2C, $\underline{C}$H$_2$CH$_2$CH$_2$), 30.67 (1C, CH$_2\underline{C}$H$_2$CH$_2$).

HPLC-MS: [C$_{15}$H$_{13}$O$_2$+H]$^+$ calcd. 259.14, found 259.06.

HRMS: [C$_{15}$H$_{19}$O$_2$+H]$^+$ calcd. 259.1441, found 259.1438.

Bis(4-aminophenoxy) butane (K)

1,4-Dibromobutane (236 µL, 2.0 mmol), 4-nitrophenol (1.11 g, 8 mmol) and potassium carbonate (829 mg, 6.0 mmol) were used following the general procedure for synthesis of bis-anilines to give compound K (562 mg, 2.1 mmol, quant. over two steps) as brown-gray solid.

$^1$H NMR (500 MHz, Methanol-$d_4$) δ 6.77 (s, 8H, ArH), 4.04-3.89 (m, 4H, C$\underline{H}_2$CH$_2$CH$_2$C$\underline{H}_2$), 2.00-1.78 (m, 4H, CH$_2$C$\underline{H}_2$C$\underline{H}_2$CH$_2$).

$^{13}$C NMR (126 MHz, Methanol-$d_4$) δ 153.35 (2C, ArC), 137.81 (2C, ArC), 117.78 (4C, ArCH), 115.24 (4C, ArCH), 67.96 (2C, $\underline{C}$H$_2$CH$_2$CH$_2$CH$_2$), 25.85 (2C, CH$_2\underline{C}$H$_2\underline{C}$H$_2$CH$_2$).

HPLC-MS: [C$_{16}$H$_{20}$O$_2$+H]$^+$ calcd. 273.16, found 273.07.

HRMS: [C$_{16}$H$_{20}$O$_2$+H]$^+$ calcd. 273.1598, found 273.1594.

Methyl 4-(2',3',4',6'-tetra-O-acetyl)-β-D-galactopyranosyl coumarate (24)

Methyl p-coumarate was synthesised in analogy to Menon et. al.[5] p-Coumaric acid (21, 1.5 g, 9.3 mmol) was dissolved methanol (30 mL). H$_2$SO$_4$ (conc., 1 mL) was added and the reaction was refluxed (65° C.) for 3 h. The reaction mixture was concentrated in vacuo, diluted with water and neutralised with satd. NaHCO$_3$ solution. The product 22 was extracted to ethyl acetate, combined organic layers were washed with half satd. brine, dried with Na$_2$SO$_4$, filtered and dried in vacuo. Pure methyl p-coumarate (22, 1.7 g, 9.3 mmol, quant.) was obtained without further purification. β-D-galactopyranose pentaacetate (2, 510.8 mg, 1.31 mmol) and methyl p-coumarate (22, 466.4 mg, 2.62 mmol) were dissolved in dry chloroform (20 mL). Reaction mixture was cooled to 0° C. and BF$_3$·OEt$_2$ (1 mL, 7.85 mmol) was added dropwise. Mixture was allowed to warm to room temperature and stirred for 5 h. The reaction was poured over ice cold satd. NaHCO$_3$ and diluted with dichloromethane. Organic phase was washed with satd. NaHCO$_3$ solution and brine, dried over anhydrous Na$_2$SO$_4$, filtered and concentrated in vacuo. The product 24 was purified by normal phase MPLC (petrol ether/ethyl acetate, gradient of 15-50% ethyl acetate). Compound 24 (162.8 mg, 0.32 mmol, 24%) was obtained as white solid.

$^1$H NMR (500 MHz, CDCl$_3$) δ 7.64 (d, J=16.0 Hz, 1H, C$\underline{H}$=CHCOOCH$_3$), 7.50-7.44 (m, 2H, ArH), 7.03-6.97 (m, 2$\underline{H}$, ArH), 6.34 (d, J=16.0 Hz, 1H, CH=C$\underline{H}$COOCH$_3$), 5.49 (dd, J=10.4, 7.9 Hz, 1H, H-2), 5.46 (dd, J=3.5, 1.1 Hz, 1H, H-4), 5.12 (dd, J=10.5, 3.5 Hz, 1H, H-3), 5.09 (d, J=7.9 Hz, 1H, H-1), 4.26-4.13 (m, 2H, H-6), 4.08 (td, J=6.6, 1.2 Hz, 1H, H-5), 3.80 (s, 3H, CH=CHCOOC$\underline{H}_3$), 2.18 (s, 3H, CH$_3$), 2.06 (s, 6H, CH$_3$), 2.01 (s, 3H, C$\underline{H}_3$).

$^{13}$C NMR (126 MHz, CDCl$_3$) δ 170.48 (1C, C=O), 170.35 (1C, C=O), 170.26 (1C, C=O), 169.49 (1C, C=O), 167.63 (1C, C=O), 158.43 (1C, ArC), 144.04 (1C, $\underline{C}$H=CHCOOCH$_3$), 129.75 (2C, ArCH), 129.71 (1C, ArC), 117.18 (2C, ArCH), 116.88 (1C, CH=$\underline{C}$HCOOCH$_3$), 99.25 (1C, C-1), 71.30 (1C, C-5), 70.89 (1C, C-3), 68.64 (1C, C-2), 66.93 (1C, C-4), 61.47 (1C, C-6), 51.84 (1C, COO$\underline{C}$H$_3$), 20.86 (1C, CH$_3$), 20.80 (2C, CH$_3$), 20.72 (1C, CH$_3$).

HPLC-MS: [C$_{24}$H$_{28}$O$_{12}$+NH$_4$]$^+$ calcd. 526.19, found 526.14.

HRMS: [C$_{24}$H$_{28}$O$_{12}$+NH$_4$]$^+$ calcd. 526.1919, found 526.1923.

Benzyl 4-(2',3',4',6'-tetra-O-acetyl)-β-D-galactopyranosyl coumarate (25)

Benzyl p-coumarate 23 was synthesised in analogy to Guo et. al.[6] p-Coumaric acid (21, 1.0 g, 6.2 mmol) was dissolved in dimethylformamide (30 mL) and Na$_2$CO$_3$ (1.5 g, 14.5 mmol) was added. Benzyl bromide (1.5 mL, 12.5 mmol) was added dropwise and stirred overnight. The reaction was concentrated in vacuo, diluted with water and the product was extracted into ethyl acetate, washed with half satd. brine, dried with over anhydrous Na$_2$SO$_4$, filtered and concentrated in vacuo. Reaction crude was purified by normal phase MPLC (petrol ether/ethyl acetate, gradient of 10-40% ethyl acetate) to give pure benzyl p-coumarate (23, 1.3 g, 5.0 mmol, 800%). β-D-galactopyranose pentaacetate (2, 1.0 g, 2.6 mmol) and benzyl p-coumarate 23 (1.3 g, 5.0 mmol) were dissolved in dry chloroform (20 mL) in a round bottom flask with powdered activated molecular sieve (3 Å). Reaction mixture was cooled to 0° C. and BF$_3$·OEt$_2$ (1.9 mL, 15.2 mmol) was added dropwise. Mixture was allowed to warm to room temperature and stirred overnight. The reaction was poured over ice cold satd. NaHCO$_3$ solution and diluted with dichloromethane. Organic phase was washed with satd. NaHCO$_3$ solution and half satd. brine, dried over anhydrous Na$_2$SO$_4$, filtered and concentrated in vacuo. The product 25 was purified by normal phase MPLC (petrol ether/ethyl acetate, gradient of 20-40% ethyl acetate). Compound 25 (1.1 g, 2.0 mmol, 76%) was obtained as white solid.

$^1$H NMR (500 MHz, CDCl$_3$) δ 7.68 (d, J=16.0 Hz, 1H, C$\underline{H}$=CHCOOBn), 7.50-7.44 (m, 2H, ArH), 7.44-7.32 (m, 5$\underline{H}$, Bn), 7.02-6.97 (m, 2H, ArH), 6.39 (d, J=16.0 Hz, 1H, CH=CHCOOBn), 5.50 (dd, J=10.5, 7.9 Hz, 1H, H-2), 5.46 (dd, J=3.5, 1.1 Hz, 1H, H-4), 5.24 (s, 2H, Bn), 5.11 (dd, J=10.4, 3.4 Hz, 1H, H-3), 5.08 (d, J=7.9 Hz, 1H, H-1), 4.26-4.12 (m, 2H, H-6), 4.08 (ddd, J=7.2, 6.2, 1.2 Hz, 1H, H-5), 2.19 (s, 3H, CH$_3$), 2.06 (s, 6H, CH$_3$), 2.02 (s, 3H, CH$_3$).

$^{13}$C NMR (126 MHz, CDCl$_3$) δ 170.51 (1C, C=O), 170.37 (1C, C=O), 170.28 (1C, C=O), 169.52 (1C, C=O), 167.01 (1C, C=O), 158.43 (1C, ArC), 144.35 (1C, CH=CHCOOBn), 136.14 (1C, Bn), 129.79 (2C, ArCH), 129.63 (1C, ArC), 128.75 (2C, Bn), 128.47 (2C, Bn), 128.43 (1C, Bn), 117.12 (2C, ArCH), 116.88 (1C, CH=CHCOOBn), 99.16 (1C, C-1), 71.26 (1C, C-5), 70.86 (1C, C-3), 68.57 (1C, C-2), 66.89 (1C, C-4), 66.51 (1C, Bn), 61.47 (1C, C-6), 20.89 (1C, CH$_3$), 20.83 (2C, CH$_3$), 20.75 (1C, CH$_3$).

HPLC-MS: [C$_{30}$H$_{32}$O$_{12}$+NH$_4$]$^+$ calcd. 602.22, found 602.17.

HRMS: [C$_{30}$H$_{32}$O$_{12}$+NH$_4$]$^+$ calcd. 602.2232, found 602.2234.

4-O-β-D-galactopyranosyl trans-p-coumaric acid (26)

Compound 24 (124.3 mg, 0.24 mmol) was dissolved in methanol (6.2 mL). Water (4.1 mL) and sodium hydroxide solution (2.1 mL, 1 M, 1.96 mmol) were added. The reaction mixture was stirred for 1 h at rt, then neutralised with Amberlite IR 120/H$^+$ and concentrated in vacuo. The product 25 was purified by normal phase MPLC (dichloromethane/methanol with 1% formic acid, gradient of 1-20% methanol). Compound 26 (66.1 mg, 0.20 mmol, 83%) was obtained as white solid.

Compound 25 (1.1 g, 2.0 mmol) was suspended in methanol (48 mL). Water (32 mL) and sodium hydroxide solution (16 mL, 1 M, 16 mmol) were added. The reaction mixture was heated to 50° C. and stirred for 2 h. Reaction was neutralised with Amberlite IR 120/H$^+$ and concentrated in vacuo. The product 25 was purified by normal phase MPLC (dichloromethane/methanol with 1% formic acid, gradient of 1-20% methanol). Compound 26 (554.2 mg, 1.7 mmol, 76%) was obtained as white solid.

Synthesis of compound 26 was first described by Takada et. al.[7]

$^1$H NMR (500 MHz, Methanol-d$_4$) δ 7.61 (d, J=15.9 Hz, 1H, CH=CHCOOH), 7.57-7.51 (m, 2H, ArCH), 7.16-7.11 (m, 2H, ArCH), 6.37 (d, J=16.0 Hz, 1H, CH=CHCOOH), 4.92 (d, J=7.8 Hz, 1H, H-1), 3.93-3.90 (m, 1H, H-4), 3.84-3.69 (m, 4H. H-2, H-5, H-6), 3.59 (dd, J=9.7, 3.4 Hz, 1H, H-3).

$^{13}$C NMR (126 MHz, Methanol-d$_4$) δ 171.24 (1C, COOH), δ 160.82 (1C, ArC), 145.43 (1C, CH=CHCOOH), 130.63 (2C, ArCH), 130.05 (1C, ArC), 118.00 (3C, ArCH, CH=CHCOOH), 102.49 (1C, C-1), 77.07 (1C, C-5), 74.81 (1C, C-3), 72.18 (1C, C-2), 70.20 (1C, C-4), 62.40 (1C, C-6).

HPLC-MS: [C$_{15}$H$_{18}$O$_8$+HCOO]$^-$ calcd. 371.10, found 370.94.

HRMS: [C$_{15}$H$_{18}$O$_8$+ HCOO]$^-$ calcd. 371.0984, found 371.0982.

Divalent Ligand G18

4,4'-Oxydianiline (G, 10.1 mg, 0.05 mmol), compound 26 (38.2 mg, 0.12 mmol), HBTU (53.1 mg, 0.14 mmol) were dissolved in dimethylformamide (1 mL) and DIPEA (50 µL, 0.29 mmol) was added. Reaction was stirred at r.t. overnight, then dried in vacuo. The product was purified by C18 column preparative HPLC chromatography (water/acetonitrile with 1% formic acid, gradient of 20-35% acetonitrile). Compound G18 (28.3 mg, 34.6 µmol, 69%) was obtained as pale-yellow solid.

$^1$H NMR (500 MHz, DMSO-d$_6$) δ 10.18 (s, 2H, NH), 7.73-7.67 (m, 4H, ArH), 7.60-7.50 (m, 6H, ArH, CH=CHCONH), 7.11-7.04 (m, 4H, ArH), 7.02-6.95 (m, 4H, ArH), 6.68 (d, J=15.7 Hz, 2H, CH=CHCONH), 4.90 (d, J=7.7 Hz, 2H, H-1), 3.81-3.35 (m, 12H, H-2, H-3, H-4, H-5, H-6).

$^{13}$C NMR (126 MHz, DMSO-d$_6$) δ 163.64 (2C, C=O), 158.75 (2C, ArC), 152.55 (2C, ArC), 139.74 (2C, CH=CHCONH), 135.00 (2C, ArC), 129.24 (4C, ArCH), 128.36 (2C, ArC), 120.82 (4C, ArCH), 120.15 (2C, CH=CHCONH), 118.85 (4C, ArCH), 116.63 (4C, ArCH), 100.66 (2C, C-1), 75.62 (2C, C-5), 73.29 (2C, C-3), 70.24 (2C, C-2), 68.15 (2C, C-4), 60.38 (2C, C-6).

HPLC-MS: [C$_{42}$H$_{44}$N$_2$O$_{15}$+H]$^+$ calcd. 817.28, found 817.33.

HRMS: [C$_{42}$H$_{44}$N$_2$O$_{15}$+H]$^+$ calcd. 817.2814, found

Divalent Ligand H18

Bis(4-aminophenoxy)methane (H, 7.9 mg, 0.03 mmol), compound 26 (25.3 mg, 0.08 mmol), HBTU (32.7 mg, 0.09 mmol) were dissolved in dimethylformamide (3 mL) and DIPEA (9 µL, 0.05 mmol) was added. Reaction was stirred at r.t. for 2 days, then dried in vacuo. The product H18 was purified by C18 column preparative HPLC chromatography (water/acetonitrile with 1% formic acid, gradient of 25-45% acetonitrile). Compound H18 (6.9 mg, 8.1 µmol, 24%) was obtained as white solid.

$^1$H NMR (500 MHz, DMSO-d$_6$) δ 10.07 (s, 2H, NH), 7.67-7.60 (m, 4H, ArH), 7.59-7.54 (m, 4H, ArH), 7.52 (d, J=15.6 Hz, 2H, CH=CHCONH), 7.12-7.02 (m, 8H, ArH), 6.67 (d, J=15.6 Hz, 2H, CH=CHCONH), 5.77 (s, 2H, CH$_2$), 5.19 (d, J=5.2 Hz, 2H, OH-2), 4.92-4.84 (m, 4H, H-1, OH-3), 4.66 (t, J=5.5 Hz, 2H, OH-6), 4.52 (d, J=4.6 Hz, 2H, OH-4), 3.71 (t, J=4.1 Hz, 2H, H-4), 3.64-3.45 (m, 8H, H-2, H-5, H-6), 3.42 (ddd, J=9.3, 5.3, 3.2 Hz, 2H, H-3).

$^{13}$C NMR (126 MHz, DMSO-d$_6$) δ 163.49 (2C, C=O), 158.68 (2C, ArC), 152.19 (2C, ArC), 139.52 (2C, CH=CHCONH), 134.09 (2C, ArC), 129.14 (4C, ArCH), 128.38 (2C, ArC), 120.59 (4C, ArCH), 120.23 (2C, CH=CHCONH), 116.60 (4C, ArCH), 116.59 (4C, ArCH), 100.68 (2C, C-1), 90.81 (1C, CH$_2$), 75.58 (2C, C-5), 73.27 (2C, C-3), 70.22 (2C, C-2), 68.12 (2C, C-4), 60.36 (2C, C-6).

HPLC-MS: [C$_{43}$H$_{46}$N$_2$O$_{16}$+H]$^+$ calcd. 847.29, found 847.33

HRMS: [C$_{43}$H$_{46}$N$_2$O$_{16}$+H]$^+$ calcd. 847.2920, found 847.2924.

Divalent Ligand I18

Bis(4-aminophenoxy)ethane (I, 7.3 mg, 0.03 mmol), compound 26 (21.6 mg, 0.07 mmol), HBTU (25.2 mg, 0.07 mmol) were dissolved in dimethylformamide (4 mL) and DIPEA (7 µL, 0.04 mmol) was added. Reaction was stirred at r.t. for 2 days, then dried in vacuo. The product I18 was purified by C18 column preparative HPLC chromatography (water/acetonitrile supplemented with 1% formic acid, gradient of 25-45% acetonitrile). Compound I18 (4.5 mg, 5.2 µmol, 17%) was obtained as white solid.

$^1$H NMR (500 MHz, DMSO-d$_6$) δ 10.04 (s, 2H, NH), 7.65-7.60 (m, 4H, ArH), 7.58-7.54 (m, 4H, ArH), 7.52 (d, J=15.5 Hz, 2H, CH=CHCONH), 7.08 (d, J=8.7 Hz, 4H, ArH), 7.01-6.91 (m, 4H, ArH), 6.67 (d, J=15.7 Hz, 2H, CH=CHCONH), 4.89 (d, J=7.7 Hz, 2H, H-1), 4.28 (s, 4H, CH$_2$), 3.70 (d, J=3.3 Hz, 2H, H-4), 3.63-3.46 (m, 8H, H-2, H-5, H-6), 3.42 (dd, J=9.5, 3.3 Hz, 4H, H-3).

$^{13}$C NMR (126 MHz, DMSO-d$_6$) δ 163.41 (2C, C=O), 158.67 (2C, ArC), 154.29 (2C, ArC), 139.39 (2C, CH=CHCONH), 132.85 (2C, ArC), 129.16 (4C, ArCH), 128.43 (2C, ArC), 120.64 (4C, ArCH), 120.32 (2C, CH=CHCONH), 116.61 (4C, ArCH), 114.65 (4C, ArCH), 100.67 (2C, C-1), 75.60 (2C, C-5), 73.28 (2C, C-3), 70.23 (2C, C-2), 68.14 (2C, C-4), 66.51 (2C, CH$_2$), 60.37 (2C, C-6).

HPLC-MS: [C$_{44}$H$_{48}$N$_2$O$_{16}$+H]$^+$ calcd. 861.31, found 861.36.

HRMS: [C$_{44}$H$_{48}$N$_2$O$_{16}$+H]$^+$ calcd. 861.3077, found 861.3083.

Divalent Ligand J18

Bis(4-aminophenoxy)propane (J, 11.2 mg, 43.3 µmol), compound 26 (30.8 mg, 94.4 µmol), HBTU (38.1 mg, 0.10 mmol) were dissolved in dimethylformamide (1 mL) and DIPEA (20 µL, 0.11 mmol) was added. Reaction was stirred at r.t. overnight, then dried in vacuo. The product J18 was purified by C18 column preparative HPLC chromatography (water/acetonitrile with 1% formic acid, gradient of 20-50% acetonitrile). Compound J18 (25.9 mg, 29.6 µmol, 68%) was obtained as pale-yellow solid.

$^1$H NMR (500 MHz, DMSO-d$_6$) δ 10.02 (s, 2H, NH), 7.63-7.58 (m, 4H, ArH), 7.58-7.53 (m, 4H, ArH), 7.51 (d, J=15.6 Hz, 2H, CH=CHCONH), 7.10-7.05 (m, 4H, ArH), 6.96-6.91 (m, 4H, ArH), 6.66 (d, J=15.7 Hz, 2H, CH=CHCONH), 5.21 (s, 2H, OH-2), 4.89 (d, J=7.7 Hz, 4H, H-1, OH-3), 4.68 (s, 2H, OH-6), 4.55 (s, 2H, OH-4), 4.10 (t, J=6.2 Hz, 4H, CH$_2$CH$_2$CH$_2$), 3.70 (d, J=3.2 Hz, 2H, H-4), 3.63-3.46 (m, 8H, H-2, H-5, H-6), 3.41 (dd, J=9.5, 3.3 Hz, 2H, H-3), 2.20-2.11 (m, 2H, CH$_2$CH$_2$CH$_2$).

$^{13}$C NMR (126 MHz, DMSO-d$_6$) δ 163.39 (2C, C=O), 158.67 (2C, ArC), 154.47 (2C, ArC), 139.36 (2C, CH=CHCONH), 132.70 (2C, ArC), 129.16 (4C, ArCH), 128.43 (2C, ArC), 120.63 (4C, ArCH), 120.34 (2C, CH=CHCONH), 116.61 (4C, ArCH), 114.60 (4C, ArCH), 100.67 (2C, C-1), 75.61 (2C, C-5), 73.28 (2C, C-3), 70.23 (2C, C-2), 68.15 (2C, C-4), 64.37 (2C, CH$_2$CH$_2$CH$_2$), 60.38 (2C, C-6), 28.77 (1C, CH$_2$CH$_2$CH$_2$).

HPLC-MS: [C$_{45}$H$_{50}$N$_2$O$_{16}$+H]$^+$ calcd. 875.32, found 875.40.

HRMS: [C$_{45}$H$_{50}$N$_2$O$_{16}$+H]$^+$ calcd. 875.3233, found 875.3223.

Divalent Ligand K18

Bis(4-aminophenoxy)butane (K, 11.7 mg, 43.0 µmol), compound 26 (33.3 mg, 102 µmol), HBTU (37.1 mg, 97.8 µmol) were dissolved in dimethylformamide (1 mL) and DIPEA (20 µL, 0.11 mmol) was added. Reaction was stirred at r.t. overnight, then dried in vacuo. The product K18 was purified by C18 column preparative HPLC chromatography (water/acetonitrile with 1% formic acid, gradient of 25-45% acetonitrile). Compound K18 (22.8 mg, 25.6 µmol, 60%) was obtained as pale-yellow solid.

$^1$H NMR (500 MHz, DMSO-d$_6$) δ 10.00 (s, 2H, NH), 7.62-7.58 (m, 4H, ArH), 7.58-7.54 (m, 4H, ArH), 7.51 (d, J=15.6 Hz, 2H, CH=CHCONH), 7.08 (d, J=8.7 Hz, 4H, ArH), 6.94-6.89 (m, 4H, ArH), 6.67 (d, J=15.7 Hz, 2H, CH=CHCONH), 5.19 (d, J=5.2 Hz, 2H, OH-2), 4.93-4.84 (m, 4H, H-1, OH-3), 4.67 (t, J=5.5 Hz, 2H, OH-6), 4.52 (d, J=4.6 Hz, 2H, OH-4), 4.00 (d, J=5.7 Hz, 4H, CH$_2$CH$_2$CH$_2$CH$_2$), 3.71 (t, J=4.2 Hz, 2H, H-4), 3.63-3.46 (m, 8H, H-2, H-5, H-6), 3.45-3.39 (m, 2H, H-3), 1.90-1.80 (m, 4H, CH$_2$CH$_2$CH$_2$CH$_2$).

$^{13}$C NMR (126 MHz, DMSO-d$_6$) δ 163.36 (2C, C=O), 158.65 (2C, ArC), 154.61 (2C, ArC), 139.31 (2C, CH=CHCONH), 132.55 (2C, ArC), 129.11 (4C, ArCH), 128.44 (2C, ArC), 120.64 (2C, ArC), 120.36 (2C, CH=CHCONH), 116.61 (4C, ArCH), 114.57 (4C, ArCH), 100.69 (2C, C-1), 75.59 (2C, C-5), 73.28 (2C, C-3), 70.23 (2C, C-2), 68.14 (2C, C-4), 67.29 (2C, CH$_2$CH$_2$CH$_2$CH$_2$), 60.37 (2C, C-6), 25.50 (2C, CH$_2$CH$_2$CH$_2$CH$_2$).

HPLC-MS: [C$_{46}$H$_{52}$N$_2$O$_{16}$+H]$^+$ calcd. 889.34, found 889.42.

HRMS: [C$_{46}$H$_{52}$N$_2$O$_{16}$+H]$^+$ calcd. 889.3423, found 889.3383.

Monovalent Ligand L18

4-methoxyaniline (L, 20.8 mg, 169 µmol), compound 26 (33.9 mg, 104 µmol), HBTU (51.4 mg, 136 µmol) were dissolved in dimethylformamide (1 mL) and DIPEA (30 µL, 172 µmol) was added. Reaction was stirred at r.t. for 1 h, then diluted with water and lyophilized. The product L18 was purified by C18 column preparative HPLC chromatography (water/acetonitrile with 1% formic acid, gradient of 15-40% acetonitrile). Compound L18 (15.9 mg, 37 µmol, 35%) was obtained as white solid.

$^1$H NMR (500 MHz, DMSO-d$_6$) δ 10.00 (s, 1H, NH), 7.63-7.58 (m, 2H, ArH), 7.58-7.53 (m, 2H, ArH), 7.51 (d, J=15.7 Hz, 1H, CH=CHCONH), 7.11-7.05 (m, 2H, ArH), 6.94-6.86 (m, 2H, ArH), 6.66 (d, J=15.7 Hz, 1H, CH=CHCONH), 4.89 (d, J=7.7 Hz, 11H, H-1), 3.73 (s, 3H, OCH$_3$), 3.71 (d, J=3.0 Hz, 1H, H-4), 3.63-3.47 (m, 4H, H-2, H-5, H-6), 3.44-3.40 (m, 1H, H-3).

$^{13}$C NMR (126 MHz, DMSO-d$_6$) δ 163.37 (1C, C=O), 158.65 (1C, ArC), 155.23 (1C, ArC), 139.31 (1C, CH=CHCONH), 132.58 (1C, ArC), 129.11 (2C, ArCH), 128.43 (1C, ArC), 120.65 (2C, ArCH), 120.34 (1C, CH=CHCONH), 116.61 (2C, ArCH), 113.95 (2C, ArCH), 100.69 (1C, C-1), 75.59 (1C, C-5), 73.28 (1C, C-3), 70.23 (1C, C-2), 68.13 (1C, C-4), 60.37 (1C, C-6), 55.19 (1C, OCH$_3$).

HPLC-MS: [C$_{22}$H$_{25}$NO$_8$+H]$^+$ calcd. 432.17, found 432.13.

HRMS: [C$_{22}$H$_{25}$NO$_8$+H]$^+$ calcd. 432.1653, found 432.1652.

Scheme 6: Synthesis of divalent LecA ligands based on phenyl propanoic acid.

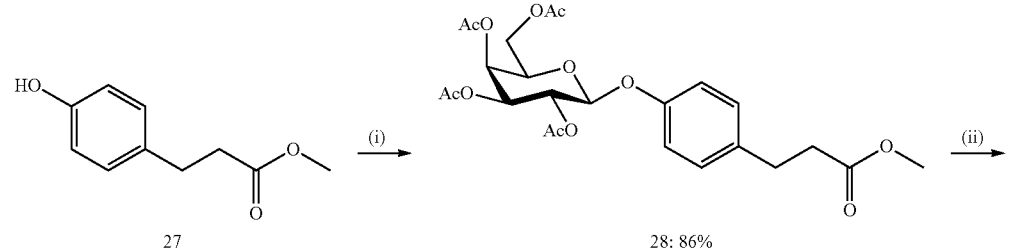

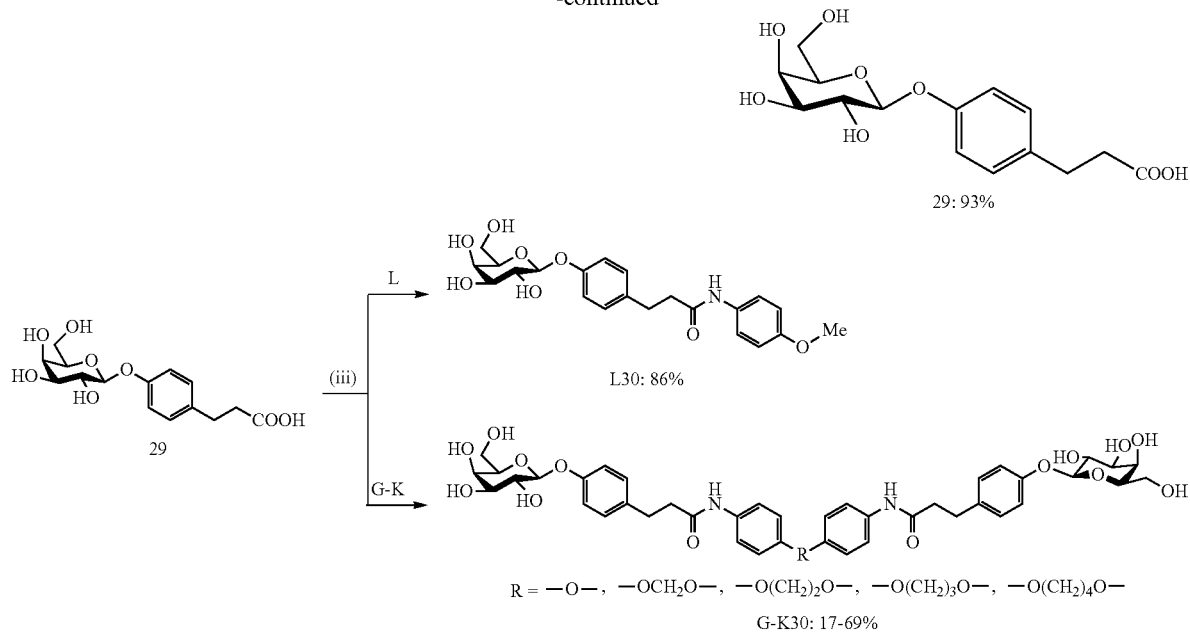

(i) β-D-galactopyranose pentaacetate (2), BF₃·Et₂O, CH₂Cl₂, 0° C.-r.t., o.n.; (ii) NaOH, H₂O/MeOH (1:1), r.t., 1 h; (iii) HBTU, DIPEA, DMF, r.t., 1 h-3 d; o.n. = overnight.

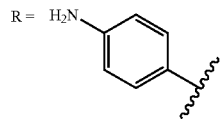

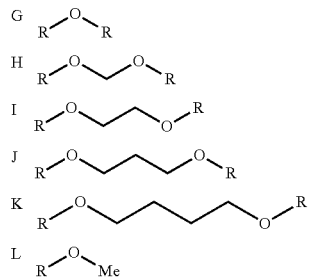

3-Methyl 4-phenyl(2',3',4',6'-tetra-O-acetyl)-β-D-galactopyranosyl propanoate (28)

β-D-galactopyranose pentaacetate (2, 1.5 g, 3.9 μmmol) and methyl 3-(4-hydroxyphenyl)propanoate (27, 1.4 g, 7.8 mmol) were dissolved in dry chloroform (20 mL) in a round bottom flask with powdered activated molecular sieve (3 Å). Reaction mixture was cooled to 0° C. and BF₃·OEt₂ (2.4 mL, 19.5 mmol) was added dropwise. Mixture was allowed to warm to room temperature and stirred overnight. The reaction was poured over ice cold satd. NaHCO₃ solution and diluted with dichloromethane. Organic phase was washed with satd. NaHCO₃ solution and half satd. brine, dried over anhydrous Na₂SO₄, filtered and concentrated in vacuo. The product 28 was purified by normal phase MPLC (petrol ether/ethyl acetate, gradient of 15-50% ethyl acetate). Compound 28 (1.8 mg, 3.4 mmol, 86%) was obtained as white solid.

$^1$H NMR (500 MHz, CDCl₃) δ 7.15-7.08 (m, 2H, ArH), 6.95-6.89 (m, 2H, ArH), 5.50-5.43 (m, 2H, H-2, H-4), 5.09 (dd, J=10.5, 3.4 Hz, 1H, H-3), 5.00 (d, J=8.0 Hz, 11H, H-1), 4.26-4.12 (m, 2H, H-6), 4.04 (td, J=6.7, 1.2 Hz, 1H, H-5), 3.66 (s, 3H, CH₂CH₂COOC$\underline{H}$₃), 2.90 (t, J=7.7 Hz, 2H, C$\underline{H}$₂CH₂COOCH₃), 2.60 (dd, J=8.2, 7.2 Hz, 2H, CH₂C$\underline{H}$₂COOCH₃), 2.18 (s, 3H, CH₃), 2.06 (s, 3H, CH₃), 2.06 (s, 3H, CH₃), 2.01 (s, 3H, CH₃).

$^{13}$C NMR (126 MHz, CDCl₃) δ 173.37 (1C, C=O), 170.50 (1C, C=O), 170.40 (1C, C=O), 170.29 (1C, C=O), 169.53 (1C, C=O), 155.60 (1C, ArC), 135.63 (1C, ArC), 129.50 (2C, ArCH), 117.20 (2C, ArCH), 99.97 (1C, C-1), 71.10 (1C, C-5), 70.99 (1C, C-3), 68.79 (1C, C-2), 67.01 (1C, C-4), 61.48 (1C, C-6), 51.78 (1C, CH₂CH₂COOOCH₃), 35.92 (1C, C$\underline{H}$₂CH₂COOCH₃), 30.25 (1C, CH₂C$\underline{H}$₂COOCH₃), 20.88 (1$\overline{C}$, CH₃), 20.81 (2C, CH₃), 20.73 (1$\overline{C}$, CH₃).

HPLC-MS: [C₂₄H₃₀O₁₂+NH₄]⁺ calcd. 528.21, found 528.21.

HRMS: [C₂₄H₃₀O₁₂+NH₄]⁺ calcd. 528.2074, found 528.2080.

4-(β-D-galactopyranosyloxy)benzenepropanoic acid (29)

Compound 28 (179.8 mg, 0.35 mmol) was dissolved in methanol (8.5 mL). Water (5.6 mL) and of sodium hydroxide solution (2.8 mL, 1 M, 2.82 mmol) were added. The reaction mixture was stirred for 1 h at r.t, then neutralised with Amberlite IR 120/H⁺ and concentrated in vacuo. The product 29 was purified by normal phase MPLC (dichloromethane/methanol with 1% formic acid, gradient of 1-20% methanol). Compound 29 (107.5 mg, 0.33 mmol, 93%) was obtained as white solid.

$^1$H NMR (500 MHz, DMSO-$d_6$) δ, 7.15-7.09 (m, 2H, ArH), 6.95-6.89 (m, 2H, ArH), 4.75 (d, J=7.6 Hz, 1H, H-1), 3.69 (d, J=3.3 Hz, 1H, H-4), 3.57-3.44 (m, 4H, H-2, H-5, H-6), 3.38 (dd, J=9.5, 3.3 Hz, 1H, H-3), 2.75 (t, J=7.6 Hz, 2H, C$\underline{H}_2$CH$_2$COOCH$_3$), 2.47 (t, J=7.6 Hz, 2H, CH$_2$C$\underline{H}_2$COOCH$_3$).

$^{13}$C NMR (126 MHz, DMSO-$d_6$) δ 174.09 (1C, C=O), 155.85 (1C, ArC), 134.16 (1C, ArC), 129.05 (2C, ArCH), 116.15 (2C, ArCH), 101.17 (1C, C-1), 75.46 (1C, C-5), 73.33 (1C, C-3), 70.30 (1C, C-2), 68.13 (1C, C-4), 60.38 (1C, C-6), 35.80 (1C, $\underline{C}$H$_2$CH$_2$COOH), 29.69 (1C, CH$_2$$\underline{C}$H$_2$COOH).

HPLC-MS: [C$_{15}$H$_{20}$O$_9$—H]⁻ calcd. 327.11, found 326.95.

HRMS: [C$_{15}$H$_{20}$O$_8$—H]⁻ calcd. 327.1085, found 327.1087.

Divalent Ligand G30

4,4'-Oxydianiline (G, 10.2 mg, 50.9 μmol), compound 29 (40.1 mg, 0.12 mmol), HBTU (50.9 mg, 0.14 mmol) were dissolved in dimethylformamide (1 mL) and DIPEA (25 μL, 0.14 mmol) was added. Reaction was stirred at r.t. for 3 h, then dried in vacuo. The product G30 was purified by C18 column preparative HPLC chromatography (water/acetonitrile with 1% formic acid, gradient of 15-40% acetonitrile). Compound G30 (10.2 mg, 12.4 μmol, 24°%) was obtained as white solid.

$^1$H NMR (500 MHz, DMSO-$d_6$) δ 9.91 (s, 2H, NH), 7.58-7.52 (m, 4H, ArH), 7.17-7.12 (m, 4H, ArH), 6.96-6.88 (m, 8H, ArH), 4.76 (d, J=7.7 Hz, 2H, H-1), 3.68 (d, J=3.3 Hz, 2H, H-4), 3.56-3.44 (m, 8H, H-2, H-5, H-6), 3.38 (dd, J=9.5, 3.3 Hz, 2H, H-3), 2.84 (t, J=7.6 Hz, 4H, C$\underline{H}_2$CH$_2$CONH), 2.56 (t, J=7.7 Hz, 4H, CH$_2$C$\underline{H}_2$CONH).

$^{13}$C NMR (126 MHz, DMSO-$d_6$) δ 170.23 (2C, C=O), 155.88 (2C, ArC), 152.38 (2C, ArC), 134.80 (2C, ArC), 134.34 (2C, ArC), 129.11 (4C, ArCH), 120.71 (4C, ArCH), 118.70 (4C, ArCH), 116.19 (4C, ArCH), 101.11 (2C, C-1), 75.47 (2C, C-5), 73.32 (2C, C-3), 70.31 (2C, C-2), 68.18 (2C, C-4), 60.42 (2C, C-6), 38.21 (2C, $\underline{C}$H$_2$CH$_2$CONH), 30.12 (2C, CH$_2$$\underline{C}$H$_2$CONH).

HPLC-MS: [C$_{42}$H$_{48}$N$_2$O$_{15}$+H]⁺ calcd. 821.31, found 821.30.

HRMS: [C$_{42}$H$_{48}$N$_2$O$_{15}$—H]⁻ calcd. 819.2982, found 819.2981.

Divalent Ligand H30

Bis(4-aminophenoxy)methane (H, 11.6 mg, 50.4 μmol), compound 29 (41.5 mg, 0.13 mmol), HBTU (48.7 mg, 0.13 mmol) were dissolved in dimethylformamide (1 mL) and DIPEA (25 μL, 0.14 mmol) was added. Reaction was stirred at r.t. for 3 h, then dried in vacuo. The product H30 was purified by C18 column preparative HPLC chromatography (water/acetonitrile with 1% formic acid, 15-40% acetonitrile). Compound H30 (39.3 mg, 46.2 μmol, 92%) was obtained as white solid.

$^1$H NMR (500 MHz, DMSO-$d_6$) δ 9.83 (s, 2H, NH), 7.54-7.47 (m, 4H, ArH), 7.17-7.11 (m, 4H, ArH), 7.04-6.96 (m, 4H, ArH), 6.96-6.89 (m, 4H, ArH), 5.72 (s, 2H, OCH$_2$O), 4.76 (d, J=7.7 Hz, 2H, H-1), 3.68 (d, J=3.3 Hz, 2H, H-4), 3.57-3.43 (m, 8H, H-2, H-5, H-6), 3.38 (dd, J=9.5, 3.3 Hz, 2H, H-3), 2.83 (t, J=7.7 Hz, 4H, C$\underline{H}_2$CH$_2$CONH), 2.58-2.52 (m, 4H, CH$_2$C$\underline{H}_2$CONH).

$^{13}$C NMR (126 MHz, DMSO-$d_6$) δ 170.11 (2C, C=O), 155.87 (2C, ArC), 152.03 (2C, ArC), 134.38 (2C, ArC), 133.97 (2C, ArC), 129.10 (4C, ArCH), 120.53 (4C, ArCH), 116.48 (4C, ArCH), 116.19 (4C, ArCH), 101.12 (2C, C-1), 90.78 (1C, OCH$_2$O), 75.47 (2C, C-5), 73.32 (2C, C-3), 70.31 (2C, C-2), 68.18 (2C, C-4), 60.42 (2C, C-6), 38.20 (2C, $\underline{C}$H$_2$CH$_2$CONH), 30.14 (2C, CH$_2$$\underline{C}$H$_2$CONH).

HPLC-MS: [C$_{43}$H$_{50}$N$_2$O$_{16}$+H]⁺ calcd. 851.32, found 851.32.

HRMS: [C$_{43}$H$_{50}$N$_2$O$_{16}$—H]⁻ calcd. 849.3088, found 849.3085.

Divalent Ligand I30

Bis(4-aminophenoxy)ethane (I, 14.6 mg, 59.8 μmol), compound 29 (47.2 mg, 144 μmol), HBTU (34.9 mg, 92.0 μmol) were dissolved in dimethylformamide (1 mL) and DIPEA (16 μL, 91.9 μmol) was added. Reaction was stirred at r.t. for 2 days, then dried in vacuo. The product I30 was purified by C18 column preparative HPLC chromatography (water/acetonitrile with 1% formic acid, gradient of 25-45% acetonitrile). Compound I30 (6.1 mg, 7.1 μmol, 12%) was obtained as white solid.

$^1$H NMR (500 MHz, DMSO-$d_6$) δ 9.76 (s, 2H, NH), 7.51-7.45 (m, 4H, ArH), 7.18-7.11 (m, 4H, ArH), 6.96-6.86 (m, 8H, ArH), 4.76 (d, J=7.7 Hz, 2H, H-1), 4.24 (s, 4H, CH$_2$), 3.68 (d, J=3.3 Hz, 2H, H-4), 3.56-3.44 (m, 8H, H-2, H-5, H-6), 3.38 (dd, J=9.5, 3.3 Hz, 2H, H-3), 2.84 (t, J=7.6 Hz, 4H, C$\underline{H}_2$CH$_2$CONH), 2.58-2.52 (m, 4H, CH$_2$C$\underline{H}_2$CONH).

$^{13}$C NMR (126 MHz, DMSO-$d_6$) δ 169.94 (2C, C=O), 155.84 (2C, ArC), 154.08 (2C, ArC), 134.39 (2C, ArC), 132.67 (2C, ArC), 129.06 (4C, ArCH), 120.59 (4C, ArCH), 116.19 (4C, ArCH), 114.50 (4C, ArCH), 101.14 (2C, C-1), 75.45 (2C, C-5), 73.31 (2C, C-3), 70.30 (2C, C-2), 68.16 (2C, C-4), 66.48 (2C, CH$_2$), 60.40 (2C, C-6), 38.16 (2C, $\underline{C}$H$_2$CH$_2$CONH), 30.14 (2C, CH$_2$$\underline{C}$H$_2$CONH).

HPLC-MS: [C$_{44}$H$_{52}$N$_2$O$_{16}$+H]⁺ calcd. 865.34, found 865.37.

HRMS: [C$_{44}$H$_{52}$N$_2$O$_{16}$+H]⁺ calcd. 865.3390, found 865.3389.

Divalent Ligand J30

Bis(4-aminophenoxy)propane (J, 11.7 mg, 45.3 μmol), compound 29 (34.3 mg, 104 μmol), HBTU (46.1 mg, 122 μmol) were dissolved in dimethylformamide (1 mL) and DIPEA (40 μL, 227 μmol) was added. Reaction was stirred at r.t. for 24 h, then dried in vacuo. The product J30 was purified by C18 column preparative HPLC chromatography (water/acetonitrile with 1% formic acid, gradient of 20-45% acetonitrile). Compound J30 (16.6 mg, 18.9 μmol, 42%) was obtained as white solid.

$^1$H NMR (500 MHz, DMSO-$d_6$) δ 9.74 (s, 2H, NH), 7.49-7.44 (m, 4H, ArH), 7.17-7.12 (m, 4H, ArH), 6.96-6.91 (m, 4H, ArH), 6.90-6.85 (m, 4H, ArH), 5.11 (d, J=5.1 Hz, 2H, OH-2), 4.83 (d, J=5.6 Hz, 2H, OH-3), 4.75 (d, J=7.7 Hz, 2H, H-1), 4.63 (t, J=5.3 Hz, 2H, OH-6), 4.47 (d, J=4.6 Hz, 2H, OH-4), 4.07 (t, J=6.3 Hz, 4H, C$\underline{H}_2$CH$_2$CH$_2$), 3.68 (t, J=4.1 Hz, 2H, H-4), 3.57-3.43 (m, 8H, H-2, H-5, H-6), 3.41-3.36 (m, 2H, H-3), 2.83 (t, J=7.7 Hz, 4H, C$\underline{H}_2$CH$_2$CONH), 2.56-2.51 (m, 4H, CH$_2$C$\underline{H}_2$CONH), 2.16-2.08 (m, 2H, CH$_2$C$\underline{H}_2$CH$_2$).

$^{13}$C NMR (126 MHz, DMSO-$d_6$) δ 169.91 (2C, C=O), 155.83 (2C, ArC), 154.25 (2C, ArC), 134.39 (2C, ArC), 132.52 (2C, ArC), 129.05 (4C, ArCH), 120.59 (4C, ArCH), 116.18 (4C, ArCH), 114.45 (4C, ArCH), 101.14 (2C, C-1), 75.44 (2C, C-5), 73.31 (2C, C-3), 70.29 (2C, C-2), 68.15 (2C, C-4), 64.34 (2C, $\underline{C}$H$_2$CH$_2$CH$_2$), 60.39 (2C, C-6), 38.15 (2C, $\underline{C}$H$_2$CH$_2$CONH), 30.14 (2C, CH$_2$$\underline{C}$H$_2$CONH), 28.74 (1C, CH$_2$$\underline{C}$H$_2$CH$_2$).

HPLC-MS: $[C_{45}H_{54}N_2O_{16}+H]^+$ calcd. 879.35, found 879.39.

HRMS: $[C_{45}H_{54}N_2O_{16}+H]^+$ calcd. 879.3546, found 879.3538.

Divalent Ligand K30

Bis(4-aminophenoxy)butane (K, 36.5 mg, 0.13 mmol), compound 29 (104 mg, 0.32 mmol), HBTU (142 mg, 0.37 mmol) were dissolved in dimethylformamide (3 mL) and DIPEA (60 µL, 0.34 mmol) was added. Reaction was stirred at r.t. for 2 h, then dried in vacuo. The product K30 was purified by C18 column MPLC (water/acetonitrile with 1% formic acid, gradient of 20-35% acetonitrile). Compound K30 (13.7 mg, 15.3 µmol, 11%) was obtained as white solid.

$^1$H NMR (500 MHz, DMSO-$d_6$) δ 9.77 (s, 2H, NH), 7.49-7.43 (m, 4H, ArH), 7.18-7.11 (m, 4H, ArH), 6.95-6.89 (m, 4H, ArH), 6.89-6.82 (m, 4H, ArH), 5.16 (d, J=5.2 Hz, 2H, OH-2), 4.91 (d, J=5.5 Hz, 2H, OH-3), 4.76 (d, J=7.7 Hz, 2H, H-1), 4.68 (t, J=5.3 Hz, 2H, OH-6), 4.54 (d, J=4.6 Hz, 2H, OH-4), 3.97 (d, J=5.4 Hz, 4H, CH$_2$CH$_2$CH$_2$CH$_2$), 3.68 (t, J=4.0 Hz, 2H, H-4), 3.57-3.42 (m, 8H, H-2, H-5, H-6), 3.41-3.37 (m, 2H, H-3), 2.83 (t, J=7.7 Hz, 4H, CH$_2$CH$_2$CONH), 2.56-2.51 (m, 4H, CH$_2$CH$_2$CONH), 1.88-1.78 (m, 4H, CH$_2$CH$_2$CH$_2$CH$_2$).

$^{13}$C NMR (126 MHz, DMSO-$d_6$) δ 169.93 (2C, C=O), 155.86 (2C, ArC), 154.41 (2C, ArC), 134.40 (2C, ArC), 132.43 (2C, ArC), 129.10 (4C, ArCH), 120.60 (4C, ArCH), 116.18 (4C, ArCH), 114.43 (4C, ArCH), 101.12 (2C, C-1), 75.47 (2C, C-5), 73.33 (2C, C-3), 70.31 (2C, C-2), 68.15 (2C, C-4), 67.24 (2C, CH$_2$CH$_2$CH$_2$CH$_2$), 60.40 (2C, C-6), 38.20 (2C, CH$_2$CH$_2$CONH), 30.19 (2C, CH$_2$CH$_2$CONH), 25.52 (2C, CH$_2$CH$_2$CH$_2$CH$_2$).

HPLC-MS: $[C_{46}H_{56}N_2O_{16}+H]^+$ calcd. 893.37, found 893.43.

HRMS: $[C_{46}H_{56}N_2O_{16}+H]^+$ calcd. 893.3736, found 893.3691.

Monovalent Ligand L30

4-methoxyaniline (L, 12.1 mg, 98.1 µmol), compound 29 (36.4 mg, 111 µmol), HBTU (47.1 mg, 124 µmol) were dissolved in dimethylformamide (1.5 mL) and DIPEA (20 µL, 115 µmol) was added. Reaction was stirred at r.t. for 3 h, then dried in vacuo. The product L30 was purified by C18 column preparative HPLC chromatography (water/acetonitrile supplemented with 1% formic acid, gradient of 15-40% acetonitrile). Compound L30 (36.7 mg, 84.7 µmol, 86%) was obtained as white solid.

$^1$H NMR (500 MHz, DMSO-$d_6$) δ 9.73 (s, 1H, NH), 7.50-7.44 (m, 2H, ArH), 7.18-7.11 (m, 2H, ArH), 6.96-6.91 (m, 2H, ArH), 6.88-6.82 (m, 2H, ArH), 4.75 (d, J=7.7 Hz, 1H, H-1), 3.71 (s, 3H, CH$_3$), 3.68 (d, J=3.3 Hz, 1H, H-4), 3.57-3.43 (m, 4H, H-2, H-5, H-6), 3.38 (dd, J=9.5, 3.3 Hz, 2H, H-3), 2.83 (t, J=7.7 Hz, 2H, CH$_2$CH$_2$CONH), 2.54 (dd, J=8.6, 6.8 Hz, 2H, CH$_2$CH$_2$CONH).

$^{13}$C NMR (126 MHz, DMSO-$d_6$) δ 169.91 (1C, C=O), 155.84 (1C, ArC), 155.04 (1C, ArC), 134.39 (1C, ArC), 132.42 (1C, ArC), 129.05 (2C, ArCH), 120.62 (2C, ArCH), 116.18 (2C, ArCH), 113.80 (2C, ArCH), 101.14 (1C, C-1), 75.44 (1C, C-5), 73.31 (1C, C-3), 70.30 (1 C, C-2), 68.15 (1C, C-4), 60.40 (1C, C-6), 55.14 (1C, CH$_3$), 38.14 (1C, CH$_2$CH$_2$CONH), 30.15 (1C, CH$_2$CH$_2$CONH).

HPLC-MS: $[C_{22}H_{27}NO_8+H]^+$ calcd. 434.18, found 434.08.

HRMS: $[C_{22}H_{27}NO_8+H]^+$ calcd. 434.1809, found 434.1809.

Scheme 7: Synthesis of pyridine-based divalent LecA ligands.

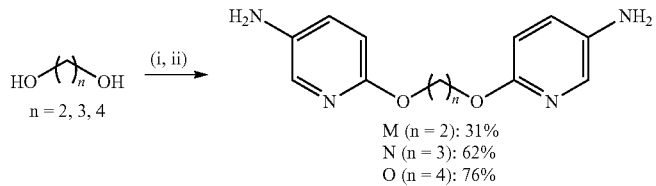

M (n = 2): 31%
N (n = 3): 62%
O (n = 4): 76%

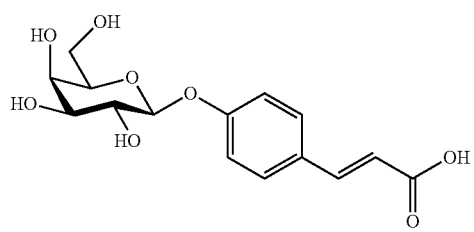

26

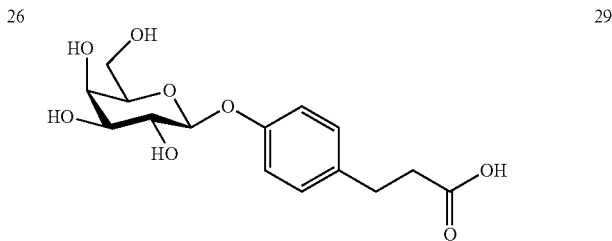

29

-continued

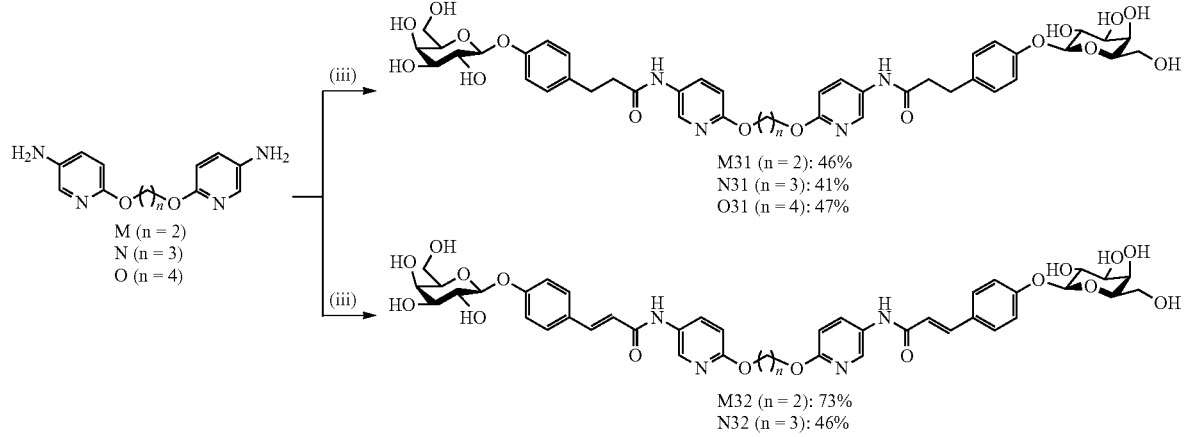

M31 (n = 2): 46%
N31 (n = 3): 41%
O31 (n = 4): 47%

M32 (n = 2): 73%
N32 (n = 3): 46%

Reaction conditions: (i) 2-chloro-5-nitropyridine, NaH, r.t., DMF, 1 h-2 d (for M K$_2$CO$_3$, 65° C., DMF, 5 d); (ii) Pd/C, H$_2$, r.t., 3-4 h; (iii) corresponding galactoside (26 or 29), HBTU, DIPEA, DMF, r.t., overnight.

General Procedure for Synthesis of Bis-Aminopyriidines M-O

Corresponding diol (1 eq.), 2-chloro-5-nitropyridine (2-3 eq.) and sodium hydride (3 eq., 60% in mineral oil) were dissolved in dry dimethylformamide (1.5 mL) and stirred at room temperature for 1 h-2 days (for M 3.5 eq. of potassium carbonate was used, T=65° C. for 5 days). The reaction was diluted with ice cold water and dichloromethane. Organic phase was washed with half satd. brine, dried over anhydrous Na$_2$SO$_4$, filtered and concentrated in vacuo. Bis-nitro intermediate was purified by normal phase MPLC (petrol ether/ethyl acetate, gradient of 5-20% ethyl acetate). Pure bis-nitro intermediate was then dissolved in dichloromethane/methanol (2:1) and 10% Pd/C (0.2 eq.) was added. After three vacuum/H$_2$ cycles the reaction was stirred under H$_2$ atmosphere (1 atm) for 3-4 h. The reaction was filtered over celite and concentrated in vacuo. Pure products were obtained without further purification.

1,2-bis((5-aminopyridin-2-yl)oxy)ethane (M)

Ethylene glycol (50 μL, 0.89 mmol), 2-chloro-5-nitropyridine (436 mg, 2.75 mmol) and potassium carbonate (438 mg, 3.5 mmol) were used following the general procedure for synthesis of bis-aminopyridines to give compound M (69.0 mg, 0.28 mmol, 31% over two steps) as light-brown solid.

$^1$H NMR (500 MHz, Methanol-d$_4$) δ 7.61 (dd, J=2.9, 0.7 Hz, 2H ArH), 7.17 (dd, J=8.7, 2.9 Hz, 2H, ArH), 6.65 (dd, J=8.7, 0.7 Hz, 2H, ArH), 4.44 (s, 4H, CH$_2$).

$^{13}$C NMR (126 MHz, Methanol-d$_4$) δ 158.46 (2C, ArC), 139.63 (2C, ArC), 133.72 (2C, ArCH), 129.40 (2C, ArCH), 111.82 (2C, ArCH), 65.88 (2C, CH$_2$).

HPLC-MS: [C$_{12}$H$_{14}$N$_4$O$_2$+Na]$^+$ calcd. 269.10, found 269.05.

HRMS: [C$_{12}$H$_{14}$N$_4$O$_2$+H]$^+$ calcd. 247.1190, found 247.1187.

1,3-bis((5-aminopyridin-2-yl)oxy)propane (N)

Propane-1,3-diol (50 μL, 0.89 mmol), 2-chloro-5-nitropyridine (279 mg, 1.76 mmol) and sodium hydride (83 mg, 2.1 mmol) were used following the general procedure for synthesis of bis-aminopyridines to give compound N (111.4 mg, 0.43 mmol, 62% over two steps) as brown solid.

$^1$H NMR (500 MHz, Methanol-d$_4$) δ 7.60 (d, J=2.8 Hz, 2H, ArH), 7.17 (dd, J=8.7, 2.9 Hz, 2H, ArH), 6.64 (d, J=8.7 Hz, 2H, ArH), 4.29 (t, J=6.3 Hz, 4H, CH$_2$CH$_2$CH$_2$), 2.16 (p, J=6.3 Hz, 2H, CH$_2$CH$_2$CH$_2$).

$^{13}$C NMR (126 MHz, Methanol-d$_4$) δ 158.76 (2C, ArC), 139.35 (2C, ArC), 133.81 (2C, ArCH), 129.48 (2C, ArCH), 111.65 (2C, ArCH), 64.18 (2C, CH$_2$CH$_2$CH$_2$), 30.21 (1C, CH$_2$CH$_2$CH$_2$).

HPLC-MS: [C$_{13}$H$_{16}$N$_4$O$_2$+H]$^+$ calcd. 261.13, found 261.07.

HRMS: [C$_{13}$H$_{16}$N$_4$O$_2$+H]$^+$ calcd. 261.1346, found 261.1340.

1,4-bis((5-aminopyridin-2-yl)oxy)butane (O)

Butane-1,4-diol (50 μL, 0.56 mmol), 2-chloro-5-nitropyridine (284 mg, 1.79 mmol) and sodium hydride (72 mg, 3.2 mmol) were used following the general procedure for synthesis of bis-aminopyridines to give the bis-nitro intermediate (143 mg, 0.43 mmol, 76%). The bis-nitro intermediate (125 mg, 0.38 mmol) was reduced to give pure compound O (104 mg, 0.38 mmol, 76% over two steps) as brown solid.

$^1$H NMR (500 MHz, Methanol-d$_4$) δ 7.60 (d, J=2.9 Hz, 2H, ArH), 7.17 (dd, J=8.7, 2.9 Hz, 2H, ArH), 6.62 (d, J=8.7 Hz, 2H, ArH), 4.22-4.16 (m, 4H, CH$_2$CH$_2$CH$_2$CH$_2$), 1.93-1.85 (m, 4H, CH$_2$CH$_2$CH$_2$CH$_2$).

$^{13}$C NMR (126 MHz, Methanol-d$_4$) δ 158.86 (2C, ArC), 139.36 (2C, ArC), 133.78 (2C, ArCH), 129.47 (2C, ArCH), 111.62 (2C, ArCH), 67.09 (2C, CH$_2$CH$_2$CH$_2$CH$_2$), 27.05 (2C, CH$_2$CH$_2$CH$_2$CH$_2$).

HPLC-MS: [C$_{14}$H$_{18}$N$_4$O$_2$+H]$^+$ calcd. 275.15, found 275.10.

HRMS: [C$_{14}$H$_{18}$N$_4$O$_2$+H]$^+$ calcd. 275.1503, found 275.1497.

Divalent Ligand M31

1,2-bis((5-aminopyridin-2-yl)oxy)ethane (M, 12.1 mg, 49.1 μmol), compound 29 (46.4 mg, 141 μmol), HBTU (60.2 mg, 159 μmol) were dissolved in dimethylformamide (1.5 mL) and DIPEA (50 μL, 287 μmol) was added. Reaction was stirred at r.t. overnight, then lyophilized. The product M31 (19.6 mg, 22.6 μmol, 46°%) was purified by C18 column preparative HPLC chromatography (water/acetonitrile supplemented with 1% formic acid, gradient of 15-30% acetonitrile). Compound M31 (19.6 mg, 22.6 μmol, 46%) was obtained as pale-yellow solid.

$^1$H NMR (500 MHz, DMSO-d$_6$) δ 9.93 (s, 2H, NH), 8.32 (d, J=2.6 Hz, 2H, ArH), 7.88 (d, J=8.9, 2.7 Hz, 2H, ArH), 7.18-7.12 (m, 4H, ArH), 6.97-6.91 (m, 4H, ArH), 6.81 (d, J=8.9 Hz, 2H, ArH), 4.76 (d, J=7.7 Hz, 2H, H-1), 4.51 (s, 4H, CH$_2$), 3.68 (d, J=3.3 Hz, 2H, H-4), 3.57-3.44 (m, 8H, H-2, H-5, H-6), 3.38 (dd, J=9.5, 3.3 Hz, 2H, H-3), 2.85 (t, J=7.7 Hz, 4H, CH$_2$CH$_2$CONH), 2.57 (t, J=7.7 Hz, 4H, CH$_2$CH$_2$CONH).

$^{13}$C NMR (126 MHz, DMSO-d$_6$) δ 170.47 (2C, C=O), 158.88 (2C, ArC), 155.86 (2C, ArC), 137.33 (2C, ArCH), 134.24 (2C, ArC), 131.48 (2C, ArCH), 130.30 (2C, ArC), 129.06 (4C, ArCH), 116.20 (4C, ArCH), 110.35 (2C, ArCH), 101.12 (2C, C-1), 75.45 (2C, C-5), 73.31 (2C, C-3), 70.30 (2C, C-2), 68.16 (2C, C-4), 64.05 (4C, CH$_2$), 60.40 (2C, C-6), 37.98 (2C, CH$_2$CH$_2$CONH), 30.03 (2C, CH$_2$CH$_2$CONH).

HPLC-MS: [C$_{42}$H$_{50}$N$_4$O$_{16}$+H]$^+$ calcd. 867.33, found 867.35.

HRMS: [C$_{42}$H$_{50}$N$_4$O$_{16}$+H]$^+$ calcd. 867.3295, found 867.3296.

Divalent Ligand N31

1,3-bis((5-aminopyridin-2-yl)oxy)propane (N, 14.7 mg, 56.5 μmol), compound 29 (40.7 mg, 124 μmol), HBTU (49.8 mg, 131 μmol) were dissolved in dimethylformamide (1.5 mL) and DIPEA (50 μL, 287 μmol) was added. Reaction was stirred at r.t. overnight, then lyophilized. The product N31 was purified by C18 column preparative HPLC chromatography (water/acetonitrile supplemented with 1% formic acid, gradient of 15-40% acetonitrile). Compound N31 (20.2 mg, 22.9 μmol, 41%) was obtained as white solid.

$^1$H NMR (500 MHz, DMSO-d$_6$) δ 9.91 (s, 2H, NH), 8.30 (d, J=2.7 Hz, 2H, ArH), 7.86 (dd, J=8.9, 2.7 Hz, 2H, ArH), 7.15 (d, J=8.3 Hz, 4H, ArH), 6.99-6.89 (m, 4H, ArH), 6.78 (d, J=8.9 Hz, 2H, ArH), 5.12 (d, J=5.2 Hz, 2H, OH-2), 4.84 (d, J=5.6 Hz, 2H, OH-3), 4.76 (d, J=7.7 Hz, 2H, H-1), 4.63 (t, J=5.2 Hz, 2H, OH-6), 4.48 (d, J=4.6 Hz, 2H, OH-4), 4.33 (t, J=6.3 Hz, 4H, CH$_2$CH$_2$CH$_2$), 3.68 (t, J=4.0 Hz, 2H, H-4), 3.60-3.43 (m, 8H, H-2, H-5, H-6), 3.41-3.37 (m, 2H, H-3), 2.84 (t, J=7.6 Hz, 4H, CH$_2$CH$_2$CONH), 2.57 (t, J=7.7 Hz, 4H, CH$_2$CH$_2$CONH), 2.12 (p, J=6.3 Hz, 2H, CH$_2$CH$_2$CH$_2$).

$^{13}$C NMR (126 MHz, DMSO-d$_6$) δ 170.45 (2C, C=O), 159.14 (2C, ArC), 155.87 (2C, ArC), 137.48 (2C, ArCH), 134.25 (2C, ArC), 131.40 (2C, ArCH), 130.12 (2C, ArC), 129.07 (4C, ArCH), 116.20 (4C, ArCH), 110.23 (2C, ArCH), 101.13 (2C, C-1), 75.45 (2C, C-5), 73.32 (2C, C-3), 70.30 (2C, C-2), 68.15 (2C, C-4), 62.49 (2C, CH$_2$CH$_2$CH$_2$), 60.40 (2C, C-6), 37.97 (2C, CH$_2$CH$_2$CONH), 30.05 (2C, CH$_2$CH$_2$CONH), 28.35 (1C, CH$_2$CH$_2$CH$_2$).

HPLC-MS: [C$_{43}$H$_{52}$N$_4$O$_{16}$+H]$^+$ calcd. 881.35, found 881.33.

HRMS: [C$_{43}$H$_{52}$N$_4$O$_{16}$+H]$^+$ calcd. 881.3451, found 881.3446.

Divalent Ligand O31

1,4-bis((5-aminopyridin-2-yl)oxy)butane (O, 10.5 mg, 38.3 μmol), compound 29 (46.5 mg, 142 μmol), HBTU (45.5 mg, 120 μmol) were dissolved in dimethylformamide (1.5 mL) and DIPEA (40 μL, 230 μmol) was added. Reaction was stirred at r.t. overnight, then lyophilized. The product O31 was purified by C18 column preparative HPLC chromatography (water/acetonitrile supplemented with 1% formic acid, gradient of 15-45% acetonitrile). Compound O31 (16.2 mg, 18.1 μmol, 47%) was obtained as white solid.

$^1$H NMR (500 MHz, DMSO-d$_6$) δ 9.90 (s, 2H, NH), 8.29 (d, J=2.7 Hz, 2H, ArH), 7.86 (dd, J=8.9, 2.7 Hz, 2H, ArH), 7.17-7.12 (m, 4H, ArH), 6.96-6.91 (m, 4H, ArH), 6.76 (d, J=8.8 Hz, 2H, ArH), 5.11 (d, J=5.1 Hz, 2H, OH-2), 4.83 (d, J=5.6 Hz, 2H, OH-3), 4.76 (d, J=7.7 Hz, 2H, H-1), 4.63 (t, J=5.3 Hz, 2H, OH-6), 4.47 (d, J=4.6 Hz, 2H, OH-4), 4.24 (q, J=4.4, 3.0 Hz, 4H, CH$_2$CH$_2$CH$_2$CH$_2$), 3.68 (t, J=4.1 Hz, 2H, H-4), 30.57-3.43 (m, 8H, H-2, H-5, H-6), 3.42-3.36 (m, 2H, H-3), 2.84 (t, J=7.7 Hz, 4H, CH$_2$CH$_2$CONH), 2.60-2.54 (m, 4H, CH$_2$CH$_2$CONH), 1.84-1.77 (m, 4H, CH$_2$CH$_2$CH$_2$CH$_2$).

$^{13}$C NMR (126 MHz, DMSO-d$_6$) δ 170.43 (2C, C=O), 159.28 (2C, ArC), 155.86 (2C, ArC), 137.51 (2C, ArCH), 134.25 (2C, ArC), 131.39 (2C, ArCH), 130.01 (2C, ArC), 129.06 (4C, ArCH), 116.19 (4C, ArCH), 110.17 (2C, ArCH), 101.12 (2C, C-1), 75.45 (2C, C-5), 73.32 (2C, C-3), 70.30 (2C, C-2), 68.15 (2C, C-4), 65.14 (2C, CH$_2$CH$_2$CH$_2$CH$_2$), 60.40 (2C, C-6), 37.97 (2C, CH$_2$CH$_2$CONH), 30.04 (2C, CH$_2$CH$_2$CONH), 25.38 (2C, CH$_2$CH$_2$CH$_2$CH$_2$).

HPLC-MS: [C$_{44}$H$_{54}$N$_4$O$_{16}$+H]$^+$ calcd. 895.36, found 895.36.

HRMS: [C$_{44}$H$_{54}$N$_4$O$_{16}$+H]$^+$ calcd. 895.3608, found 895.3601.

Divalent Ligand M32

1,2-bis((5-aminopyridin-2-yl)oxy)ethane (M, 14.8 mg, 60.1 μmol), compound 26 (51.7 mg, 158 μmol), HBTU (60.1 mg, 158 μmol) were dissolved in dimethylformamide (1.5 mL) and DIPEA (55 μL, 316 μmol) was added. Reaction was stirred at r.t. overnight, then lyophilized. The product M32 was purified by C18 column preparative HPLC chromatography (water/acetonitrile supplemented with 1% formic acid, gradient of 15-40% acetonitrile). Compound M32 (37.9 mg, 43.9 μmol, 73%) was obtained as pale-yellow solid.

$^1$H NMR (500 MHz, DMSO-d$_6$) δ 10.19 (s, 2H, NH), 8.46 (d, J=2.9 Hz, 2H, ArH), 8.02 (dd, J=8.9, 2.7 Hz, 2H, ArH), 7.60-7.52 (m, 6H, ArH, CH=CHCONH), 7.11-7.05 (m, 4H, ArH), 6.87 (d, J=8.9 Hz, 2H, ArH), 6.66 (d, J=15.7 Hz, 2H, CH=CHCONH), 4.90 (d, J=7.7 Hz, 2H, H-1), 4.56 (s, 4H, CH$_2$), 3.71 (d, J=3.8 Hz, 2H, H-4), 3.63-3.46 (m, 8H, H-2, H-5, H-6), 3.42 (dd, J=9.5, 3.3 Hz, 2H, H-3).

$^{13}$C NMR (126 MHz, DMSO-d$_6$) δ 163.85 (2C, C=O), 158.99 (2C, ArC), 158.78 (2C, ArC), 140.02 (2C, CH=CHCONH), 137.36 (2C, ArCH), 131.42 (2C, ArCH), 130.53 (2C, ArC), 129.25 (4C, ArCH), 128.25 (2C, ArC), 119.61 (2C, CH=CHCONH), 116.62 (4C, ArCH), 110.48 (2C, ArCH), 100.67 (2C, C-1), 75.59 (2C, C-5), 73.27 (2C, C-3), 70.22 (2C, C-2), 68.13 (2C, C-4), 64.11 (4C, CH$_2$), 60.36 (2C, C-6).

HPLC-MS: [C$_{42}$H$_{46}$N$_4$O$_{16}$+H]$^+$ calcd. 863.30, found 863.34.

HRMS: [C$_{42}$H$_{46}$N$_4$O$_{16}$+H]$^+$ calcd. 863.2982, found 863.2977.

Divalent Ligand N32

1,3-bis((5-aminopyridin-2-yl)oxy)propane (N, 14.8 mg, 56.9 μmol), compound 26 (40.4 mg, 124 μmol), HBTU (51.4 mg, 136 μmol) were dissolved in dimethylformamide (1.5 mL) and DIPEA (50 μL, 287 μmol) was added. Reaction was stirred at r.t. overnight, then lyophilized. The product N32 was purified by C18 column preparative HPLC chromatography (water/acetonitrile supplemented with 1% formic acid, gradient of 15-40% acetonitrile). Compound N32 (22.7 mg, 25.9 μmol, 46%) was obtained as white solid.

$^1$H NMR (500 MHz, DMSO-d$_6$) δ 10.18 (s, 2H, NH), 8.44 (d, J=2.6 Hz, 2H, ArH), 8.00 (dd, J=8.9, 2.7 Hz, 2H, ArH), 7.61-7.50 (m, 6H, ArH, CH=CHCONH), 7.08 (d, J=8.5 Hz, 4H, ArH), 6.83 (d, J=8.8 Hz, 2H, ArH), 6.66 (d, J=15.7 Hz, 2H, CH=CHCONH), 5.20 (s, 2H, OH-2), 4.95-4.82 (m, 4H, H-1, OH-3), 4.67 (s, 2H, OH-6), 4.53 (s, 2H, OH-4), 4.37 (t, J=6.4 Hz, 4H, CH$_2$CH$_2$CH$_2$), 3.71 (d, J=3.0 Hz, 2H, H-4), 3.64-3.45 (m, 8H, H-2, H-5, H-6), 3.45-3.39 (m, 2H, H-3), 2.16 (p, J=6.4 Hz, 2H, C$\underline{H_2}$C$\underline{H_2}$C$\underline{H_2}$).

$^{13}$C NMR (126 MHz, DMSO-d$_6$) δ 163.82 (2C, C=O), 159.26 (2C, ArC), 158.77 (2C, ArC), 139.97 (2C, $\underline{C}$H=CHCONH), 137.51 (2C, ArCH), 131.32 (2C, ArC), 130.35 (2C, ArC), 129.24 (4C, ArCH), 128.26 (2C, ArC), 119.65 (2C, CH=$\underline{C}$HCONH), 116.62 (2C, ArCH), 110.35 (2C, ArCH), 100.67 (2C, C-1), 75.60 (2C, C-5), 73.27 (2C, C-3), 70.22 (2C, C-2), 68.13 (2C, C-4), 62.54 (2C, $\underline{C}$H$_2$CH$_2$CH$_2$), 60.36 (2C, C-6), 28.38 (1C, CH$_2$$\underline{C}$H$_2$CH$_2$).

HPLC-MS: $[C_{43}H_{48}N_4O_{16}+H]^+$ calcd. 877.31, found 877.32.

HRMS: $[C_{43}H_{48}N_4O_{16}+H]^+$ calcd. 877.3138, found 877.3138.

Scheme 8: Synthesis of sulfonated divalent LecA ligand.

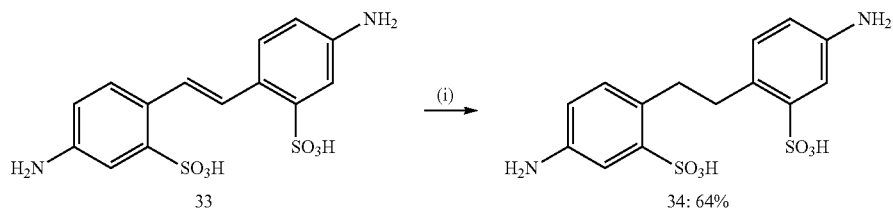

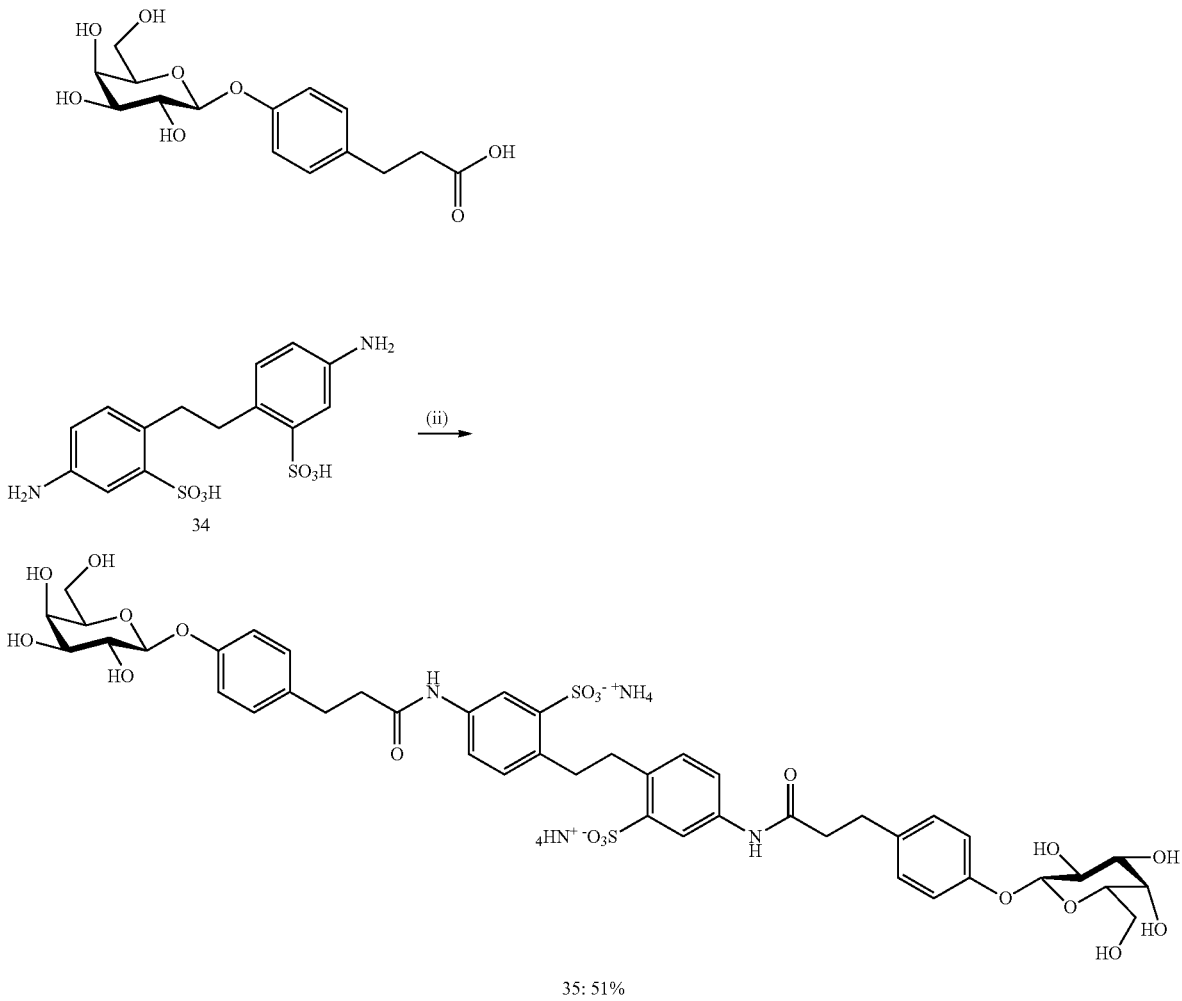

Reaction conditions: (i) Raney Ni, H$_2$, r.t., H$_2$O, 6 d; (ii) galactoside 29, PyBOP, N-Methylmorpholine, DMF, r.t., overnight.

6,6'-(ethane-1,2-diyl)bis(3-aminobenzenesulfonic acid) (34)

Compound 34 was synthesized according to Bazanova et. al.[8] 4,4'-Diaminostilbene-2,2'-disulfonic acid (33, 235.5 mg, 0.64 mmol) was dissolved in water (10 mL) after addition of 1 drop of satd. NaOH aqueous solution and Raney Ni was added. After three vacuum/$H_2$ cycles the reaction was stirred under $H_2$ atmosphere (1 atm) for 4 days. The reaction was filtered over celite and lyophilized. Conversion was not complete; therefore, the reaction crude was re-dissolved in in water (5 mL) and 1 drop of satd. NaOH aqueous solution. Raney Ni was added and after three vacuum/$H_2$ cycles the reaction was stirred under $H_2$ atmosphere (1 atm) for 2 additional days. The reaction was filtered over celite and lyophilized. Reaction crude was re-dissolved in water (10 mL) and pure product 34 (150.6 mg, 0.40 mmol, 64%) was precipitated after acidification with HCl (2 M) as white solid.

$^1$H NMR (500 MHz, $D_2O$) δ 7.28 (dd, J=2.4, 0.9 Hz, 2H, ArH), 7.13 (d, J=8.0 Hz, 2H, ArH), 6.85 (ddd, J=8.1, 2.5, 0.9 Hz, 2H, ArH), 3.15 (s, 4H, $CH_2$).

$^{13}$C NMR (126 MHz, $D_2O$) δ 144.12 (2C, ArC), 141.07 (2C, ArC), 132.63 (2C, ArCH), 130.22 (2C, ArC), 119.20 (2C, ArCH), 114.50 (2C, ArCH), 33.46 (2C, $CH_2$).

HPLC-MS: $[C_{14}H_{16}N_2O_6S_2-H]^-$ calcd. 371.0377, found 370.93.

Divalent Ligand 35

Sulfonated linker 34 (21.6 mg, 58.0 µmol), galactoside 29 (59.0 mg, 198 µmol) and PyBOP (74.3 mg, 143 µmol) were suspended in dimethylformamide (1.5 mL) and N-Methylmorpholine (50 µL, 455 µmol) was added. Reaction was stirred at r.t. overnight, then lyophilized. The product 35 was purified by C18 column preparative HPLC chromatography (5 mM ammonium bicarbonate at pH 7/acetonitrile, gradient of 5-20% acetonitrile). Compound 35 (30.4 mg, 29.6 µmol, 51%) was obtained as white solid.

$^1$H NMR (500 MHz, DMSO-$d_6$) δ 9.88 (s, 2H, NH), 7.85 (d, J=2.3 Hz, 2H, ArH), 7.59 (dd, J=8.2, 2.3 Hz, 2H, ArH), 7.19 (d, J=8.3 Hz, 2H, ArH), 7.17-7.13 (m, 4H, ArH), 6.98-6.89 (m, 4H, ArH), 4.77 (d, J=7.7 Hz, 2H, H-1), 3.67 (d, J=3.3 Hz, 2H, H-4), 3.57-3.44 (m, 8H, H-2, H-5, H-6), 3.38 (dd, J=9.8, 3.6 Hz, 2H, H-3), 3.18 (s, 4H, Ar$CH_2CH_2$Ar), 2.84 (t, J=7.7 Hz, 4H, $\underline{C}H_2CH_2$CONH), 2.55 (t, J=7.6 Hz, 4H, $CH_2\underline{C}H_2$CONH).

$^{13}$C NMR (126 MHz, DMSO-$d_6$) δ 170.26 (2C, C=O), 155.88 (2C, ArC), 146.15 (2C, ArC), 135.89 (2C, ArC), 135.24 (2C, ArC), 134.48 (2C, ArC), 130.49 (2C, ArCH), 129.13 (4C, ArCH), 119.37 (2C, ArCH), 117.98 (2C, ArCH), 116.24 (4C, ArCH), 101.17 (2C, C-1), 75.46 (2C, C-5), 73.32 (2C, C-3), 70.36 (2C, C-2), 68.21 (2C, C-4), 60.41 (2C, C-6), 38.34 (2C, $\underline{C}H_2CH_2$CONH), 33.77 (2C, Ar$CH_2CH_2$Ar), 30.24 (2C, $\overline{C}H_2CH_2CH_2CH_2$).

HPLC-MS: $[C_{44}H_{52}N_2O_{20}S_2-2H]^{2-}$ calcd. 495.12, found 495.11.

HRMS: $[C_{44}H_{52}N_2O_{20}S_2-H]^-$ calcd. 991.2482, found 991.2531.

TABLE 2

Affinity analysis of the divalent fluorescent LecA ligand 13 determined by SPR.

| Structure | Number | $k_{on}$ [×10³/Ms] | $k_{off}$ [×10⁻³/s] | $K_d$ [nM] |
|---|---|---|---|---|
| (see figure) | 13 | 160 ± 19 | 5.93 ± 0.51 | 37.2 ± 2.9 |

Compound 13 was unstable and degraded after several days in aqueous solutions. Average and standard deviation was calculated from three independent experiments.

TABLE 3

Evaluation of amide divalent LecA ligands in a competitive binding assay based on fluorescence polarization performed as described by Joachim et al..[9]

| Structure | Number | IC$_{50}$ [µM] |
|---|---|---|
| R = (galactose-O-C$_6$H$_4$-CH=CH-C(O)-NH-C$_6$H$_4$-) | | |
| R–O–Me | L18 | 18.8 ± 6.6 |
| R–O–R | G18 | 6.6 ± 1.5 |
| R–O–CH$_2$–O–R | H18 | 4.7 ± 2.6 |
| R–O–CH$_2$CH$_2$–O–R | I18 | 5.6 ± 3.1 |
| R–O–(CH$_2$)$_3$–O–R | J18 | 4.5 ± 1.6 |
| R–O–(CH$_2$)$_4$–O–R | K18 | 7.9 ± 4.8 |
| R = (galactose-O-C$_6$H$_4$-CH$_2$CH$_2$-C(O)-NH-C$_6$H$_4$-) | | |
| R–O–Me | L30 | 18.9 ± 5.5 |
| R–O–R | G30 | 3.6 ± 1.3 |
| R–O–CH$_2$–O–R | H30 | 4.2 ± 1.7 |
| R–O–CH$_2$CH$_2$–O–R | I30 | 4.5 ± 1.8 |
| R–O–(CH$_2$)$_3$–O–R | J30 | 3.5 ± 1.0 |
| R–O–(CH$_2$)$_4$–O–R | K30 | 4.4 ± 1.5 |
| R = (galactose-O-C$_6$H$_4$-CH=CH-C(O)-NH-pyridyl-) | | |

TABLE 3-continued

Evaluation of amide divalent LecA ligands in a competitive binding assay based on fluorescence polarization performed as described by Joachim et al..[9]

| Structure | Number | IC$_{50}$ [µM] |
|---|---|---|
| R−O−CH$_2$CH$_2$−O−R | M32 | 7.5 ± 3.7 |
| R−O−(CH$_2$)$_3$−O−R | N32 | 4.3 ± 2.0 |
| R−O−(CH$_2$)$_4$−O−R | — | — |

R = [Gal-O-phenyl-CH$_2$CH$_2$-C(O)-NH-pyridyl group]

| Structure | Number | IC$_{50}$ [µM] |
|---|---|---|
| R−O−CH$_2$CH$_2$−O−R | M31 | 4.1 ± 2.2 |
| R−O−(CH$_2$)$_3$−O−R | N31 | 2.7 ± 1.1 |
| R−O−(CH$_2$)$_4$−O−R | O31 | 3.2 ± 1.8 |

R = [Gal-O-phenyl-CH$_2$CH$_2$-C(O)-NH-phenyl-SO$_3^-$ $^+$NH$_4$ group]

| Structure | Number | IC$_{50}$ [µM] |
|---|---|---|
| R−CH$_2$CH$_2$−R | 35 | 4.0 ± 2.4 |
| Me-α-Gal | — | 91.5 ± 12.2 |
| pNO$_2$-Ph-β-Gal | — | 40.4 ± 12.9 |

Divalent ligands showed steep titration slopes indicating the lower assay limit was reached. The assay was performed in TBS/Ca$^{2+}$ buffer (20 mM Tris, 137 mM NaCl, 2.6 mM KCl at pH 7.4 supplemented with 1 mM CaCl$_2$) in presence of 25% DMSO. Averages and standard deviations from at least three independent titrations of triplicates each.

TABLE 4

Affinity and kinetic analyses of the LecA-inhibitor interactions determined by SPR as described in Zahorska et. al..[10] Averages and standard deviations from three independent experiments.

| Structure | Number | k$_{on}$ [×10$^3$/Ms] | k$_{off}$ [×10$^{-3}$/s] | K$_d$ [nM] |
|---|---|---|---|---|

R = [Gal-O-phenyl-CH=CH-C(O)-NH-phenyl group]

TABLE 4-continued

Affinity and kinetic analyses of the LecA-inhibitor interactions determined by SPR as described in Zahorska et. al..[10]
Averages and standard deviations from three independent experiments.

| Structure | Number | $k_{on}$ [×10$^3$/Ms] | $k_{off}$ [×10$^{-3}$/s] | $K_d$ [nM] |
|---|---|---|---|---|
| R–O–Me | L18 | — | — | 5 210 ± 600 |
| R–O–R | G18 | 89 ± 29 | 5.96 ± 2.06 | 67.28 ± 9.38 |
| R–O–C–O–R | H18 | 110 ± 52 | 3.79 ± 0.89 | 37.65 ± 11.2 |
| R–O–(CH$_2$)$_2$–O–R | I18 | 61.1 ± 2.5 | 2.49 ± 0.28 | 40.73 ± 3.01 |
| R–O–(CH$_2$)$_3$–O–R | J18 | 16.9 ± 5.2 | 2.51 ± 0.22 | 156.1 ± 37.6 |
| R–O–(CH$_2$)$_4$–O–R | K18 | 1.75 ± 0.3 | 3.88 ± 0.43 | 2 246 ± 303 |

R = β-D-galactopyranosyl-O-C$_6$H$_4$-CH$_2$CH$_2$C(O)NH-C$_6$H$_4$-

| Structure | Number | $k_{on}$ [×10$^3$/Ms] | $k_{off}$ [×10$^{-3}$/s] | $K_d$ [nM] |
|---|---|---|---|---|
| R–O–Me | L30 | — | — | 5 380 ± 90 |
| R–O–R | G30 | 158 ± 6 | 3.49 ± 0.08 | 22.05 ± 0.32 |
| R–O–C–O–R | H30 | 303 ± 20 | 4.62 ± 0.20 | 15.27 ± 0.57 |
| R–O–(CH$_2$)$_2$–O–R | I30 | 123 ± 4 | 2.84 ± 0.06 | 23.08 ± 0.32 |
| R–O–(CH$_2$)$_3$–O–R | J30 | 187 ± 13 | 3.45 ± 0.13 | 18.47 ± 1.50 |
| R–O–(CH$_2$)$_4$–O–R | K30 | 175 ± 55 | 3.66 ± 0.42 | 23.13 ± 11.0 |

R = β-D-galactopyranosyl-O-C$_6$H$_4$-CH=CH-C(O)NH-pyridinyl-

| Structure | Number | $k_{on}$ [×10$^3$/Ms] | $k_{off}$ [×10$^{-3}$/s] | $K_d$ [nM] |
|---|---|---|---|---|
| R–O–(CH$_2$)$_2$–O–R | M32 | 121 ± 7 | 1.65 ± 0.12 | 13.7 ± 1.56 |

TABLE 4-continued

Affinity and kinetic analyses of the LecA-inhibitor interactions determined by SPR as described in Zahorska et. al..[10]
Averages and standard deviations from three independent experiments.

| Structure | Number | $k_{on}$ [×10³/Ms] | $k_{off}$ [×10⁻³/s] | $K_d$ [nM] |
|---|---|---|---|---|
| 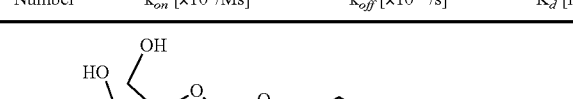 | M31 | 142 ± 3 | 1.41 ± 0.05 | 9.92 ± 0.14 |

TABLE 5

Binding affinity of divalent ligand 35 determined by ITC.

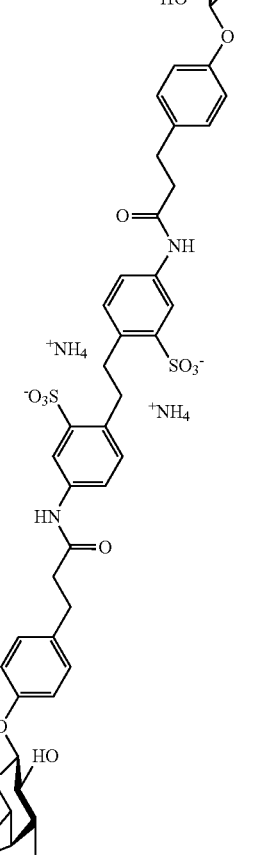

Figure 7:
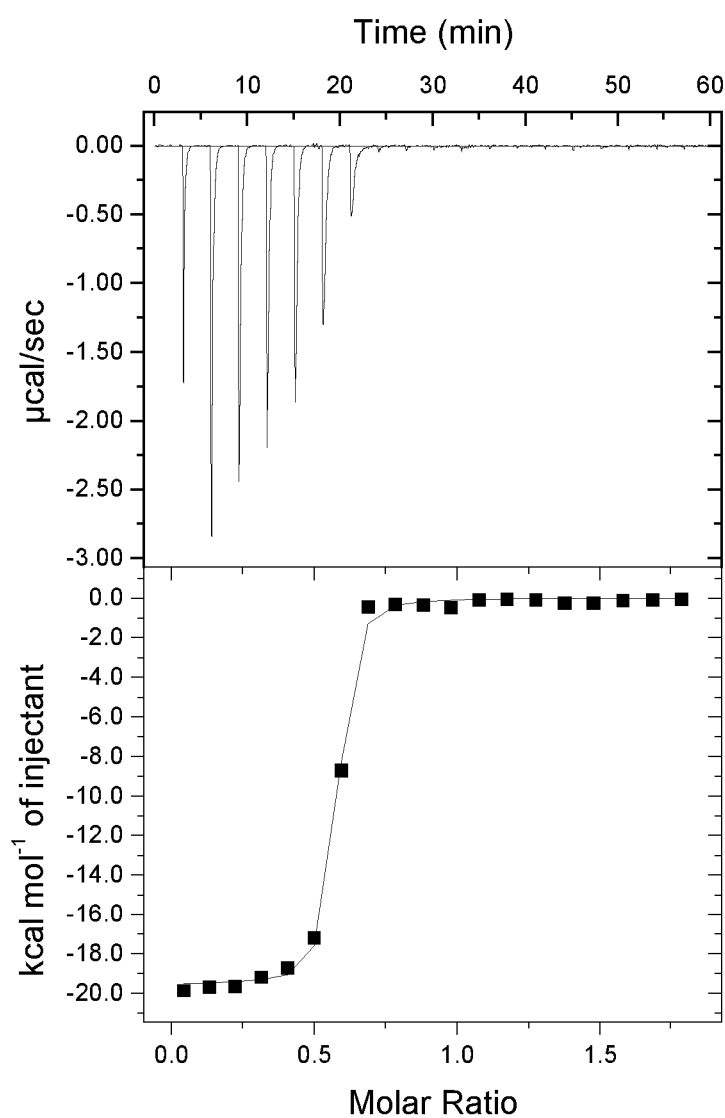
FIG. 7: Diagram belonging to Table 5, second column.
Figure 8:
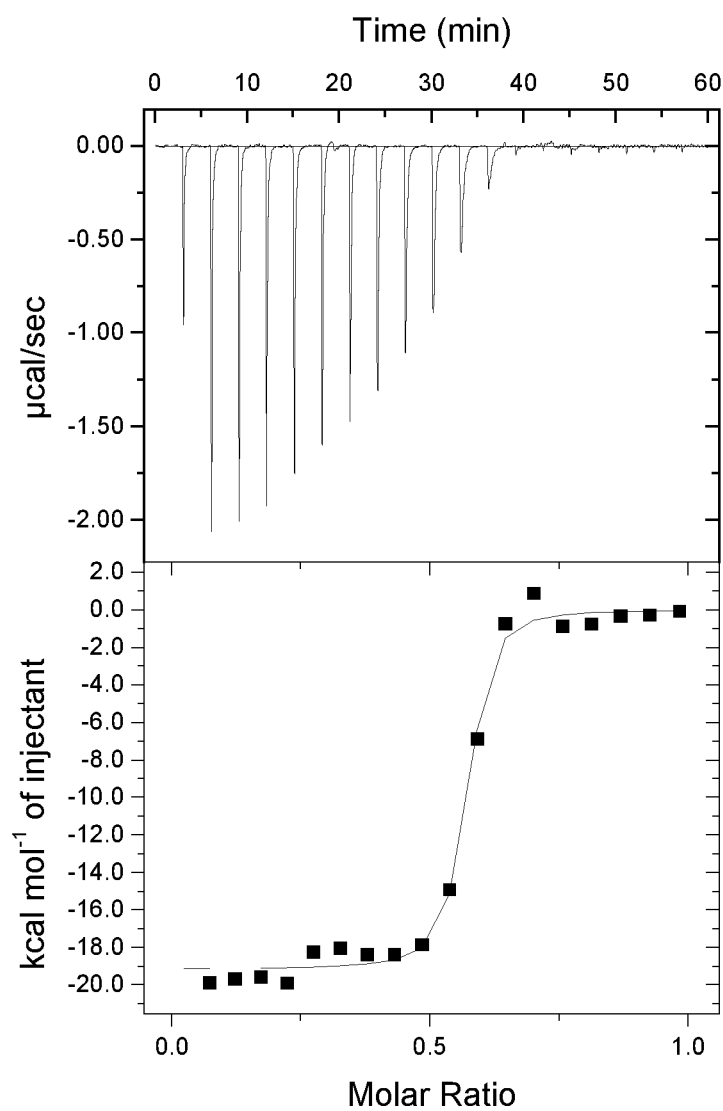
FIG. 8: Diagram belonging to Table 5, third column.

| | see diagram in FIG. 7<br>110 µM LecA<br>1 mM 35 | see diagram in FIG. 8<br>100 µM LecA<br>0.5 mM 35 |
|---|---|---|
| $K_d$ [nM] | 146 | 81 |
| ΔH [kcal/mol] | −19.5 | −19.2 |
| ΔS [cal/mol/deg] | −34.3 | −31.8 |
| N | 0.54 | 0.55 |

TABLE 5-continued

Binding affinity of divalent ligand 35 determined by ITC.

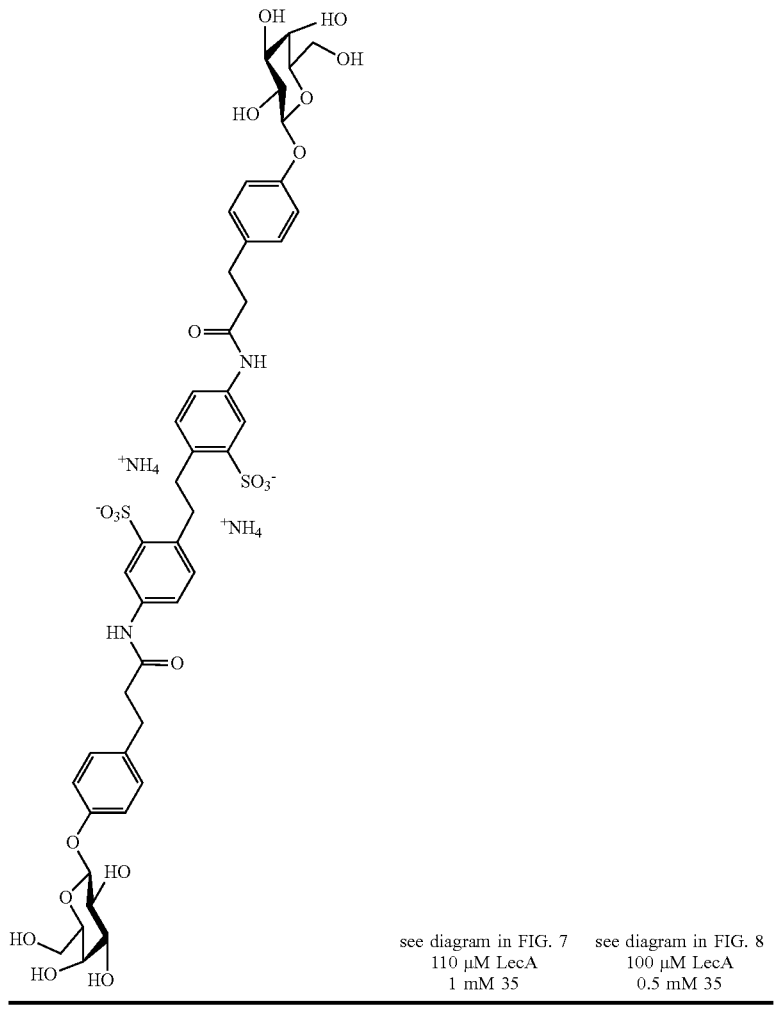

| see diagram in FIG. 7 | see diagram in FIG. 8 |
|---|---|
| 110 µM LecA | 100 µM LecA |
| 1 mM 35 | 0.5 mM 35 |

Titrations were performed in TBS/Ca$^{2+}$ buffer (20 mM Tris, 137 mM NaCl, 2.6 mM KCl at pH 7.4 supplemented with 1 mM CaCl$_2$) at 25° C.

REFERENCES

[1] S. Loison, M. Cottet, H. Orcel, H. Adihou, R. Rahmeh, L. Lamarque, E. Trinquet, E. Kellenberger, M. Hibert, T. Durroux, B. Mouillac and D. Bonnet, "Selective fluorescent nonpeptidic antagonists for vasopressin V2 GPCR: Application to ligand screening and oligomerization assays.," *J. Med. Chem.*, vol. 55, no. 20, pp. 8588-8602, 2012.

[2] S. Akimoto, D. Kato, M. Jikei and M. A. Kakimoto, "A novel main chain cleavable photosensitive polyimide: Polyimide containing acetal structure with photoacid generator," *J. Photopolym. Sci. Technol.*, vol. 12, no. 2, pp. 245-248, 1999.

[3] M. S. Butt, Z. Akhtar, M. Zafar-Uz-Zaman and A. Munir, "Synthesis and characterization of some novel aromatic polyimides," *Eur. Polym. J.*, vol. 41, no. 7, pp. 1638-1646, 2005.

[4] A. SHIOTANI and M. KOHDA, "Preparation of Polyimides Derived from Biphenyltetracarboxylic Dianhydrides and Aromatic Diamines Bearing Alkylene Spacers," *J. Appl. Polym. Sci.*, vol. 74, pp. 2404-2413, 1999.

[5] S. R. Menon, V. K. Patel, L. A. Mitscher, P. Shih, S. P. Pillai and D. M. Shankel, "Structure-antimutagenic activity relationship study of plicatin B," *J. Nat. Prod.*, vol. 62, no. 1, pp. 102-106, 1999.

[6] W. Guo, J. Li, N. Fan, W. Wu, P. Zhou and C. Xia, "A Simple and Effective Method for Chemoselective Esterification of Phenolic Acids," *Synth. Commun.*, vol. 35, pp. 145-152, 2005.

[7] N. Takada, E. Kato, K. Ueda, S. Yamamura and M. Ueda, "A novel leaf-movement inhibitor of a nyctinastic weed, *Sesbania exaltata* Cory, designed on a naturally occurring leaf-opening substance and its application to a potential, highly selective herbicide," *Tetrahedron Lett.*, vol. 43, no. 43, pp. 7655-7658, 2002.

[8] I. N. Bazanova, N. V. Kholodkova and V. P. Gostikin, "Reduction of 4,4'-dinitrostilbene-2,2'-disulfonic acid with hydrogen on raney nickel," *Russ. J. Appl. Chem.*, vol. 75, no. 3, pp. 436-440, 2002.

[9] I. Joachim, S. Rikker, D. Hauck, D. Ponader, S. Boden, R. Sommer, L. Hartmann and A. Titz, "Development and optimization of a competitive binding assay for the galactophilic low affinity lectin LecA from *Pseudomonas aeruginosa*," *Org. Biomol. Chem.*, vol. 14, pp. 7933-7948, 2016.

[10] E. Zahorska, S. Kuhaudomlarp, S. Minervini, S. Yousaf, M. Lepsik, T. Kinsinger, A. K. H. Hirsch, A. Imberty and A. Titz, "A rapid synthesis of low-nanomolar divalent LecA inhibitors in four linear steps from D-galactose," *Chem. Commun.*, vol. 56, pp. 8822-8825, 2020.

The invention claimed is:

1. A compound of the following structure (VII)

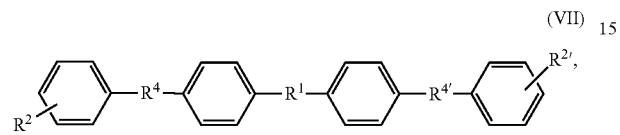
(VII)

wherein $R^2$ and $R^{2'}$ are independently from each other selected from the group consisting of galactose, GalNAc, 2-deoxy-galactose, and epoxides of galactoheptose, wherein the —O— group forming the linkage between $R^2$ and the benzene ring to which $R^2$ is linked, and/or the —O— group forming the linkage between $R^{2'}$ and the benzene ring to which $R^{2'}$ is linked may be replaced independently from each other by an —S— group, an —NH— group, or a —CH$_2$— group;

$R^2$ is in meta or para position;

$R^{2'}$ is in meta or para position;

$R^4$ is selected from the group consisting of —CO—NH—N=CH—; —CH$_2$—CH$_2$—CO—NH—; E- or Z—CO—NH—CH=CH—, E- or Z—CH=CH—CO—NH—; —CO—NH—CH$_2$—CH$_2$—; —NH—CO—CH$_2$—CH$_2$—; E- or Z—CH=CH—NH—CO—; E- or Z—NH—CO—CH=CH—; and —CH$_2$—CH$_2$—NH—CO—;

$R^{4'}$ is selected from the group consisting of —CH=N—NH—CO—; —NH—CO—CH$_2$—CH$_2$—; E- or Z—CH=CH—NH—CO—; E- or Z—NH—CO—CH=CH—; —CH$_2$—CH$_2$—CO—NH—; —CH$_2$—CH$_2$—CO—NH—; E- or Z—CO—NH—CH=CH—; E- or Z—CH=CH—CO—NH—; and —CO—NH—CH$_2$—CH$_2$—;

$R^1$ is selected from the group consisting of —O—, —S—, —NH—, —CO—NH—, —NH—CO—, —C(O)—, —X$^1$(CH$_2$)$_n$X$^2$—, wherein n is 1, 2, 3, 4, or 5; and X$^1$ and X$^2$ are independently from each other selected from the group consisting of —O—, —S—, —NH—, —CO—NH—, —NH—CO—, and —C(O)—;

wherein optionally one or more hydrogen atoms of the (CH$_2$)$_n$ group are replaced by a chemical group comprising a label and a linker, wherein said linker is selected from the group consisting of an alkyl group, a heteroalkyl group, an aryl-alkyl group, a heteroaryl-alkyl group, an aryl-heteroalkyl group and a heteroaryl-heteroalkyl group, wherein any of these groups can be optionally substituted; and $R^5$ is —O—C$_{1-6}$ alkyl;

or a salt thereof or a solvate thereof or a prodrug thereof.

2. The compound according to claim 1, wherein $R^2$ and $R^{2'}$ are independently from each other selected from the group consisting of the formulae (III) to (VI):

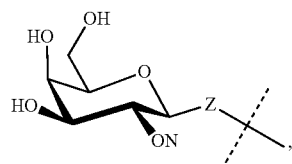
(III)

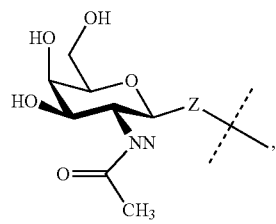
(IV)

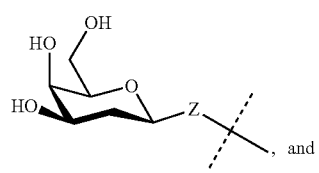
(V), and

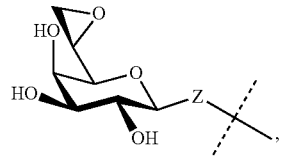
(VI)

wherein Z is selected from the group consisting of O, S, NH, and CH$_2$.

3. The compound according to claim 1, wherein $R^4$ and $R^{4'}$ form one of the following combinations:

(a) $R^4$ is —CO—NH—N=CH— and $R^{4'}$ is —CH=N—NH—CO—;

(b) $R^4$ is —CH$_2$—CH$_2$—CO—NH— and $R^{4'}$ is —NH—CO—CH$_2$—CH$_2$—;

(c) $R^4$ is E—CO—NH—CH=CH— and $R^{4'}$ is E—CH—CH—NH—CO—;

(d) $R^4$ is Z—CO—NH—CH=CH— and $R^{4'}$ is Z—CH—CH—NH—CO—;

(e) $R^4$ is E—CH=CH—CO—NH— and $R^{4'}$ is E—NH—CO—CH=CH—;

(f) $R^4$ is Z—CH=CH—CO—NH— and $R^{4'}$ is Z—NH—CO—CH=CH—;

(g) $R^4$ is —CO—NH—CH$_2$—CH$_2$— and $R^{4'}$ is —CH$_2$—CH$_2$—NH—CO—:

$R^4$ is —NH—CO—CH$_2$—CH$_2$—; and $R^4$ is —CH$_2$—CH$_2$—CO—NH—;

(i) $R^4$ is E—CH=CH—NH—CO—; and $R^{4'}$ is E—CO—NH—CH=CH—;

(j) $R^4$ is Z—CH=CH—NH—CO—; and $R^4$ is Z—CO—NH—CH=CH—;

(k) $R^4$ is E—NH—CO—CH=CH—; and $R^{4'}$ is E—CH=CH—CO—NH—;

(l) $R^4$ is Z—NH—CO—CH=CH—; and $R^4$ is Z—CH=CH—CO—NH—; or (m) $R^4$ is —CH$_2$—CH$_2$—NH—CO—; and $R^{4'}$ is —CO—NH—CH$_2$—CH$_2$—.

4. The compound according to claim 1, wherein the (CH$_2$)$_n$ group carries a label, and wherein the (CH$_2$)$_n$ group has the following structure:

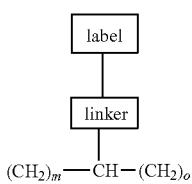

$(CH_2)_m$—CH—$(CH_2)_o$ wherein
m is 0, 1, 2, or 3,
is 0, 1, 2, or 3,
the sum of m+o is ≤4, and
linker is an alkyl group, a heteroalkyl group, an aryl-alkyl group, a heteroaryl-alkyl group, an aryl-heteroalkyl group or a heteroaryl-heteroalkyl group, wherein any of these groups can be optionally substituted.

5. The compound according to claim 1, wherein one or more hydrogen atoms of the $(CH_2)$ n group are replaced by a chemical group comprising a label and a linker, wherein said linker is selected from the group consisting of an alkyl group, a heteroalkyl group, an aryl-alkyl group, a heteroaryl-alkyl group, an aryl-heteroalkyl group and a heteroaryl-heteroalkyl group, wherein any of these groups can be optionally substituted, and wherein said label is a chemical group detectable by fluorescence spectroscopy, by positron-emission tomography (PET), or by magnetic resonance imaging (MRI).

6. The compound according to claim 5, wherein the label detectable by fluorescence spectroscopy is fluorescein.

7. A pharmaceutical composition comprising the compound according to claim 1, and optionally comprising one or more constituents selected from the group consisting of a pharmaceutically acceptable carrier, a diluent, an excipient and an anti-bacterial therapeutic agent.

8. A method for amelioration of *Pseudomonas aeruginosa* infections in a patient, or for amelioration of *Pseudomonas aeruginosa*-associated respiratory tract infections in a patient suffering from cystic fibrosis, comprising administering the patient a compound according to claim 6, optionally in combination with one or more anti-bacterial therapeutic agent(s).

9. A method for in vivo infection imaging comprising administering the compound of claim 4 to a subject for in vivo imaging.

10. A method, comprising use of the compound of claim 4 for in vitro biofilm imaging and in vitro screening assays.

11. The method of claim 10, wherein the biofilms are biofilms produced by *Pseudomonas aeruginosa*.

* * * * *